United States Patent
Wu et al.

(10) Patent No.: US 11,206,062 B2
(45) Date of Patent: Dec. 21, 2021

(54) METHOD AND DEVICE IN A NODE USED FOR WIRELESS COMMUNICATION

(71) Applicant: SHANGHAI LANGBO COMMUNICATION TECHNOLOGY COMPANY LIMITED, Shanghai (CN)

(72) Inventors: Lu Wu, Shanghai (CN); XiaoBo Zhang, Shanghai (CN); Lin Yang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 0 days.

(21) Appl. No.: 16/565,513

(22) Filed: Sep. 10, 2019

(65) Prior Publication Data

US 2020/0083935 A1    Mar. 12, 2020

(30) Foreign Application Priority Data

Sep. 11, 2018 (CN) .......................... 201811056019.2

(51) Int. Cl.
*H04B 7/0417* (2017.01)
*H04L 1/00* (2006.01)
(Continued)

(52) U.S. Cl.
CPC ......... *H04B 7/0417* (2013.01); *H04L 1/0003* (2013.01); *H04L 5/0044* (2013.01); *H04W 72/02* (2013.01)

(58) Field of Classification Search
CPC .... H04B 7/0417; H04B 7/088; H04B 7/0695; H04B 7/0413; H04B 7/043; H04B 7/0452;
(Continued)

(56) References Cited

U.S. PATENT DOCUMENTS

2016/0309424 A1  10/2016  Dinan
2018/0035406 A1*  2/2018  Hao ...................... H04L 5/0046
(Continued)

FOREIGN PATENT DOCUMENTS

CN  102088762 A  6/2011
CN  106330390 A  1/2017
(Continued)

OTHER PUBLICATIONS

CN201811056019.2 1st Office Action dated Jul. 1, 2021.
CN201811056019.2 First Search Report dated Jun. 27, 2021.

*Primary Examiner* — Betsy Deppe
(74) *Attorney, Agent, or Firm* — Maschoff Brennan

(57) ABSTRACT

The present disclosure relates to wireless communication. A communication node first performs X first-type measurement(s) in a target time-frequency resource pool, the X first-type measurement(s) respectively being used for acquiring X first-type measurement value(s); performs a target second-type measurement; and transmits a first radio signal. The target time-frequency resource pool is one of Q alternative time-frequency resource pools, the Q alternative time-frequency resource pools respectively correspond to Q Rx parameter groups; an Rx parameter group of the Q Rx parameter groups corresponding to the target time-frequency resource pool is associated with a Tx parameter group for the first radio signal; the X first-type measurement(s) is(are) used for the target second-type measurement, a second measurement value acquired after performing the target second-type measurement is used for determining an MCS adopted by the first radio signal and radio resources occupied by the first radio signal.

20 Claims, 18 Drawing Sheets

(51) Int. Cl.
*H04L 5/00* (2006.01)
*H04W 72/02* (2009.01)

(58) Field of Classification Search
CPC ... H04B 7/0617; H04B 17/382; H04L 1/0003;
H04L 27/2601; H04L 5/0044; H04L
5/0046; H04W 72/085; H04W 72/02
See application file for complete search history.

(56) References Cited

U.S. PATENT DOCUMENTS

2018/0115970 A1* 4/2018 Chae ................. H04W 72/02
2019/0313405 A1* 10/2019 Li ...................... H04W 72/02
2020/0100119 A1* 3/2020 Byun ................ H04W 72/085

FOREIGN PATENT DOCUMENTS

| CN | 107370572 A | 11/2017 |
|---|---|---|
| CN | 107659965 A | 2/2018 |
| CN | 110876128 A | 3/2020 |

* cited by examiner

| Index (P=4) | P alternative intervals | P alternative MCS subsets | P alternative resource numerical value subsets |
|---|---|---|---|
| 1 | [0, 0.25) | {0, 1, 2, ..., 9} | {$a_1, a_2, a_3, a_4$} |
| 2 | [0.25, 0.5) | {7, 8, 9, ..., 16} | {$b_1, b_2, b_3, b_4$} |
| 3 | [0.5, 0.75) | {14, 15, 18, ..., 23} | {$c_1, c_2, c_3, c_4$} |
| 4 | [0.75, 1] | {21, 25, 26, ..., 31} | {$d_1, d_2, d_3, d_4$} |

FIG.15

METHOD AND DEVICE IN A NODE USED FOR WIRELESS COMMUNICATION

CROSS-REFERENCE TO RELATED APPLICATION

This application claims the priority benefit of Chinese Patent Application Serial Number 201811056019.2, filed on Sep. 11, 2018, the full disclosure of which is incorporated herein by reference.

BACKGROUND

Technical Field

The present disclosure relates to transmission methods and devices in wireless communication systems, and in particular to a scheme and a device for measurement in wireless communication.

Related Art

In 5G New Radio (NR) Access Technology systems, Massive Multi-Input Multi-Output (MIMO) is a significant technology that has already been adopted. In Massive MIMO, multiple antennas based on beamforming form a beam pointing in a specific spatial direction to improve coverage and communication quality.

In response to rapidly growing Vehicle-to-Everything (V2X) business, 3rd Generation Partnership Project (3GPP) has started standards setting and research work under the framework of NR. Currently, 3GPP has completed planning work targeting 5G V2X requirements and has included these requirements into standard TS22.886, where 3GPP identifies and defines 4 major Use Case Groups, covering cases of Vehicles Platooning, supporting Extended Sensors, Advanced Driving and Remote Driving. At 3GPP RAN #80 Plenary Session, the technical Study Item (SI) of NR V2X was approved.

SUMMARY

The inventor has found through research that compared to traditional cellular networks and LTE (Long Term Evolution) V2X (Vehicle-To-Everything), NR (New Radio) V2X is featured with an important functionality of supporting higher transmission reliability and lower transmission latency. Since beamforming will be widely applied in 5G systems, and in NR V2X, the whole coverage can be enhanced by taking into account beamforming-based transmission, in addition, through spatial multiplexing both resource utilization and transmission reliability will be improved, and transmission latency will be reduced.

In view of the above problem, the present disclosure provides a solution. It should be noted that the embodiments in a User Equipment (UE) of the present disclosure and the characteristics in the embodiments may be applied to a base station of the present disclosure, and vice versa. The embodiments and the characteristics in the embodiments can be mutually combined if no conflict is incurred.

The present disclosure provides a method in a first-type communication node used for wireless communication, comprising:

performing X first-type measurement(s) in a target time-frequency resource pool, the X first-type measurement(s) being respectively used for acquiring X first-type measurement value(s), X is a positive integer;

performing a target second-type measurement, the target second-type measurement being used for acquiring a second-type measurement value; and transmitting a first radio signal;

wherein the target time-frequency resource pool is one of Q alternative time-frequency resource pools, the Q alternative time-frequency resource pools respectively correspond to Q Receive (Rx) parameter groups, any two Rx parameter groups of the Q Rx parameter groups are different, Q is a positive integer greater than 1; a Rx parameter group of the Q Rx parameter groups corresponding to the target time-frequency resource pool is associated with a Transmit (Tx) parameter group for the first radio signal; the X first-type measurement value(s) is(are) used for the target second-type measurement, the second-type measurement value acquired after performing the target second-type measurement is used for determining at least one of an MCS (Modulation and Coding Scheme) adopted by the first radio signal and radio resources occupied by the first radio signal.

In one embodiment, a problem needed to be solved in the present disclosure is: more strict control of payload balance is a significant feature of NR V2X compared with traditional cellular network, effective payload control may decrease a probability of business conflicts and increase transmission reliability, both of which are especially crucial to V2X businesses. In LTE V2X system, a measurement mechanism of payload control is designed for quasi-omnidirectional/omnidirectional antennas. Therefore, the measurement mechanism of payload control of beamforming-based NR V2X needs to be reconsidered.

In one embodiment, the essence of the above method lies in that Q Rx parameter groups are respectively receiving beams of Q alternative time-frequency resource pools, a Tx parameter group for a first radio signal is a transmitting beam, a receiving beam of a target time-frequency resource pool and a transmitting beam of the first radio signal are correlated; a target time-frequency resource pool is determined out of Q alternative time-frequency resource pools according to a transmitting beam employed in transmission. An advantage of the above method is to improve accuracy of measurement and making the outcome of the measurement better reflect requirements in actual transmission and scheduling.

In one embodiment, the essence of the above method lies in that Q Rx parameter groups are respectively receiving beams of Q alternative time-frequency resource pools, a Tx parameter group for a first radio signal is a transmitting beam, a receiving beam of a target time-frequency resource pool and a transmitting beam of the first radio signal are correlated; a target time-frequency resource pool is determined out of Q alternative time-frequency resource pools, and then a receiving beam of a target time-frequency resource pool is used to determine a transmitting beam of the first radio signal. An advantage of the above method is that a suitable transmitting beam can be chosen for transmission under the payload control.

According to one aspect of the present disclosure, comprising:

transmitting a first signaling;

wherein the first signaling is used for indicating at least one of an MCS adopted by the first radio signal, or radio resources occupied by the first radio signal, the first signaling is transmitted via an air interface; the Q alternative time-frequency resource pools all belong to a first time window in time domain, the target second-type measurement is performed in a second time window, a time domain position of the second time window is used for determining the first time window, an end time of the first time window is no later than a start time of the second time window, and an end time of the second time window is no later than a start time of transmission of the first radio signal.

According to one aspect of the present disclosure, the above method is characterized in that the target time-frequency resource pool comprises X time-frequency unit(s), the X first-type measurement(s) is(are) respectively performed in the X time-frequency unit(s); a Rx parameter group of the Q Rx parameter groups corresponding to the target time-frequency resource pool is used for each first-type measurement of the X first-type measurement(s); a characteristic measurement value is a first-type measurement value of the X first-type measurement value(s), a first-type measurement value of the X first-type measurement value(s) used for acquiring the characteristic measurement value is performed in a characteristic time-frequency unit, the characteristic time-frequency unit is one of the X time-frequency unit(s), the characteristic time-frequency unit comprises X2 multicarrier symbol(s) in time domain, the characteristic measurement value is an average value of a sum of receiving power value(s) of each of the X2 multicarrier symbol(s) within a frequency domain resource occupied by the characteristic time-frequency unit.

According to one aspect of the present disclosure, the above method is characterized in comprising:
receiving first information;
wherein each of X1 first-type measurement value(s) out of the X first-type measurement value(s) is greater than a target threshold, the second-type measurement value acquired after performing the target second-type measurement is equal to a ratio of X1 to X, X1 is a non-negative integer not greater than X; the first information is used for determining the target threshold.

According to one aspect of the present disclosure, the above method is characterized in that Q alternative thresholds respectively correspond to the Q Rx parameter groups, the target threshold is one of the Q alternative thresholds.

According to one aspect of the present disclosure, the above method is characterized in comprising:
Q0 group(s) of first-type measurements is(are) respectively performed in Q0 alternative time-frequency resource pool(s) of the Q alternative time-frequency resource pools, the Q0 group(s) of first-type measurements is(are) respectively used for acquiring Q0 group(s) of first-type measurement values;
herein, each of the Q0 alternative time-frequency resource pool(s) is different from the target time-frequency resource pool, Q0 is a positive integer less than Q.

In one embodiment, an advantage of the above method is that the first-type communication node also performs the Q0 group(s) of first-type measurements, which helps loosen requirement for the time limit of scheduling of the first radio signal, thereby enabling emergent businesses employing different transmitting beams to perform payload control as well.

According to one aspect of the present disclosure, the above method is characterized in comprising:
performing Q1 second-type measurement(s), the Q1 second-type measurement(s) is(are) respectively used for acquiring Q1 second-type measurement value(s);
herein, Q1 group(s) of first-type measurement values out of the Q0 group(s) of first-type measurement value(s) is(are) respectively used for the Q1 second-type measurement(s), Q1 is a positive integer not greater than Q0.

According to one aspect of the present disclosure, the above method is characterized in that each of the Q1 second-type measurement value(s) is no less than a second-type measurement value acquired after performing the target second-type measurement.

In one embodiment, the essence of the above method lies in that the first-type communication node performs Q1+1 second-type measurements including the Q1 second-type measurement(s) and the target second-type measurement, an alternative time-frequency resource pool of the Q alternative time-frequency resource pools corresponding to a minimum value among second-type measurement values respectively corresponding to the Q1+1 second-type measurements is the target time-frequency resource pool. An advantage of the above method is that a transmitting beam with lightest payload can be chosen for actual transmission.

According to one aspect of the present disclosure, the above method is characterized in comprising:
receiving second information;
herein, the second information is used for determining the Tx parameter group for the first radio signal.

According to one aspect of the present disclosure, the above method is characterized in comprising:
receiving third information;
herein, a second-type measurement value acquired after performing the target second-type measurement belongs to a target interval, the target interval is one of P alternative intervals, any alternative interval of the P alternative intervals is an interval of non-negative real numbers, the P alternative intervals respectively correspond to P alternative MCS subsets, the P alternative intervals respectively correspond to P alternative resource numerical value subsets, P is a positive integer greater than 1; an alternative MCS subset of the P alternative MCS subsets corresponding to the target interval is a first MCS subset, an alternative resource numerical value subset of the P alternative resource numerical value subsets corresponding to the target interval is a first resource numerical value subset; the third information is used for determining at least one of the MCS adopted by the first radio signal and the radio resources occupied by the first radio signal, wherein the MCS adopted by the first radio signal is an MCS in the first MCS subset, a number of the radio resources occupied by the first radio signal is equal to a resource numerical value in the first resource numerical value subset.

According to one aspect of the present disclosure, the above method is characterized in that Q alternative interval sets respectively correspond to the Q Rx parameter groups, any alternative interval in the Q alternative interval sets is an interval of non-negative real numbers, the Q alternative interval sets respectively correspond to Q alternative MCS sets, the Q alternative interval sets respectively correspond to Q alternative resource numerical value sets; the P alternative intervals belong to one of the Q alternative interval sets, the P alternative MCS subsets belong to one of the Q alternative MCS sets, the P alternative resource numerical value subsets belong to one of the Q alternative resource numerical value sets.

According to one aspect of the present disclosure, the above method is characterized in comprising:
performing Y third-type measurement(s) in a third time window, the Y third-type measurement(s) is(are) respectively used for acquiring Y third-type measurement value(s), Y is a positive integer;
herein, a second-type measurement value acquired after performing the target second-type measurement is used for determining a first upper bound, a sum of the Y third-type measurement value(s) is no greater than the first upper bound, a time domain position of the third time window is related to time domain resources occupied by the first radio signal, the Y third-type measurement value(s) is(are) related to a number of time-frequency resources occupied by radio signal(s) transmitted by a transmitter of the first radio signal within the third time window, employing a Tx parameter group associated with a Rx parameter group of the Q Rx parameter groups corresponding to the target time-frequency resource pool.

The present disclosure provides a method in a second-type communication node used for wireless communication, comprising:

transmitting first information;

wherein X first-type measurement(s) performed in a target time-frequency resource pool is(are) respectively used for acquiring X first-type measurement value(s), X is a positive integer; the target time-frequency resource pool is one of Q alternative time-frequency resource pools, the Q alternative time-frequency resource pools respectively correspond to Q Rx parameter groups, any two Rx parameter groups of the Q Rx parameter groups are different, Q is a positive integer greater than 1; a Rx parameter group of the Q Rx parameter groups corresponding to the target time-frequency resource pool is associated with a Tx parameter group for a first radio signal; the X first-type measurement value(s) is(are) used for a target second-type measurement, the target second-type measurement is used for acquiring a second-type measurement value, the second-type measurement value acquired after performing the target second-type measurement is used for determining at least one of an MCS adopted by the first radio signal and radio resources occupied by the first radio signal; each of X1 first-type measurement value(s) out of the X first-type measurement value(s) is greater than a target threshold, the second-type measurement value acquired after performing the target second-type measurement is equal to a ratio of X1 to X, X1 is a non-negative integer not greater than X, the first information is used for determining the target threshold.

According to one aspect of the present disclosure, the above method is characterized in that the Q alternative time-frequency resource pools all belong to a first time window in time domain, the target second-type measurement is performed in a second time window, a time domain position of the second time window is used for determining the first time window, an end time of the first time window is no later than a start time of the second time window, and an end time of the second time window is no later than a start time of transmission of the first radio signal.

According to one aspect of the present disclosure, the above method is characterized in that the target time-frequency resource pool comprises X time-frequency unit(s), the X first-type measurement(s) is(are) respectively performed in the X time-frequency unit(s); a Rx parameter group of the Q Rx parameter groups corresponding to the target time-frequency resource pool is used for each first-type measurement of the X first-type measurement(s); a characteristic measurement value is a first-type measurement value of the X first-type measurement value(s), a first-type measurement value of the X first-type measurement value(s) used for acquiring the characteristic measurement value is performed in a characteristic time-frequency unit, the characteristic time-frequency unit is one of the X time-frequency unit(s), the characteristic time-frequency unit comprises X2 multicarrier symbol(s) in time domain, the characteristic measurement value is an average value of a sum of receiving power value(s) of each of the X2 multicarrier symbol(s) within a frequency domain resource occupied by the characteristic time-frequency unit.

According to one aspect of the present disclosure, the above method is characterized in that Q alternative thresholds respectively correspond to the Q Rx parameter groups, the target threshold is one of the Q alternative thresholds.

According to one aspect of the present disclosure, the above method is characterized in comprising:

transmitting second information;

herein, the second information is used for determining a Tx parameter group for a first radio signal.

According to one aspect of the present disclosure, the above method is characterized in comprising:

transmitting third information;

herein, a second-type measurement value acquired after performing the target second-type measurement belongs to a target interval, the target interval is one of P alternative intervals, any alternative interval of the P alternative intervals is an interval of non-negative real numbers, the P alternative intervals respectively correspond to P alternative MCS subsets, the P alternative intervals respectively correspond to P alternative resource numerical value subsets, P is a positive integer greater than 1; an alternative MCS subset of the P alternative MCS subsets corresponding to the target interval is a first MCS subset, an alternative resource numerical value subset of the P alternative resource numerical value subsets corresponding to the target interval is a first resource numerical value subset; the third information is used for determining at least one of the MCS adopted by the first radio signal and the radio resources occupied by the first radio signal, wherein the MCS adopted by the first radio signal is an MCS in the first MCS subset, a number of the radio resources occupied by the first radio signal is equal to a resource numerical value in the first resource numerical value subset.

According to one aspect of the present disclosure, the above method is characterized in that Q alternative interval sets respectively correspond to the Q Rx parameter groups, any alternative interval in the Q alternative interval sets is an interval of non-negative real numbers, the Q alternative interval sets respectively correspond to Q alternative MCS sets, the Q alternative interval sets respectively correspond to Q alternative resource numerical value sets; the P alternative intervals belong to one of the Q alternative interval sets, the P alternative MCS subsets belong to one of the Q alternative MCS sets, the P alternative resource numerical value subsets belong to one of the Q alternative resource numerical value sets.

The present disclosure provides a first-type communication node used for wireless communication, comprising:

a first measurer, performing X first-type measurement(s) in a target time-frequency resource pool, the X first-type measurement(s) respectively being used for acquiring X first-type measurement(s), X is a positive integer;

a second measurer, performing a target second-type measurement, the target second-type measurement being used for acquiring a second-type measurement value; and a first transceiver, transmitting a first radio signal;

wherein the target time-frequency resource pool is one of Q alternative time-frequency resource pools, the Q alternative time-frequency resource pools respectively correspond to Q Rx parameter groups, any two Rx parameter groups of the Q Rx parameter groups are different, Q is a positive integer greater than 1; a Rx parameter group of the Q Rx parameter groups corresponding to the target time-frequency resource pool is associated with a Tx parameter group for a first radio signal; the X first-type measurement value(s) is(are) used for the target second-type measurement, the second-type measurement value acquired after performing the target second-type measurement is used for determining at least one of an MCS adopted by the first radio signal and radio resources occupied by the first radio signal.

The present disclosure provides a second-type communication node used for wireless communication, comprising:

a second transmitter, transmitting first information;

herein, X first-type measurement(s) performed in a target time-frequency resource pool is(are) respectively used for acquiring X first-type measurement value(s), X is a positive integer; the target time-frequency resource pool is one of Q alternative time-frequency resource pools, the Q alternative time-frequency resource pools respectively correspond to Q Rx parameter groups, any two Rx parameter groups of the Q Rx parameter groups are different, Q is a positive integer greater than 1; a Rx parameter group of the Q Rx parameter groups corresponding to the target time-frequency resource pool is associated with a Tx parameter group for a first radio signal; the X first-type measurement value(s) is(are) used for a target second-type measurement, the target second-type measurement is used for acquiring a second-type measurement value, the second-type measurement value acquired after performing the target second-type measurement is used for determining at least one of an MCS adopted by the first radio signal and radio resources occupied by the first radio signal; each of X1 first-type measurement value(s) out of the X first-type measurement value(s) is greater than a target threshold, the second-type measurement value acquired after performing the target second-type measurement is equal to a ratio of X1 to X, X1 is a non-negative integer not greater than X, the first information is used for determining the target threshold.

In one embodiment, the present disclosure has the following advantages compared with prior art in LTE V2X:

The method in the present disclosure solves the problem of payload control of beamforming-based NR V2X.

The method in the present disclosure can determine according to the beam employed in transmission a time-frequency resource pool for measurement on payload status, with increasing accuracy and enabling the result of the measurement to better reflect requirements in actual transmission and scheduling.

The method in the present disclosure helps loosen requirement for the time limit of scheduling and ruling of the first radio signal, therefore, payload control can be performed by emergent businesses employing different beams.

The method in the present disclosure effectively provides support to payload control under multiple beams in favor of more diversified business transmission.

The method in the present disclosure can determine a suitable beam for actual transmission in accordance with measurements on payload status under multiple beams.

BRIEF DESCRIPTION OF THE DRAWINGS

Other features, objects and advantages of the present disclosure will become more apparent from the detailed description of non-restrictive embodiments taken in conjunction with the following drawings:

FIG. 15 illustrates a schematic diagram illustrating relations among P alternative intervals, P alternative MCS subsets and P alternative resource numerical value subsets according to one embodiment of the present disclosure;

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
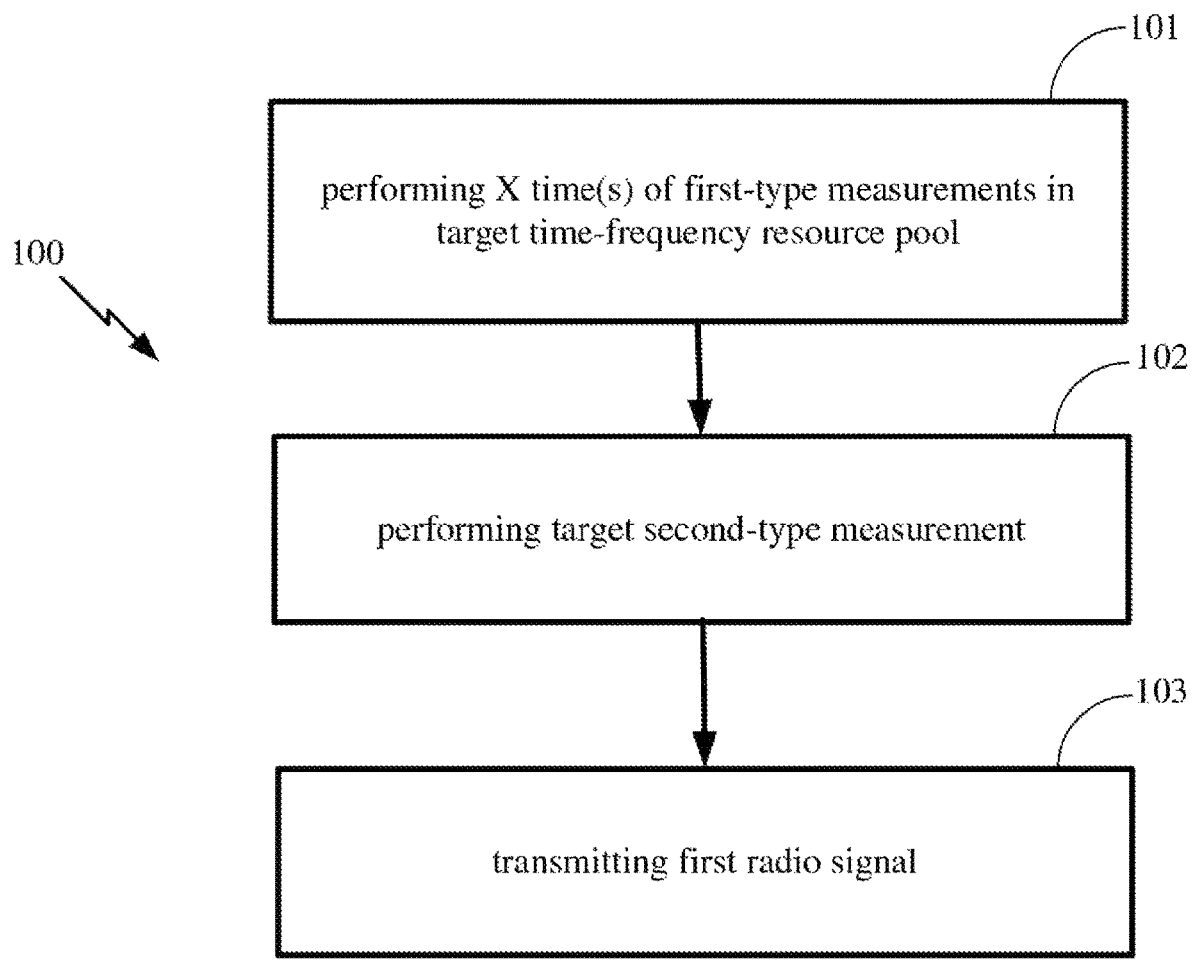
FIG. 1 illustrates a flowchart of X first-type measurement(s), a target second-type measurement and transmitting a first radio signal according to one embodiment of the present disclosure.

Embodiment 1 illustrates a flowchart of X first-type measurement(s), a target second-type measurement and transmitting a first radio signal according to one embodiment of the present disclosure, as shown in FIG. 1. In FIG. 1, each box represents a step.

In Embodiment 1, the first-type communication node in the present disclosure performs X first-type measurement(s) in a target time-frequency resource pool, the X first-type measurement(s) being respectively used for acquiring X first-type measurement(s), X is a positive integer; performs a target second-type measurement, the target second-type measurement being used for acquiring a second-type measurement value; and transmits a first radio signal; wherein, the target time-frequency resource pool is one of Q alternative time-frequency resource pools, the Q alternative time-frequency resource pools respectively correspond to Q Rx parameter groups, any two Rx parameter groups of the Q Rx parameter groups are different, Q is a positive integer greater than 1; a Rx parameter group of the Q Rx parameter groups corresponding to the target time-frequency resource pool is associated with the Tx parameter group for the first radio signal; the X first-type measurement value(s) is(are) used for the target second-type measurement, the second-type measurement value acquired after performing the target second-type measurement is used for determining at least one of an MCS adopted by the first radio signal and radio resources occupied by the first radio signal.

In one embodiment, one first-type measurement is one measurement on power values.

In one embodiment, one first-type measurement is one measurement on an average of power values on a given time-frequency resource.

In one embodiment, one first-type measurement is one measurement on energies.

In one embodiment, one first-type measurement is one measurement on Received Signal Strength Indicator (RSSI).

In one embodiment, one first-type measurement is one measurement on Sidelink Received Signal Strength Indicator (S-RSSI).

In one embodiment, one first-type measurement includes filtering in frequency domain.

In one embodiment, one first-type measurement includes filtering in a higher-layer filter.

In one embodiment, any first-type measurement value of the X first-type measurement value(s) is an RSSI value.

In one embodiment, any first-type measurement value of the X first-type measurement value(s) is an S-RSSI value.

In one embodiment, any first-type measurement value of the X first-type measurement value(s) is a power value.

In one embodiment, any first-type measurement value of the X first-type measurement value(s) is an energy value.

In one embodiment, a unit of any first-type measurement value of the X first-type measurement value(s) is dBm.

In one embodiment, a unit of any first-type measurement value of the X first-type measurement value(s) is Joule.

In one embodiment, any first-type measurement value of the X first-type measurement value(s) is an average value of a sum of receiving powers of all multicarrier symbols comprised within a frequency range of a time-frequency resource on which a corresponding measurement is performed.

In one embodiment, any first-type measurement value of the X first-type measurement value(s) is an average value of a sum of receiving energies of all multicarrier symbols comprised within a frequency range of a time-frequency resource on which a corresponding measurement is performed.

In one embodiment, any first-type measurement value of the X first-type measurement value(s) is an average value of a sum of receiving powers of partial multicarrier symbols comprised within a frequency range of a time-frequency resource on which a corresponding measurement is performed.

In one embodiment, any first-type measurement value of the X first-type measurement value(s) is an average value of a sum of receiving energies of partial multicarrier symbols comprised within a frequency range of a time-frequency resource on which a corresponding measurement is performed.

In one embodiment, the multi-carrier symbols are Orthogonal Frequency Division Multiplexing (OFDM) symbols.

In one embodiment, the multi-carrier symbols are Single Carrier-Frequency Division Multiple Access (SC-FDMA) symbols.

In one embodiment, the multi-carrier symbols are Discrete Fourier Transform Spread OFDM (DFT-S-OFDM) symbols.

In one embodiment, the multi-carrier symbols are Filter Bank Multi Carrier (FBMC) symbols.

In one embodiment, the multi-carrier symbols include Cyclic Prefix (CP).

In one embodiment, the target second-type measurement and any first-type measurement of the X first-type measurement(s) are two types of measurements.

In one embodiment, the target second-type measurement is one measurement on Channel Busy Ratio (CBR).

In one embodiment, the target second-type measurement is one measurement on Channel Busy Quantity (CBQ).

In one embodiment, the target second-type measurement is used for determining a channel occupancy status of the channel measured.

In one embodiment, the target second-type measurement is used for determining a channel occupancy status within a frequency range measured.

In one embodiment, a second-type measurement value is a CBR value.

In one embodiment, a second-type measurement value is a CBQ value.

In one embodiment, the first radio signal is transmitted via Sidelink.

In one embodiment, the first radio signal is transmitted by a PC5 interface.

In one embodiment, the first radio signal is unicast.

In one embodiment, the first radio signal is groupcast.

In one embodiment, the first radio signal is broadcast.

In one embodiment, the first radio signal carries a Transport Block (TB).

In one embodiment, the first radio signal carries Hybrid Automatic Repeat reQuest ACKnowledgement (HARQ-ACK) feedback.

In one embodiment, the first radio signal carries Channel State Information (CSI).

In one embodiment, the first radio signal carries Sidelink Control Information (SCI).

In one sub-embodiment of the above embodiment, the SCI comprises at least one of Scheduling Assignment (SA) information, HARQ-ACK feedback or CSI.

In one sub-embodiment of the above embodiment, the SCI comprises SA information.

In one sub-embodiment of the above embodiment, the SCI comprises HARQ-ACK feedback.

In one sub-embodiment of the above embodiment, the SCI comprises CSI.

In one embodiment, the first radio signal carries SA information.

In one embodiment, the first radio signal carries SCI and TB.

In one embodiment, the first radio signal carries at least one of SCI, SA, TB, HARQ-ACK or CSI.

In one embodiment, the first radio signal is transmitted on a Sidelink Shared Channel (SL-SCH).

In one embodiment, the first radio signal is transmitted on a Physical Sidelink Shared Channel (PSSCH).

In one embodiment, the first radio signal is transmitted on a Physical Sidelink Control Channel (PSCCH).

In one embodiment, the first radio signal is transmitted on a PSSCH and a PSCCH.

In one embodiment, a TB is sequentially subjected to CRC Insertion, Channel Coding, Rate Matching, Scrambling, Modulation, Layer Mapping, Precoding, Mapping to Resource Element, OFDM Baseband Signal Generation and Modulation and Upconversion to generate the first radio signal.

In one embodiment, a TB is sequentially subjected to CRC Insertion, Channel Coding, Rate Matching, Scrambling, Modulation, Layer Mappin, Precoding, Mapping to Virtual Resource Blocks, Mapping from Virtual to Physical Resource Blocks, OFDM Baseband Signal Generation and Modulation and Upconversion to generate the first radio signal.

In one embodiment, a TB is sequentially subjected to CRC Insertion, Segmentation, coding block-level CRC Insertion, Channel Coding, Rate Matching, Concatenation, Scrambling, Modulation, Layer Mapping, Precoding, Mapping to Resource Element, OFDM Baseband Signal Generation and Modulation and Upconversion to generate the first radio signal.

In one embodiment, a TB is sequentially subjected to CRC Insertion, Segmentation, coding block-level CRC Insertion, Channel Coding, Rate Matching, Concatenation, Scrambling, Modulation, Layer Mapping, Precoding, Mapping to Virtual Resource Blocks, Mapping from Virtual to Physical Resource Blocks, OFDM Baseband Signal Generation and Modulation and Upconversion to generate the first radio signal.

In one embodiment, each of X1 first-type measurement value(s) out of the X first-type measurement value(s) is greater than a target threshold, the second-type measurement value acquired after performing the target second-type measurement is equal to a ratio of X1 to X, X1 is a non-negative integer not greater than X, the target threshold is configurable, or the target threshold is fixed.

In one embodiment, each of X1 first-type measurement value(s) out of the X first-type measurement value(s) is greater than a target threshold, a second-type measurement value acquired after performing the target second-type measurement is equal to the X1, the X1 is a non-negative integer not greater than the X, the target threshold is configurable, or the target threshold is fixed.

In one embodiment, the phrase that "the X first-type measurement value(s) is(are) used for the target second-type measurement" refers to: The X first-type measurement value(s) is(are) used in the process of performing the target second-type measurement.

In one embodiment, the phrase that "the X first-type measurement value(s) is(are) used for the target second-type measurement" refers to: The X first-type measurement value(s) is(are) used as an input to the target second-type measurement.

In one embodiment, the phrase that "the X first-type measurement value(s) is(are) used for the target second-type measurement" refers to: The target second-type measurement is used for acquiring a second-type measurement value, the X first-type measurement value(s) is(are) used for acquiring the second-type measurement value.

In one embodiment, the phrase that "the second-type measurement value acquired after performing the target second-type measurement is used for determining at least one of an MCS adopted by the first radio signal and radio resources occupied by the first radio signal" includes: a second-type measurement value acquired after performing the target second-type measurement is used for determining an MCS adopted by the first radio signal and radio resources occupied by the first radio signal.

In one embodiment, the phrase that "the second-type measurement value acquired after performing the target second-type measurement is used for determining at least one of an MCS adopted by the first radio signal and radio resources occupied by the first radio signal" includes: a second-type measurement value acquired after performing the target second-type measurement is used for determining an MCS adopted by the first radio signal.

In one embodiment, the phrase that "the second-type measurement value acquired after performing the target second-type measurement is used for determining at least one of an MCS adopted by the first radio signal and radio resources occupied by the first radio signal" includes: a second-type measurement value acquired after performing the target second-type measurement is used for determining radio resources occupied by the first radio signal.

In one embodiment, the phrase that "the second-type measurement value acquired after performing the target second-type measurement is used for determining at least one of an MCS adopted by the first radio signal and radio resources occupied by the first radio signal" refers to: a second-type measurement value acquired after performing the target second-type measurement is used for determining based on a given correspondence relation at least one of an MCS adopted by the first radio signal and radio resources occupied by the first radio signal.

In one embodiment, an MCS adopted by the first radio signal is one of BPSK, Pi/2 BPSK, QPSK, 16QAM, 64QAM, 256QAM or 1024QAM.

In one embodiment, radio resources occupied by the first radio signal include: time domain resources occupied by the first radio signal.

In one embodiment, radio resources occupied by the first radio signal include: frequency domain resources occupied by the first radio signal.

In one embodiment, radio resources occupied by the first radio signal include: space domain resources occupied by the first radio signal.

In one embodiment, radio resources occupied by the first radio signal include: time domain resources and frequency domain resources occupied by the first radio signal.

In one embodiment, radio resources occupied by the first radio signal include: time domain resources, frequency domain resources and space domain resources occupied by the first radio signal.

In one embodiment, space domain resources occupied by the first radio signal include: Precoding Matrix Indicator (PMI) of the first radio signal.

In one embodiment, space domain resources occupied by the first radio signal include: a transmitting beam of the first radio signal.

In one embodiment, space domain resources occupied by the first radio signal include: spatial Tx parameters of the first radio signal.

In one embodiment, space domain resources occupied by the first radio signal include: transmitting spatial filtering of the first radio signal.

In one embodiment, radio resource occupied by the first radio signal include: an absolute number of radio resources occupied by the first radio signal.

In one embodiment, radio resource occupied by the first radio signal include: a number of multicarrier symbols occupied by the first radio signal.

In one embodiment, radio resource occupied by the first radio signal include: a number of sub-channels occupied by the first radio signal.

In one embodiment, radio resource occupied by the first radio signal include: a number of Physical Resource Blocks (PRBs) occupied by the first radio signal.

In one embodiment, the Q alternative time-frequency resource pools are pre-defined.

In one embodiment, the Q alternative time-frequency resource pools are fixed.

In one embodiment, the Q alternative time-frequency resource pools are configurable.

In one embodiment, the Q Rx parameter groups are respectively used for receiving radio signals on Q alternative time-frequency resource pools.

In one embodiment, time-frequency resources occupied by any two alternative time-frequency resource pools of the Q alternative time-frequency resource pools are different.

In one embodiment, there are two alternative time-frequency resource pools of the Q alternative time-frequency resource pools that comprise same time-frequency resources.

In one embodiment, time-frequency resources occupied by any two alternative time-frequency resource pools of the Q alternative time-frequency resource pools are the same.

In one embodiment, any two alternative time-frequency resource pools of the Q alternative time-frequency resource pools are orthogonal in time domain.

In one embodiment, there are two alternative time-frequency resource pools of the Q alternative time-frequency resource pools that are orthogonal in time domain.

In one embodiment, there are two alternative time-frequency resource pools of the Q alternative time-frequency resource pools that are overlapping (i.e., non-orthogonal) in time domain.

In one embodiment, any two alternative time-frequency resource pools of the Q alternative time-frequency resource pools are overlapping (i.e., non-orthogonal) in time domain.

In one embodiment, time domain resources respectively occupied by any two alternative time-frequency resource pools of the Q alternative time-frequency resource pools are the same.

In one embodiment, there are two alternative time-frequency resource pools of the Q alternative time-frequency resource pools that occupy same time domain resources, respectively.

In one embodiment, there are two alternative time-frequency resource pools of the Q alternative time-frequency resource pools that occupy different time domain resources, respectively.

In one embodiment, time domain resources respectively occupied by any two alternative time-frequency resource pools of the Q alternative time-frequency resource pools are different.

In one embodiment, any two alternative time-frequency resource pools of the Q alternative time-frequency resource pools are orthogonal (that is, non-overlapping) in frequency domain.

In one embodiment, there are two alternative time-frequency resource pools of the Q alternative time-frequency resource pools that are orthogonal (that is, non-overlapping) in frequency domain.

In one embodiment, any two alternative time-frequency resource pools of the Q alternative time-frequency resource pools are overlapping (that is, non-orthogonal) in frequency.

In one embodiment, there are two alternative time-frequency resource pools of the Q alternative time-frequency resource pools that are overlapping (that is, non-orthogonal) in frequency.

In one embodiment, frequency domain resources respectively occupied by any two alternative time-frequency resource pools of the Q alternative time-frequency resource pools are the same.

In one embodiment, there are two alternative time-frequency resource pools of the Q alternative time-frequency resource pools that occupy same frequency domain resources, respectively.

In one embodiment, frequency domain resources comprised in each alternative time-frequency resource pool of the Q alternative time-frequency resource pools belong to a first frequency sub-band.

In one sub-embodiment of the above embodiment, the first frequency sub-band comprises a positive integer number of subcarrier(s).

In one sub-embodiment of the above embodiment, the first frequency sub-band comprises a positive integer number of sub-band(s).

In one sub-embodiment of the above embodiment, the first frequency sub-band comprises a Bandwidth Part (BWP).

In one sub-embodiment of the above embodiment, the first frequency sub-band comprises a carrier.

In one embodiment, there are two alternative time-frequency resource pools of the Q alternative time-frequency resource pools that respectively comprise frequency domain resource belonging to a first frequency sub-band.

In one sub-embodiment of the above embodiment, the first frequency sub-band comprises a positive integer number of subcarrier(s).

In one sub-embodiment of the above embodiment, the first frequency sub-band comprises a positive integer number of sub-band(s).

In one sub-embodiment of the above embodiment, the first frequency sub-band comprises a BWP.

In one sub-embodiment of the above embodiment, the first frequency sub-band comprises a carrier.

In one embodiment, any two alternative time-frequency resource pools of the Q alternative time-frequency resource pools belong to different BWPs, respectively.

In one embodiment, there are two alternative time-frequency resource pools of the Q alternative time-frequency resource pools that belong to different BWPs, respectively.

In one embodiment, any two alternative time-frequency resource pools of the Q alternative time-frequency resource pools belong to different carriers, respectively.

In one embodiment, there are two alternative time-frequency resource pools of the Q alternative time-frequency resource pools that belong to different carriers, respectively.

In one embodiment, any two alternative time-frequency resource pools of the Q alternative time-frequency resource pools belong to different sub-bands, respectively.

In one embodiment, there are two alternative time-frequency resource pools of the Q alternative time-frequency resource pools that belong to different sub-bands, respectively.

In one embodiment, each Rx parameter group of the Q Rx parameter groups comprises a receiving beam.

In one embodiment, each Rx parameter group of the Q Rx parameter groups comprises a receiving spatial filtering.

In one embodiment, each Rx parameter group of the Q Rx parameter groups comprises Spatial Rx parameters.

In one embodiment, the Tx parameter group for the first radio signal comprises a transmitting beam.

In one embodiment, the Tx parameter group for the first radio signal comprises Spatial Tx parameters.

In one embodiment, the Tx parameter group for the first radio signal comprises a transmitting spatial filtering.

In one embodiment, the target time-frequency resource pool is the only one alternative time-frequency resource pool of the Q time-frequency resource pools that meets the following condition: one corresponding Rx parameter group of the Q Rx parameter groups is associated with the Tx parameter group for the first radio signal.

In one embodiment, the target time-frequency resource pool is one of q alternative time-frequency resource pools out of the Q alternative time-frequency resource pools, q is a positive integer greater than 1 and no greater than Q, each of the q alternative time-frequency resource pools meets the following condition: one corresponding Rx parameter group of the Q Rx parameter groups is associated with the Tx parameter group for the first radio signal.

In one sub-embodiment of the above embodiment, the q is less than the Q.

In one sub-embodiment of the above embodiment, the q is equal to the Q.

In one embodiment, a position of the target time-frequency resource pool in the Q alternative time-frequency resource pools is related to a Tx parameter for the first radio signal.

In one sub-embodiment of the above embodiment, the Q alternative time-frequency resource pools are indexed in sequence, the position of the target time-frequency resource pool in the Q alternative time-frequency resource pools is an index of the target time-frequency resource pool in the Q alternative time-frequency resource pools.

In one sub-embodiment of the above embodiment, the Q alternative time-frequency resource pools are arranged in order, the position of the target time-frequency resource pool in the Q alternative time-frequency resource pools is a sequential order of the target time-frequency resource pool in the Q alternative time-frequency resource pools.

In one embodiment, the Tx parameter group for the first radio signal is used for determining the target time-frequency resource pool out of the Q alternative time-frequency resource pools.

In one embodiment, one of the Q Rx parameter groups corresponding to the target time-frequency resource pool is used for determining the Tx parameter group for the first radio signal.

Embodiment 2

Figure 2:
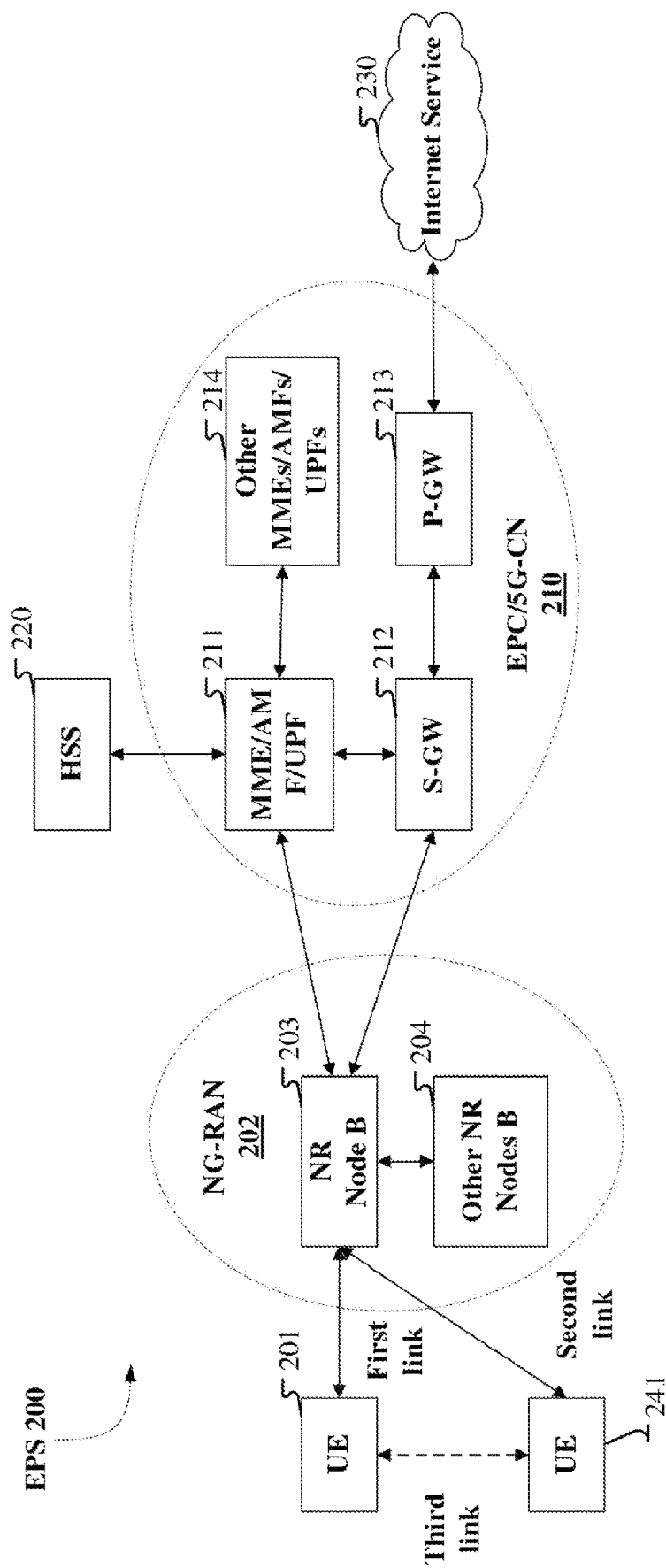
FIG. 2 illustrates a schematic diagram of a network architecture according to one embodiment of the present disclosure.

Embodiment 2 illustrates a schematic diagram of a network architecture according to the present disclosure, as shown in FIG. 2. FIG. 2 is a is a diagram illustrating a network architecture 200 of NR 5G, Long-Term Evolution (LTE) and Long-Term Evolution Advanced (LTE-A) systems. The NR 5G or LTE network architecture 200 may be called an Evolved Packet System (EPS) 200. The EPS 200 may comprise one or more UEs 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services or other cellular networks. The NG-RAN 202 comprises an NR node B (gNB) 203 and other gNBs 204. The gNB 203 provides UE 201 oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. In V2X networks, the gNB 203 may be a base station, a ground base station relayed by satellites or a Road Side Unit (RSU). The gNB 203 provides an access point of the EPC/5G-CN 210 for the UE 201. Examples of UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, games consoles, unmanned aerial vehicles, air vehicles, narrowband physical network equipment, machine-type communication equipment, land vehicles, automobiles, vehicle-mounted communication units, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client, a vehicle terminal, V2X equipment or some other appropriate terms. The gNB 203 is connected to the EPC/5G-CN 210 via an S1/NG interface. The EPC/5G-CN 210 comprises a MME/AMF/UPF 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming (PSS) services.

In one embodiment, the UE 201 corresponds to the first-type communication node in the present disclosure.

In one embodiment, the UE 201 supports sidelink transmission.

In one embodiment, the UE 201 supports PC5 interface.

In one embodiment, the UE 201 supports Vehicle-to-Everything.

In one embodiment, the UE 201 supports V2X business.

In one embodiment, the gNB 203 corresponds to the second-type communication node.

In one embodiment, the gNB 203 supports Vehicle-to-Everything.

In one embodiment, the gNB 203 supports V2X business.

Embodiment 3

Figure 3:
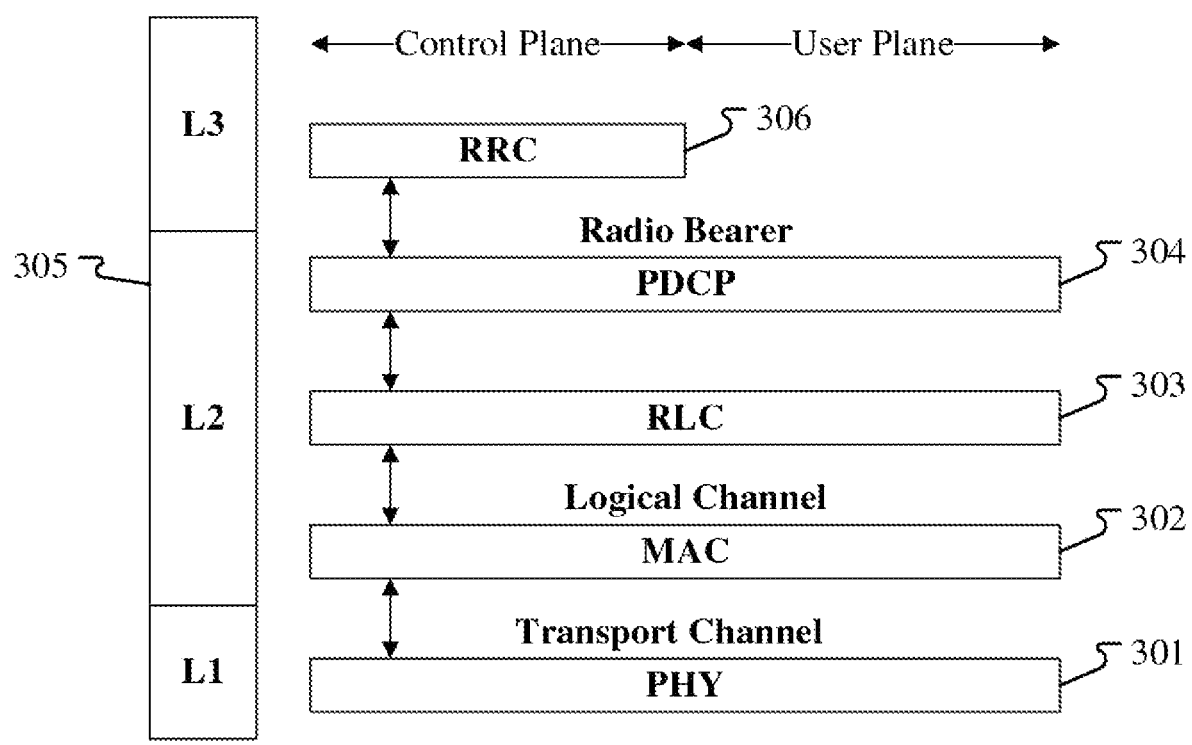
FIG. 3 illustrates a schematic diagram of a radio protocol architecture of a user plane and a control plane according to one embodiment of the present disclosure.

Embodiment 3 illustrates a schematic diagram of an embodiment of a radio protocol architecture of a user plane and a control plane according to the present disclosure, as shown in FIG. 3. FIG. 3 is a schematic diagram illustrating an embodiment of a radio protocol architecture of a user plane and a control plane. In FIG. 3, the radio protocol architecture between a first-type communication node (UE) and a second-type communication node (gNB, eNB or RSU in V2X), or between two first-type communication nodes (UE) is represented by three layers, which are a layer 1, a layer 2 and a layer 3, respectively. The layer 1 (L1) is the lowest layer and performs signal processing functions of PHY layers. The L1 is called PHY 301 in the present disclosure. The layer 2 (L2) 305 is above the PHY 301, and is in charge of the link between the first-type communication node and the second-type communication node, and a link between two first-type communication nodes via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the second-type communication node of the network side. Although not described in FIG. 3, the UE may comprise several higher layers above the L2 305, such as a network layer (i.e., IP layer) terminated at a P-GW 213 of the network side and an application layer terminated at the other side of the connection (i.e., a peer UE, a server, etc.). The PDCP sublayer 304 provides multiplexing among variable radio bearers and logical channels. The PDCP sublayer 304 also provides a header compression for a higher-layer packet so as to reduce a radio transmission overhead. The PDCP sublayer 304 provides security by encrypting a packet and provides support for handover of the first-type communication node between second-type communication nodes. The RLC sublayer 303 provides segmentation and reassembling of a higher-layer packet, retransmission of a lost packet, and reordering of a packet so as to compensate the disordered receiving caused by HARQ. The MAC sublayer 302 provides multiplexing between a logical channel and a transport channel. The MAC sublayer 302 is also responsible for allocating between first-type communication nodes various radio resources (i.e., resources block) in a cell. The MAC sublayer 302 is also in charge of HARQ operation. In the control plane, the radio protocol architecture of the first-type communication node and the second-type communication node is almost the same as the radio protocol architecture in the user plane on the PHY 301 and the L2 305, but there is no header compression for the control plane. The control plane also comprises a Radio Resource Control (RRC) sublayer 306 in the layer 3 (L3). The RRC sublayer 306 is responsible for acquiring radio resources (i.e., radio bearer) and configuring the lower layer using an RRC signaling between the second-type communication node and the first-type communication node.

In one embodiment, the radio protocol architecture in FIG. 3 is applicable to the first-type communication node in the present disclosure.

In one embodiment, the radio protocol architecture in FIG. 3 is applicable to the second-type communication node in the present disclosure.

In one embodiment, the X first-type measurement value(s) in the present disclosure is(are) acquired on the RRC sublayer 306.

In one embodiment, the X first-type measurement value(s) in the present disclosure is(are) acquired on the MAC sublayer 302.

In one embodiment, the X first-type measurement value(s) in the present disclosure is(are) acquired on the PHY 301.

In one embodiment, the Q0 group(s) of first-type measurement values in the present disclosure is(are) acquired on the RRC sublayer 306.

In one embodiment, the Q0 group(s) of first-type measurement values in the present disclosure is(are) acquired on the MAC sublayer 302.

In one embodiment, the Q0 group(s) of first-type measurement values in the present disclosure is(are) acquired on the PHY 301.

In one embodiment, the second-type measurement value in the present disclosure is acquired on the RRC sublayer 306.

In one embodiment, the second-type measurement value in the present disclosure is acquired on the MAC sublayer 302.

In one embodiment, the second-type measurement value in the present disclosure is acquired on the PHY 301.

In one embodiment, the Q1 second-type measurement value(s) in the present disclosure is(are) acquired on the RRC sublayer 306.

In one embodiment, the Q1 second-type measurement value(s) in the present disclosure is(are) acquired on the MAC sublayer 302.

In one embodiment, the Q1 second-type measurement value(s) in the present disclosure is(are) acquired on the PHY 301.

In one embodiment, the first radio signal in the present disclosure is generated by the RRC sublayer 306.

In one embodiment, the first radio signal in the present disclosure is generated by the MAC sublayer 302.

one embodiment, the first radio signal in the present disclosure is generated by the PHY 301.

In one embodiment, the Y third-type measurement value(s) in the present disclosure is(are) acquired on the RRC sublayer 306.

In one embodiment, the Y third-type measurement value(s) in the present disclosure is(are) acquired on the MAC sublayer 302.

In one embodiment, the Y third-type measurement value(s) in the present disclosure is(are) acquired on the PHY 301.

In one embodiment, the first information in the present disclosure is generated by the RRC sublayer 306.

In one embodiment, the first information in the present disclosure is generated by the MAC sublayer 302.

In one embodiment, the first information in the present disclosure is generated by the PHY 301.

In one embodiment, the third information in the present disclosure is generated by the RRC sublayer 306.

In one embodiment, the third information in the present disclosure is generated by the MAC sublayer 302.

In one embodiment, the third information in the present disclosure is generated by the PHY 301.

In one embodiment, the second information in the present disclosure is generate by the RRC sublayer 306.

In one embodiment, the second information in the present disclosure is generate by the MAC sublayer 302.

In one embodiment, the second information in the present disclosure is generate by the PHY 301.

In one embodiment, the first signaling in the present disclosure is generated by the RRC sublayer 306.

In one embodiment, the first signaling in the present disclosure is generated by the PHY 301.

Embodiment 4

Figure 4:
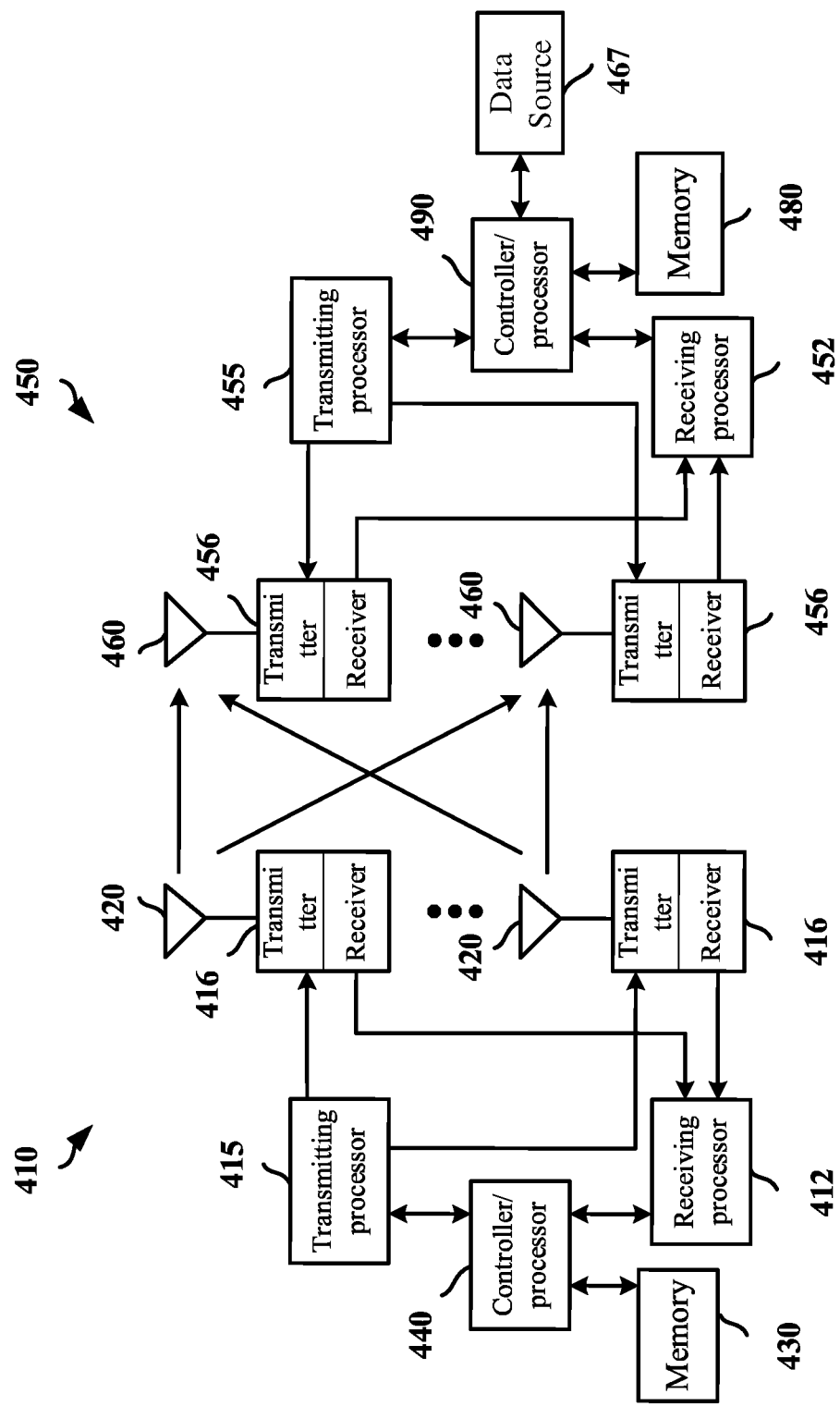
FIG. 4 illustrates a schematic diagram of a first-type communication node and a second-type communication node according to one embodiment of the present disclosure.

Embodiment 4 illustrates a schematic diagram of a first-type communication node and a second-type communication node according to the present disclosure, as shown in FIG. 4.

The first-type communication node (450) comprises a controller/processor 490, a memory 480, a receiving processor 452, a transmitter/receiver 456, a transmitting processor 455 and a data source 467, wherein the transmitter/receiver 456 comprises an antenna 460. The data source 467 provides a higher-layer packet to the controller/processor 490, the controller/processor 490 provides header compression and decompression, encryption and decryption, packet segmentation and reordering and multiplexing and demultiplexing between a logical channel and a transport channel so as to implement the L2 layer protocols used for the user plane and the control plane. The higher layer packet may comprise data or control information, such as DL-SCH, UL-SCH or SL-SCH. The transmitting processor 455 performs various signal transmitting processing functions of the L1 layer (that is, PHY), including coding, interleaving, scrambling, modulation, power control/allocation, precoding and physical layer signaling generation. The receiving processor 452 performs various signal receiving processing functions of the L1 layer (that is, PHY), including decoding, de-interleaving, descrambling, demodulation, de-precoding and physical layer control signaling extraction. The transmitter of the transmitter/receiver 456 is configured to convert a baseband signal provided by the transmitting processor 455 into a radio frequency (RF) signal to be transmitted via the antenna 460, the receiver of the transmitter/receiver 456 is configured to convert the RF signal received via the antenna 460 into a baseband signal to be provided to the receiving processor 452.

The second-type communication node (410) may comprise a controller/processor 440, a memory 430, a receiving processor 412, a transmitter/receiver 416 and a transmitting processor 415, wherein the transmitter/receiver 416 comprises an antenna 420. A higher layer packet is provided to the controller/processor 440, the controller/processor 440 provides header compression and decompression, encryption and decryption, packet segmentation and reordering and multiplexing and demultiplexing between a logical channel and a transport channel, so as to implement the L2 layer protocols used for the user plane and the control plane. The higher layer packet may comprise data or control information, such as DL-SCH or UL-SCH. The transmitting processor 415 performs various signal transmitting processing functions of the L1 layer (that is, PHY), including coding, interleaving, scrambling, modulation, power control/allocation, precoding and physical layer signaling (i.e., synchronization signal, reference signal, etc.) generation. The receiving processor 412 performs various signal receiving processing functions of the L1 layer (that is, PHY), including decoding, de-interleaving, descrambling, demodulation, de-precoding and physical layer signaling extraction. The transmitter of the transmitter/receiver 416 is configured to convert a baseband signal provided by the transmitting processor 415 into a RF signal to be transmitted via the antenna 420, the receiver of the transmitter/receiver 416 is configured to convert the RF signal received via the antenna 420 into a baseband signal to be provided to the receiving processor 412.

In Downlink (DL) transmission, a higher layer packet (for example, first information, third information and second information in the present disclosure) is provided to the controller/processor 440. The controller/processor 440 implements the functionality of the L2 layer. In DL transmission, the controller/processor 440 provides header compression, encryption, packet segmentation and reordering and multiplexing between a logical channel and a transport channel, as well as radio resource allocation for the first-type communication node 450 based on varied priorities. The controller/processor 440 is also in charge of HARQ operation, retransmission of a lost packet, and a signaling to the first-type communication node 450, for instance, the first information, the third information and the second information in the present disclosure are all generated in the controller/processor 440. The transmitting processor 415 performs signal processing functions of the L1 layer (that is, PHY), including coding, interleaving, scrambling, modulation, power control/allocation, precoding and physical layer control signaling generation. Generation of physical layer signals carrying the first information, the third information and the second information of the present disclosure is performed in the transmitting processor 415. Modulated signals are divided into parallel streams and each stream is mapped onto corresponding multicarrier subcarriers and/or multicarrier symbols, which are then mapped from the transmitting processor 415 to the antenna 420 via the transmitter of the transmitter/receiver 416 to be transmitted in the form of RF signals. Corresponding channels of the first information, the third information and the second information of the present disclosure on physical layer are mapped from the transmitting processor 415 to target radio resources and then mapped from the transmitter of the transmitter/receiver 416 to the antenna 420 to be transmitted in the form of RF signals. At the receiving side, the receiver of each transmitter/receiver 456 receives an RF signal via a corresponding antenna 460, the receiver of each transmitter/receiver 456 recovers baseband information modulated to the RF carrier and provides the baseband information to the receiving processor 452. The receiving processor 452 performs signal receiving processing functions of the L1 layer. The signal receiving processing functions include reception of physical layer signals carrying the first information, third information and second information of the present disclosure, demodulation of multicarrier symbols in multicarrier symbol streams based on each modulation scheme (e.g., BPSK, QPSK), and then descrambling, decoding and de-interleaving of the demodulated symbols so as to recover data or control signals transmitted by the second-type communication node 410 on a physical channel, and the data or control signals are later provided to the controller/processor 490. The controller/processor 490 implements the functionality of the L2 layer, the controller/processor 490 interprets the first information, the third information and the second information of the present disclosure. The controller/processor 490 may be connected to the memory 480 that stores program codes and data. The memory 480 can be called a computer readable medium.

In one embodiment, the first-type communication node 450 comprises at least one processor and at least one memory, the at least one memory comprises computer program codes; the at least one memory and the computer program codes are configured to be used in collaboration with the at least one processor, the first-type communication node 450 at least performs X first-type measurement(s) in a target time-frequency resource pool, the X first-type measurement(s) being respectively used for acquiring X first-type measurement value(s), X is a positive integer; performs a target second-type measurement, the target second-type measurement being used for acquiring a second-type measurement value; and transmits a first radio signal; wherein the target time-frequency resource pool is one of Q alternative time-frequency resource pools, the Q alternative time-frequency resource pools respectively correspond to Q Rx parameter groups, any two Rx parameter groups of the Q Rx parameter groups are different, Q is a positive integer greater than 1; a Rx parameter group of the Q Rx parameter groups corresponding to the target time-frequency resource pool is associated with the Tx parameter group for the first radio signal; the X first-type measurement value(s) is(are) used for the target second-type measurement, the second-type measurement value acquired after performing the target second-type measurement is used for determining at least one of an MCS adopted by the first radio signal and radio resources occupied by the first radio signal.

In one embodiment, the first-type communication node 450 comprises a memory that stores computer readable instruction program, the computer readable instruction program generates an action when executed by at least one processor, the action includes: performing X first-type measurement(s) in a target time-frequency resource pool, the X first-type measurement(s) being respectively used for acquiring X first-type measurement value(s), X is a positive integer; performing a target second-type measurement, the target second-type measurement being used for acquiring a second-type measurement value; and transmitting a first radio signal; wherein the target time-frequency resource pool is one of Q alternative time-frequency resource pools, the Q alternative time-frequency resource pools respectively correspond to Q Receive (Rx) parameter groups, any two Rx parameter groups of the Q Rx parameter groups are different, Q is a positive integer greater than 1; a Rx parameter group of the Q Rx parameter groups corresponding to the target time-frequency resource pool is associated with a Transmit(Tx) parameter group for the first radio signal; the X first-type measurement value(s) is(are) used for the target second-type measurement, the second-type measurement value acquired after performing the target second-type measurement is used for determining at least one of an MCS adopted by the first radio signal and radio resources occupied by the first radio signal.

In one embodiment, the second-type communication node 410 comprises at least one processor and at least one memory, the at least one memory comprises computer program codes; the at least one memory and the computer program codes are configured to be used in collaboration with the at least one processor. The second-type communication node 450 at least transmits first information; wherein X first-type measurement(s) performed in a target time-frequency resource pool is(are) respectively used for acquiring X first-type measurement value(s), X is a positive integer; the target time-frequency resource pool is one of Q alternative time-frequency resource pools, the Q alternative time-frequency resource pools respectively correspond to Q Rx parameter groups, any two Rx parameter groups of the Q Rx parameter groups are different, Q is a positive integer greater than 1; a Rx parameter group of the Q Rx parameter groups corresponding to the target time-frequency resource pool is associated with the Tx parameter group for the first radio signal; the X first-type measurement value(s) is(are) used for a target second-type measurement, the target second-type measurement is used for acquiring a second-type measurement value, the second-type measurement value acquired after performing the target second-type measurement is used for determining at least one of an MCS adopted by the first radio signal and radio resources occupied by the first radio signal; each of X1 first-type measurement value(s) out of the X first-type measurement value(s) is greater than a target threshold, the second-type measurement value acquired after performing the target second-type measurement is equal to a ratio of X1 to X, X1 is a non-negative integer not greater than X, the first information is used for determining the target threshold.

In one embodiment, the second-type communication node 410 comprises a memory that stores computer readable instruction program, the computer readable instruction program generates an action when executed by at least one processor, the action includes: transmitting first information; wherein X first-type measurement(s) performed in a target time-frequency resource pool is(are) respectively used for acquiring X first-type measurement value(s), X is a positive integer; the target time-frequency resource pool is one of Q alternative time-frequency resource pools, the Q alternative time-frequency resource pools respectively correspond to Q Rx parameter groups, any two Rx parameter groups of the Q Rx parameter groups are different, Q is a positive integer greater than 1; a Rx parameter group of the Q Rx parameter groups corresponding to the target time-frequency resource pool is associated with the Tx parameter group for the first radio signal; the X first-type measurement value(s) is(are) used for a target second-type measurement, the target second-type measurement is used for acquiring a second-type measurement value, the second-type measurement value acquired after performing the target second-type measurement is used for determining at least one of an MCS adopted by the first radio signal and radio resources occupied by the first radio signal; each of X1 first-type measurement value(s) out of the X first-type measurement value(s) is greater than a target threshold, the second-type measurement value acquired after performing the target second-type measurement is equal to a ratio of X1 to X, X1 is a non-negative integer not greater than X, the first information is used for determining the target threshold.

In one embodiment, the receiver of the transmitter/receiver 456 (including the antenna 460), the receiving processor 452 and the controller/processor 490 are used for receiving the first information in the present disclosure.

In one embodiment, the transmitter of the transmitter/receiver 416 (including the antenna 420), the transmitting processor 415 and the controller/processor 440 are used for transmitting the first information in the present disclosure.

In one embodiment, the receiver of the transmitter/receiver 456 (including the antenna 460), the receiving processor 452 and the controller/processor 490 are used for receiving the third information in the present disclosure.

In one embodiment, the transmitter of the transmitter/receiver 416 (including the antenna 420), the transmitting processor 415 and the controller/processor 440 are used for transmitting the third information in the present disclosure.

In one embodiment, the receiver of the transmitter/receiver 456 (including the antenna 460), the receiving processor 452 and the controller/processor 490 are used for receiving the second information in the present disclosure.

In one embodiment, the transmitter of the transmitter/receiver 416 (including the antenna 420), the transmitting processor 415 and the controller/processor 440 are used for transmitting the second information in the present disclosure.

Embodiment 5

Figure 5:
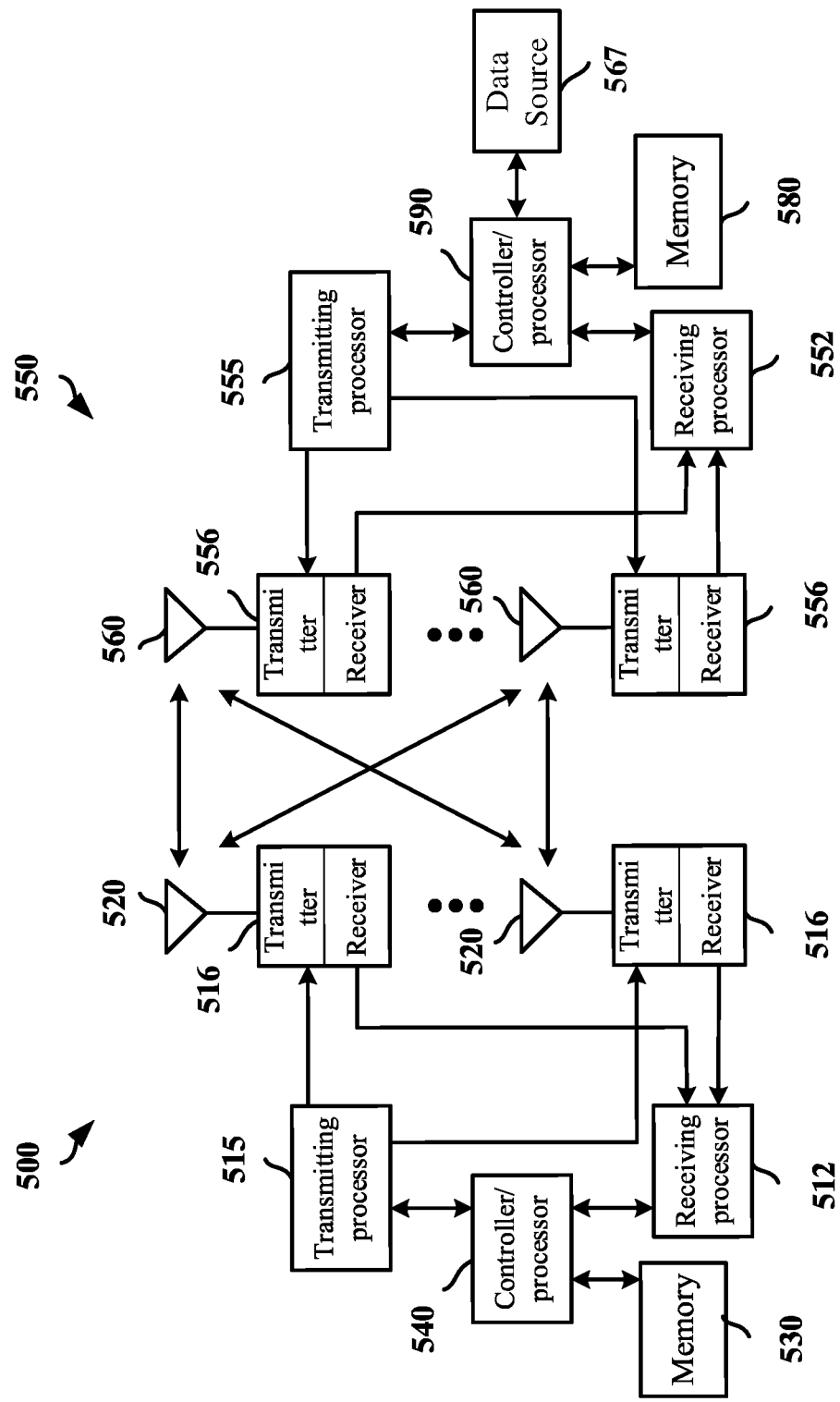
FIG. 5 illustrates a schematic diagram of two first-type communication nodes according to one embodiment of the present disclosure.

Embodiment 5 illustrates a schematic diagram of two first-type communication nodes according to one embodiment of the present disclosure, as shown in FIG. 5.

A first-type communication node (550) comprises a controller/processor 590, a memory 580, a receiving processor 552, a transmitter/receiver 556, a transmitting processor 555 and a data source 567, wherein the transmitter/receiver 556 comprises an antenna 560. The data source 567 provides a higher layer packet to the controller/processor 590, the controller/processor 590 provides header compression and decompression, encryption and decryption, packet segmentation and reordering and multiplexing and demultiplexing between a logical channel and a transport channel so as to implement protocols of the L2 layer. The higher layer packet may comprise data or control information, such as SL-SCH. The transmitting processor 555 performs various signal transmitting processing functions of the L1 layer (i.e., PHY), including coding, interleaving, scrambling, modulation, power control/allocation, precoding and physical layer control signaling generation. The receiving processor 552 performs various signal receiving processing functions of the L1 layer (i.e., PHY), including decoding, de-interleaving, descrambling, demodulation, de-precoding and physical layer control signaling extraction. The transmitter of the transmitter/receiver 556 is configured to convert a baseband signal provided by the transmitting processor 555 into an RF signal to be transmitted via the antenna 560, the receiver of the transmitter/receiver 556 is configured to convert the RF signal received via the antenna 560 into a baseband signal to be provided to the receiving processor 552. The composition of another first-type communication node (500) is the same as that of the first-type communication node 550.

In sidelink transmission, a higher layer packet (e.g., the first radio signal in the present disclosure) is provided to the controller/processor 540, the controller/processor 540 implements the functionality of the L2 layer. In sidelink transmission, the controller/processor 540 provides header compression, encryption, packet segmentation and reordering, and multiplexing between a logical channel and a transport channel. The controller/processor 540 is also responsible for HARQ operation (if supportive), repeated transmission, and a signaling to the first-type communication node 550. The transmitting processor 515 performs various signal processing functions of the L1 layer (that is, PHY), including coding, interleaving, scrambling, modulation, power control/allocation, precoding and physical layer control signaling generation. Generation of a physical layer signal carrying the first signaling of the present disclosure is performed in the transmitting processor 515. Modulated signals are divided into parallel streams and each stream is mapped onto corresponding multicarrier subcarriers and/or multicarrier symbols, which are then mapped from the transmitting processor 515 to the antenna 520 via a transmitter of a receiver/transmitter 516 to be transmitted in the form of RF signals. At the receiving side, the receiver of each transmitter/receiver 556 receives an RF signal via a corresponding antenna 560, the receiver of each transmitter/receiver 556 recovers baseband information modulated to the RF carrier and provides the baseband information to the receiving processor 552. The receiving processor 552 performs signal receiving processing functions of the L1 layer. The signal receiving processing functions include reception of physical layer signals carrying the first signaling and the first radio signal of the present disclosure, demodulation of multicarrier symbols in multicarrier symbol streams based on each modulation scheme (e.g., BPSK, QPSK), and then descrambling, decoding and de-interleaving of the demodulated symbols so as to recover data or control signals transmitted by the first-type communication node 500 on a physical channel, and the data or control signals are later provided to the controller/processor 590. The controller/processor 590 implements the functionality of the L2 layer, the controller/processor 590 interprets the first radio signal of the present disclosure. The controller/processor 590 may be connected to the memory 580 that stores program codes and data. The memory 580 can be called a computer readable medium. Particularly, in the first-type communication node 500, RF signals measured by the X first-type communication measurement(s) in the present disclosure are received by a receiver of the receiver/transmitter 516, are then subjected to processing and measurement by the receiving processor 512, after that these signals are provided to the controller/processor 540 for filtering. The controller/processor 540 performs the target second-type measurement in the present disclosure according to result of X first-type measurement(s). Y third-type measurement(s) of the present disclosure is(are) performed in the controller/processor 540.

In one embodiment, the first-type communication node (500) comprises at least one processor and at least one memory, the at least one memory comprises computer program codes; the at least one memory and the computer program codes are configured to be used in collaboration with the at least one processor. The first-type communication node (500) at least performs X first-type measurement(s) in a target time-frequency resource pool, the X first-type measurement(s) being respectively used for acquiring X first-type measurement value(s), X is a positive integer; performs a target second-type measurement, the target second-type measurement being used for acquiring a second-type measurement value; and transmits a first radio signal; wherein the target time-frequency resource pool is one of Q alternative time-frequency resource pools, the Q alternative time-frequency resource pools respectively correspond to Q Rx parameter groups, any two Rx parameter groups of the Q Rx parameter groups are different, Q is a positive integer greater than 1; a Rx parameter group of the Q Rx parameter groups corresponding to the target time-frequency resource pool is associated with the Tx parameter group for the first radio signal; the X first-type measurement value(s) is(are) used for the target second-type measurement, the second-type measurement value acquired after performing the target second-type measurement is used for determining at least one of an MCS adopted by the first radio signal and radio resources occupied by the first radio signal.

In one embodiment, the first-type communication node (500) comprises a memory that stores computer readable instruction program, the computer readable instruction program generates an action when executed by at least one processor, the action includes: performing X first-type measurement(s) in a target time-frequency resource pool, the X first-type measurement(s) being respectively used for acquiring X first-type measurement value(s), X is a positive integer; performing a target second-type measurement, the target second-type measurement being used for acquiring a second-type measurement value; and transmitting a first radio signal; wherein the target time-frequency resource pool is one of Q alternative time-frequency resource pools, the Q alternative time-frequency resource pools respectively correspond to Q Receive (Rx) parameter groups, any two Rx parameter groups of the Q Rx parameter groups are different, Q is a positive integer greater than 1; a Rx parameter group of the Q Rx parameter groups corresponding to the target time-frequency resource pool is associated with a Transmit(Tx) parameter group for the first radio signal; the X first-type measurement value(s) is(are) used for the target second-type measurement, the second-type measurement value acquired after performing the target second-type measurement is used for determining at least one of an MCS adopted by the first radio signal and radio resources occupied by the first radio signal.

In one embodiment, the transmitter of the receiver/transmitter 516 (including the antenna 520), the transmitting processor 515 and the controller/processor 540 are used for transmitting the first radio signal in the present disclosure.

In one embodiment, the receiver of the transmitter/receiver 556 (including the antenna 560), the receiving processor 552 and the controller/processor 590 are used for receiving the first radio signal in the present disclosure.

In one embodiment, the transmitter of the receiver/transmitter 516 (including the antenna 520), the transmitting processor 515 and the controller/processor 540 are used for transmitting the first signaling in the present disclosure.

In one embodiment, the receiver of the transmitter/receiver 556 (including the antenna 560), the receiving processor 552 and the controller/processor 590 are used for receiving the first signaling in the present disclosure.

In one embodiment, the receiver of the receiver/transmitter 516 (including the antenna 520), the receiving processor 512 and the controller/processor 540 are used for performing the X first-type measurement(s) in the present disclosure.

In one embodiment, the receiver of the receiver/transmitter 516 (including the antenna 520), the receiving processor 512 and the controller/processor 540 are used for performing the Q0 group(s) of first-type measurements in the present disclosure.

In one embodiment, the controller/processor 540 is used for performing the target second-type measurement in the present disclosure.

In one embodiment, the controller/processor 540 is used for performing the Q1 second-type measurement(s) in the present disclosure.

In one embodiment, the controller/processor 540 is used for performing the Y third-type measurement(s) in the present disclosure.

In one embodiment, the controller/processor 540 is used for determining a target time-frequency resource pool out of the Q alternative time-frequency resource pools.

Embodiment 6

Figure 6:
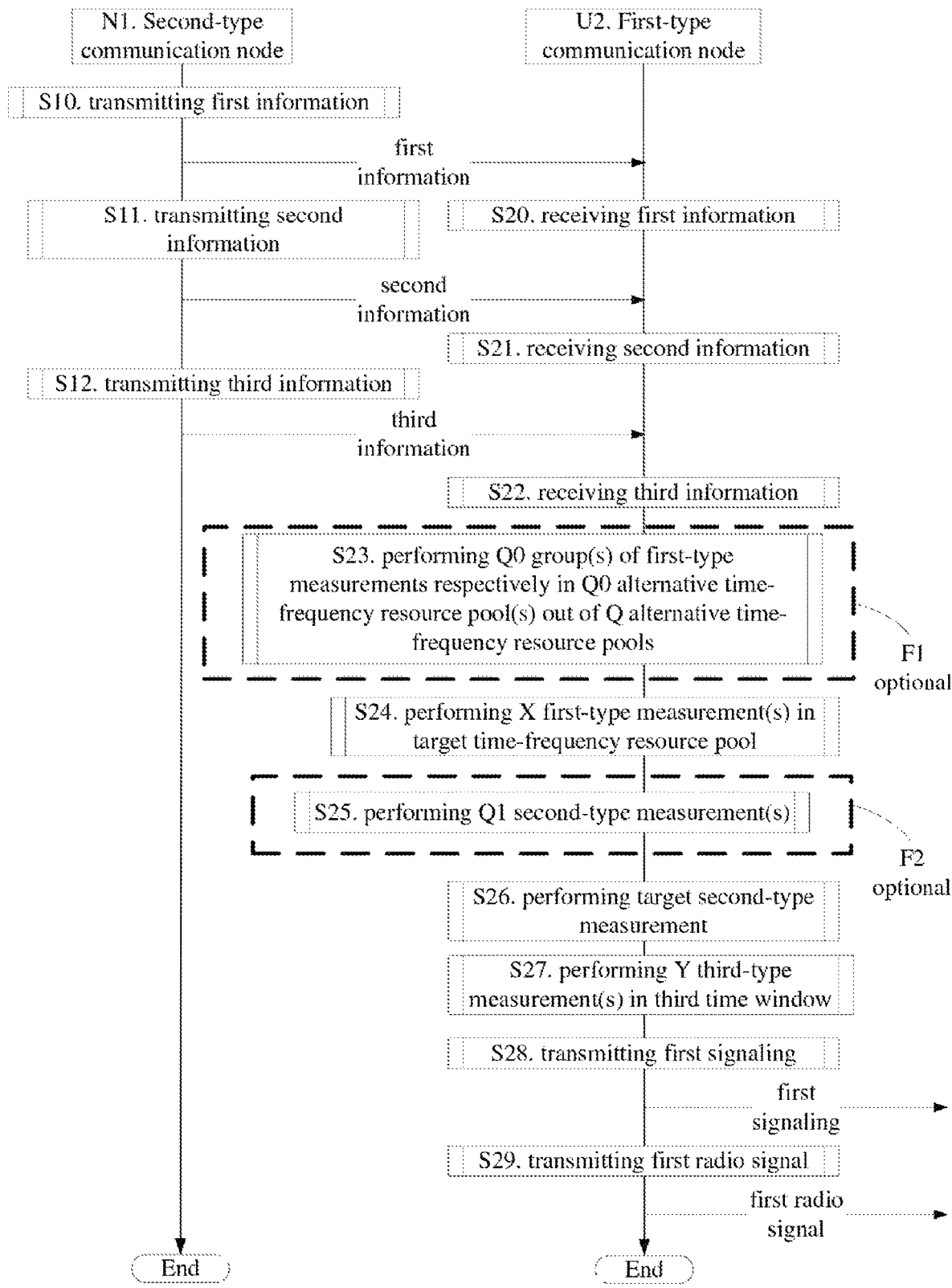
FIG. 6 illustrates a flowchart of radio signal transmission according to one embodiment of the present disclosure.

Embodiment 6 illustrates a flowchart of radio signal transmission according to one embodiment of the present disclosure, as shown in FIG. 6. In FIG. 6, a second-type communication node N1 is a maintenance base station for a serving cell of a first-type communication node U2. In FIG. 6, steps in boxes F1 and F2 are optional.

The second-type communication node N1 transmits first information in step S10; transmits second information in step S11; and transmits third information in step S12.

The first-type communication node U2 receives first information in step S20; receives second information in step S21; and receives third information in step S22; performs Q0 group(s) of first-type measurements respectively in Q0 alternative time-frequency resource pool(s) of Q alternative time-frequency resource pools in step S23; performs X first-type measurement(s) in a target time-frequency resource pool in step S24; performs Q1 second-type measurement(s) in step S25; performs a target second-type measurement in step S26; performs Y third-type measurement(s) in a third time window in step S27; transmits a first signaling in step S28; and transmits a first radio signal in step S29.

In Embodiment 6, the X first-type measurement(s) is(are) respectively used for acquiring X first-type measurement value(s), X is a positive integer; the target second-type measurement is used for acquiring a second-type measurement value; the target time-frequency resource pool is one of Q alternative time-frequency resource pools, the Q alternative time-frequency resource pools respectively correspond to Q Receive (Rx) parameter groups, any two Rx parameter groups of the Q Rx parameter groups are different, Q is a positive integer greater than 1; a Rx parameter group of the Q Rx parameter groups corresponding to the target time-frequency resource pool is associated with a Transmit(Tx) parameter group for the first radio signal; the X first-type measurement value(s) is(are) used for the target second-type measurement, a second-type measurement value acquired after performing the target second-type measurement is used by the U2 for determining at least one of an MCS adopted by the first radio signal and radio resources occupied by the first radio signal. The first signaling is used for indicating at least one of an MCS adopted by the first radio signal, or radio resources occupied by the first radio signal, the first signaling is transmitted via an air interface; the Q alternative time-frequency resource pools all belong to a first time window in the time domain, the target second-type measurement is performed in a second time window, a time domain position of the second time window is used by the U2 for determining the first time window, an end time of the first time window is no later than a start time of the second time window, and an end time of the second time window is no later than a start time of transmission of the first radio signal. Each of X1 first-type measurement value(s) out of the X first-type measurement value(s) is greater than a target threshold, the second-type measurement value acquired after performing the target second-type measurement is equal to a ratio of X1 to X, X1 is a non-negative integer not greater than X, the first information is used by the U2 for determining the target threshold. The Q0 group(s) of first-type measurements is(are) respectively used for acquiring Q0 group(s) of first-type measurement values; wherein, each of the Q0 alternative time-frequency resource pool(s) is different from the target time-frequency resource pool, Q0 is a positive integer less than Q. The Q1 second-type measurement(s) is(are) respectively used for acquiring Q1 second-type measurement value(s); wherein, Q1 group(s) of first-type measurement values out of the Q0 group(s) of first-type measurement value(s) is(are) respectively used for the Q1 second-type measurement(s), Q1 is a positive integer not greater than Q0. The second information is used by the U2 for determining the Tx parameter group for the first radio signal. A second-type measurement value acquired after performing the target second-type measurement belongs to a target interval, the target interval is one of P alternative intervals, any alternative interval of the P alternative intervals is an interval of non-negative real numbers, the P alternative intervals respectively correspond to P alternative MCS subsets, the P alternative intervals respectively correspond to P alternative resource numerical value subsets, P is a positive integer greater than 1; an alternative MCS subset of the P alternative MCS subsets corresponding to the target interval is a first MCS subset, an alternative resource numerical value subset of the P alternative resource numerical value subsets corresponding to the target interval is a first resource numerical value subset; the third information is used by the U2 for determining at least one of an MCS adopted by the first radio signal and radio resources occupied by the first radio signal, wherein the MCS adopted by the first radio signal is an MCS in the first MCS subset, a number of the radio resources occupied by the first radio signal is equal to a resource numerical value in the first resource numerical value subset. The Y third-type measurement(s) is(are) respectively used for acquiring Y third-type measurement value(s), Y is a positive integer; wherein, a second-type measurement value acquired after performing the target second-type measurement is used by the U2 for determining a first upper bound, a sum of the Y third-type measurement value(s) is no greater than the first upper bound, a time domain position of the third time window is related to time domain resources occupied by the first radio signal, the Y third-type measurement value(s) is(are) related to a number of time-frequency resources occupied by radio signal(s) transmitted by a transmitter of the first radio signal within the third time window, employing a Tx parameter group associated with a Rx parameter group of the Q Rx parameter groups corresponding to the target time-frequency resource pool.

In one embodiment, each of the P alternative resource numerical value subsets comprises a positive integer number of resource numerical values.

In one sub-embodiment of the above embodiment, each resource numerical value in the P alternative resource numerical value subsets is a positive integer.

In one sub-embodiment of the above embodiment, each resource numerical value in the P alternative resource numerical value subsets is a non-negative integer.

In one embodiment, Q0 is equal to Q−1.

In one embodiment, Q0 is less than Q−1.

In one embodiment, Q0 is equal to Q−1, at least one Rx parameter group of Q0 Rx parameter group(s) corresponding to the Q0 alternative time-frequency resource pool(s) among the Q Rx parameter groups is not associated with the Tx parameter group for the first radio signal.

In one embodiment, Q0 is equal to Q−1, any Rx parameter group of Q0 Rx parameter group(s) corresponding to the Q0 alternative time-frequency resource pool(s) among the Q Rx parameter groups is not associated with the Tx parameter group for the first radio signal.

In one embodiment, Q0 is less than Q−1, any Rx parameter group of Q0 Rx parameter group(s) corresponding to the Q0 alternative time-frequency resource pool(s) among the Q Rx parameter groups is associated with the Tx parameter group for the first radio signal. A Rx parameter group of the Q Rx parameter groups corresponding to any alternative time-frequency resource pool of the Q alternative time-frequency resource pools other than the Q0 alternative time-frequency resource pool(s) is not associated with the Tx parameter group for the first radio signal.

In one embodiment, any group of the Q0 groups of first-type measurements comprises a positive integer number of first-type measurement(s).

In one embodiment, there is a group of first-type measurements in the Q0 group(s) of first-type measurements that comprises a number equal to the X of first-type measurement(s).

In one embodiment, any group of first-type measurements in the Q0 group(s) of first-type measurements comprises a number equal to the X of first-type measurement(s).

In one embodiment, there is a group of first-type measurements in the Q0 group(s) of first-type measurements that comprises a number unequal to the X of first-type measurement(s).

In one embodiment, Q0+1 groups of first-type measurements comprise the Q0 group(s) of first-type measurements and the X first-type measurement(s), the X first-type measurement(s) belongs(belong) to any one group of first-type measurements other than the Q0 group(s) of first-type measurements among the Q0+1 groups of first-type measurements, Q0 is a positive integer less than Q; Q0+1 groups of first-type measurement values comprise the Q0 group(s) of first-type measurement values and the X first-type measurement value(s), the X first-type measurement value(s) belongs(belong) to any one group of first-type measurement values other than the Q0 group(s) of first-type measurement values among the Q0+1 groups of first-type measurement values.

In one sub-embodiment of the above embodiment, the first-type communication node performs all measurements in each group of the Q0+1 groups of first-type measurements.

In one sub-embodiment of the above embodiment, the first-type communication node performs all measurements in each group of the Q0+1 groups of first-type measurements before transmitting the first radio signal.

In one sub-embodiment of the above embodiment, the Tx parameter group for the first radio signal is used for determining the group of first-type measurement value(s) to which the X first-type measurement value(s) belongs(belong) out of the Q0+1 first-type measurement values.

In one sub-embodiment of the above embodiment, whether the Tx parameter group for the first radio signal is associated with the Q Rx parameter groups is used for determining the group of first-type measurement value(s) to which the X first-type measurement value(s) belongs(belong) out of the Q0+1 first-type measurement values.

In one sub-embodiment of the above embodiment, a group of first-type measurement value(s) of the Q0+1 groups of first-type measurements acquired from one of the Q alternative time-frequency resource pools associated with the Tx parameter group for the first radio signal is a group of first-type measurement value(s) to which the X first-type measurement value(s) belongs(belong).

In one sub-embodiment of the above embodiment, a group of first-type measurement value(s) of the Q0+1 groups of first-type measurement values acquired from a measurement on the target time-frequency resource pool among the Q0+1 groups of first-type measurements is a group of first-type measurement value(s) to which the X first-type measurement value(s) belongs(belong).

In one embodiment, Q1 is equal to Q0.

In one embodiment, Q1 is less than Q0.

In one embodiment, the target second-type measurement and any second-type measurement of the Q1 second-type measurement(s) are a same type of measurement.

In one embodiment, a second-type measurement is one measurement on CBR.

In one embodiment, a second-type measurement is one measurement on CBQ.

In one embodiment, a second-type measurement is used by the U2 for determining a channel occupancy status of the channel measured.

In one embodiment, a second-type measurement is used by the U2 for determining a channel occupancy status within a frequency range measured.

In one embodiment, a first given group is any one group of first-type measurement value(s) of the Q1 group(s) of first-type measurement values, a given second-type measurement value is a second-type measurement value of the Q1 second-type measurement values acquired by the first given group, the given first given group comprises Z first-type measurement value(s), the Z is a positive integer; each of Z1 first-type measurement value(s) of the Z first-type measurement value(s) is greater than a given threshold, the given second-type measurement value is equal to a ratio of the Z1 to the Z, the Z1 is a non-negative integer not greater than the Z; the given threshold is configurable, or the given threshold is fixed.

In one sub-embodiment of the above embodiment, the given threshold is the same as the target threshold.

In one sub-embodiment of the above embodiment, the given threshold is different from the target threshold.

In one embodiment, a first given group is any one group of first-type measurement value(s) of the Q1 group(s) of first-type measurement values, a given second-type measurement value is a second-type measurement value of the Q1 second-type measurement values acquired by the first given group, the given first given group comprises Z first-type measurement value(s), the Z is a positive integer; each of Z1 first-type measurement value(s) of the Z first-type measurement value(s) is greater than a given threshold, the given second-type measurement value is equal to the Z1, the Z1 is a non-negative integer not greater than the Z; the given threshold is configurable, or the given threshold is fixed.

In one sub-embodiment of the above embodiment, the given threshold is the same as the target threshold.

In one sub-embodiment of the above embodiment, the given threshold is different from the target threshold.

In one embodiment, the first information is transmitted via a physical layer signaling.

In one embodiment, the first information is transmitted via a higher layer signaling.

In one embodiment, the first information is transmitted through a Downlink Shared Channel (DL-SCH).

In one embodiment, the first information is transmitted through a Physical Downlink Shared Channel (PDSCH).

In one embodiment, the first information comprises one or more fields in a System Information Block (SIB).

In one embodiment, the first information comprises one or more fields in a piece of Remaining System Information (RMSI).

In one embodiment, the first information comprises one or more fields in a Radio Resource Control (RRC) signaling.

In one embodiment, the first information comprises one or more fields in an Information Element (IE) in a piece of RRC layer information.

In one embodiment, the first information is broadcast.

In one embodiment, the first information is unicast.

In one embodiment, the first information is cell specific.

In one embodiment, the first information is UE-specific.

In one embodiment, the first information is transmitted through a Physical Downlink Control Channel (PDCCH).

In one embodiment, the first information comprises all or part of fields in a Downlink Control Information (DCI) signaling.

In one embodiment, the phrase that the first information is used for determining the target threshold refers to: the first information is used by the first-type communication node for determining the target threshold.

In one embodiment, the phrase that the first information is used for determining the target threshold refers to: the first information explicitly indicates the target threshold.

In one embodiment, the phrase that the first information is used for determining the target threshold refers to: the first information implicitly indicates the target threshold.

In one embodiment, the first information employs a design as the same as "threshS-RSSI-CBR-r14" in IE "SL-CommResourcePool" in 3GPP TS36.331 (v15.2.0).

In one embodiment, the first information is transmitted via an air interface.

In one embodiment, the first information is transmitted via a Uu interface.

In one embodiment, the first information is transmitted from the second-type communication node to the first-type communication node in the present disclosure.

In one embodiment, the first information is transmitted from a higher layer of the first-type communication node to a physical layer of the first-type communication node.

In one embodiment, the first information is transmitted internally within the first-type communication node.

In one embodiment, the phrase that the first information is used for determining the target threshold refers to: the target threshold is one threshold in a first threshold set, the first threshold set comprises a positive integer number of threshold(s), threshold(s) in the first threshold set is(are) pre-defined or configurable, the first information is used for determining the target threshold out of the first threshold set.

In one sub-embodiment of the above embodiment, threshold(s) in the first threshold set is(are) pre-defined.

In one sub-embodiment of the above embodiment, threshold(s) in the first threshold set is(are) configurable.

In one sub-embodiment of the above embodiment, the first threshold set comprises Q alternative thresholds, the Q alternative thresholds respectively correspond to the Q Rx parameter groups, the target threshold is one of the Q alternative thresholds.

In one embodiment, the phrase that the first information is used for determining the target threshold refers to: the target threshold is one threshold in a first threshold set, the first threshold set comprises a positive integer number of threshold(s), threshold(s) in the first threshold set is(are) related to the Tx parameter group for the first radio signal, the first information is used for determining the target threshold out of the first threshold set.

In one sub-embodiment of the above embodiment, threshold(s) in the first threshold set is(are) pre-defined.

In one sub-embodiment of the above embodiment, threshold(s) in the first threshold set is(are) configurable.

In one sub-embodiment of the above embodiment, the first threshold set comprises Q alternative thresholds, the Q alternative thresholds respectively correspond to the Q Rx parameter groups, the target threshold is one of the Q alternative thresholds.

In one embodiment, the target threshold is a non-negative real number no greater than 1.

In one embodiment, the target threshold is a non-negative rational number no greater than 1.

In one embodiment, any alternative interval of the P alternative intervals is an interval of positive rational numbers.

In one embodiment, any alternative interval of the P alternative intervals is an interval of positive real numbers.

In one embodiment, the third information is transmitted via an air interface.

In one embodiment, the third information is transmitted via a Uu interface.

In one embodiment, the third information is transmitted from the second-type communication node to the first-type communication node in the present disclosure.

In one embodiment, the third information is transmitted from a higher layer of the first-type communication node to a physical layer of the first-type communication node.

In one embodiment, the third information is transmitted internally within the first-type communication node.

In one embodiment, the third information is a piece of higher layer information.

In one embodiment, the third information is a piece of physical layer information.

In one embodiment, the third information is transmitted via a physical layer signaling.

In one embodiment, the third information is transmitted via a higher layer signaling.

In one embodiment, the third information is transmitted through a DL-SCH.

In one embodiment, the third information is transmitted through a PDSCH.

In one embodiment, the third information comprises one or more fields in a SIB.

In one embodiment, the third information comprises one or more fields in a piece of RMSI.

In one embodiment, the third information comprises one or more fields in an RRC signaling.

In one embodiment, the third information comprises one or more fields in an IE in a piece of RRC layer information.

In one embodiment, the third information is broadcast.

In one embodiment, the third information is unicast.

In one embodiment, the third information is cell specific.

In one embodiment, the third information is UE-specific.

In one embodiment, the third information is transmitted through a PDCCH.

In one embodiment, the third information comprises all or part of fields in a DCI signaling.

In one embodiment, the phrase that "the third information is used for determining at least one of the MCS adopted by the first radio signal and the radio resources occupied by the first radio signal" refers to: the third information is used by the first-type communication node for determining at least one of an MCS adopted by the first radio signal and radio resources occupied by the first radio signal.

In one sub-embodiment of the above embodiment, the third information is used by the first-type communication node for determining an MCS adopted by the first radio signal.

In one sub-embodiment of the above embodiment, the third information is used by the first-type communication node for determining radio resources occupied by the first radio signal.

In one sub-embodiment of the above embodiment, the third information is used by the first-type communication node for determining an MCS adopted by the first radio signal and radio resources occupied by the first radio signal.

In one embodiment, the phrase that "the third information is used for determining at least one of the MCS adopted by the first radio signal and the radio resources occupied by the first radio signal" refers to: the third information is used for explicitly indicating at least one of an MCS adopted by the first radio signal and radio resources occupied by the first radio signal.

In one sub-embodiment of the above embodiment, the third information is used for explicitly indicating an MCS adopted by the first radio signal.

In one sub-embodiment of the above embodiment, the third information is used for explicitly indicating radio resources occupied by the first radio signal.

In one sub-embodiment of the above embodiment, the third information is used for explicitly indicating an MCS adopted by the first radio signal and radio resources occupied by the first radio signal.

In one embodiment, the phrase that "the third information is used for determining at least one of the MCS adopted by the first radio signal and the radio resources occupied by the first radio signal" refers to: the third information is used for implicitly indicating at least one of an MCS adopted by the first radio signal and radio resources occupied by the first radio signal.

In one sub-embodiment of the above embodiment, the third information is used for implicitly indicating an MCS adopted by the first radio signal.

In one sub-embodiment of the above embodiment, the third information is used for implicitly indicating radio resources occupied by the first radio signal.

In one sub-embodiment of the above embodiment, the third information is used for implicitly indicating an MCS adopted by the first radio signal and radio resources occupied by the first radio signal.

In one embodiment, the phrase that "the third information is used for determining at least one of the MCS adopted by the first radio signal and the radio resources occupied by the first radio signal" refers to: the third information is used for indicating the P alternative intervals, a second-type measurement value acquired after performing the target second-type measurement and the P alternative intervals are used for determining at least one of an MCS adopted by the first radio signal and radio resources occupied by the first radio signal.

In one sub-embodiment of the above embodiment, a second-type measurement value acquired after performing the target second-type measurement and the P alternative intervals are used for determining an MCS adopted by the first radio signal.

In one sub-embodiment of the above embodiment, a second-type measurement value acquired after performing the target second-type measurement and the P alternative intervals are used for determining radio resources occupied by the first radio signal.

In one sub-embodiment of the above embodiment, a second-type measurement value acquired after performing the target second-type measurement and the P alternative intervals are used for determining an MCS adopted by the first radio signal and radio resources occupied by the first radio signal.

In one sub-embodiment of the above embodiment, the third information explicitly indicates the P alternative intervals.

In one sub-embodiment of the above embodiment, the third information implicitly indicates the P alternative intervals.

In one sub-embodiment of the above embodiment, the third information is also used for indicating the P alternative MCS subsets, a second-type measurement value acquired after performing the target second-type measurement and one-to-one correspondence relation between the P alternative intervals and the P alternative MCS subsets are used for determining an MCS adopted by the first radio signal.

In one sub-embodiment of the above embodiment, the third information is also used for indicating the P alternative resource numerical value subsets, a second-type measurement value acquired after performing the target second-type measurement and one-to-one correspondence relation between the P alternative intervals and the P alternative resource numerical value subsets are used for determining radio resources occupied by the first radio signal.

In one sub-embodiment of the above embodiment, the third information is also used for indicating Q alternative interval sets, the Q alternative interval sets respectively correspond to the Q Rx parameter groups, any alternative interval in the Q alternative interval sets is an interval of non-negative real numbers, the Q alternative interval sets respectively correspond to Q alternative MCS sets, the Q alternative interval sets respectively correspond to Q alternative resource numerical value sets; the P alternative intervals belong to one of the Q alternative interval sets, the P alternative MCS subsets belong to one of the Q alternative MCS sets, the P alternative resource numerical value subsets belong to one of the Q alternative resource numerical value sets.

In one sub-embodiment of the above embodiment, the third information is used for indicating Q alternative interval sets, Q alternative MCS sets and Q alternative resource numerical value sets, the Q alternative interval sets respectively correspond to the Q Rx parameter groups, any alternative interval in the Q alternative interval sets is an interval of non-negative real numbers, the Q alternative interval sets respectively correspond to the Q alternative MCS sets, the Q alternative interval sets respectively correspond to the Q alternative resource numerical value sets; the P alternative intervals belong to one of the Q alternative interval sets, the P alternative MCS subsets belong to one of the Q alternative MCS sets, the P alternative resource numerical value subsets belong to one of the Q alternative resource numerical value sets.

In one embodiment, the second information is transmitted via an air interface.

In one embodiment, the second information is transmitted via a Uu interface.

In one embodiment, the second information is transmitted from the second-type communication node to the first-type communication node in the present disclosure.

In one embodiment, the second information is transmitted from a higher layer of the first-type communication node to a physical layer of the first-type communication node.

In one embodiment, the second information is transmitted internally within the first-type communication node.

In one embodiment, the second information is transmitted via a physical layer signaling.

In one embodiment, the second information is transmitted via a higher layer signaling.

In one embodiment, the second information is transmitted through a DL-SCH.

In one embodiment, the second information is transmitted through a PDSCH.

In one embodiment, the second information comprises one or more fields in a SIB.

In one embodiment, the second information comprises one or more fields in a piece of RMSI.

In one embodiment, the second information comprises one or more fields in an RRC signaling.

In one embodiment, the second information comprises one or more fields in an IE in a piece of RRC layer information.

In one embodiment, the second information is broadcast.

In one embodiment, the second information is unicast.

In one embodiment, the second information is cell specific.

In one embodiment, the second information is UE-specific.

In one embodiment, the second information is transmitted through a PDCCH.

In one embodiment, the second information comprises all or part of fields in a DCI signaling.

In one embodiment, the phrase that the second information is used for determining the Tx parameter group for the first radio signal refers to: the second information is used by the first-type communication node for determining the Tx parameter group for the first radio signal.

In one embodiment, the phrase that the second information is used for determining the Tx parameter group for the first radio signal refers to: the second information is used for explicitly indicating the Tx parameter group for the first radio signal.

In one embodiment, the phrase that the second information is used for determining the Tx parameter group for the first radio signal refers to: the second information is used for implicitly indicating the Tx parameter group for the first radio signal.

In one embodiment, the second information and the third information of the present disclosure are two different IEs in one same piece of RRC information.

In one embodiment, the second information and the third information of the present disclosure are two different fields in one same IE in one same piece of RRC information.

In one embodiment, the second information and the third information of the present disclosure are two fields in one same piece of DCI.

Embodiment 7

Figure 7:
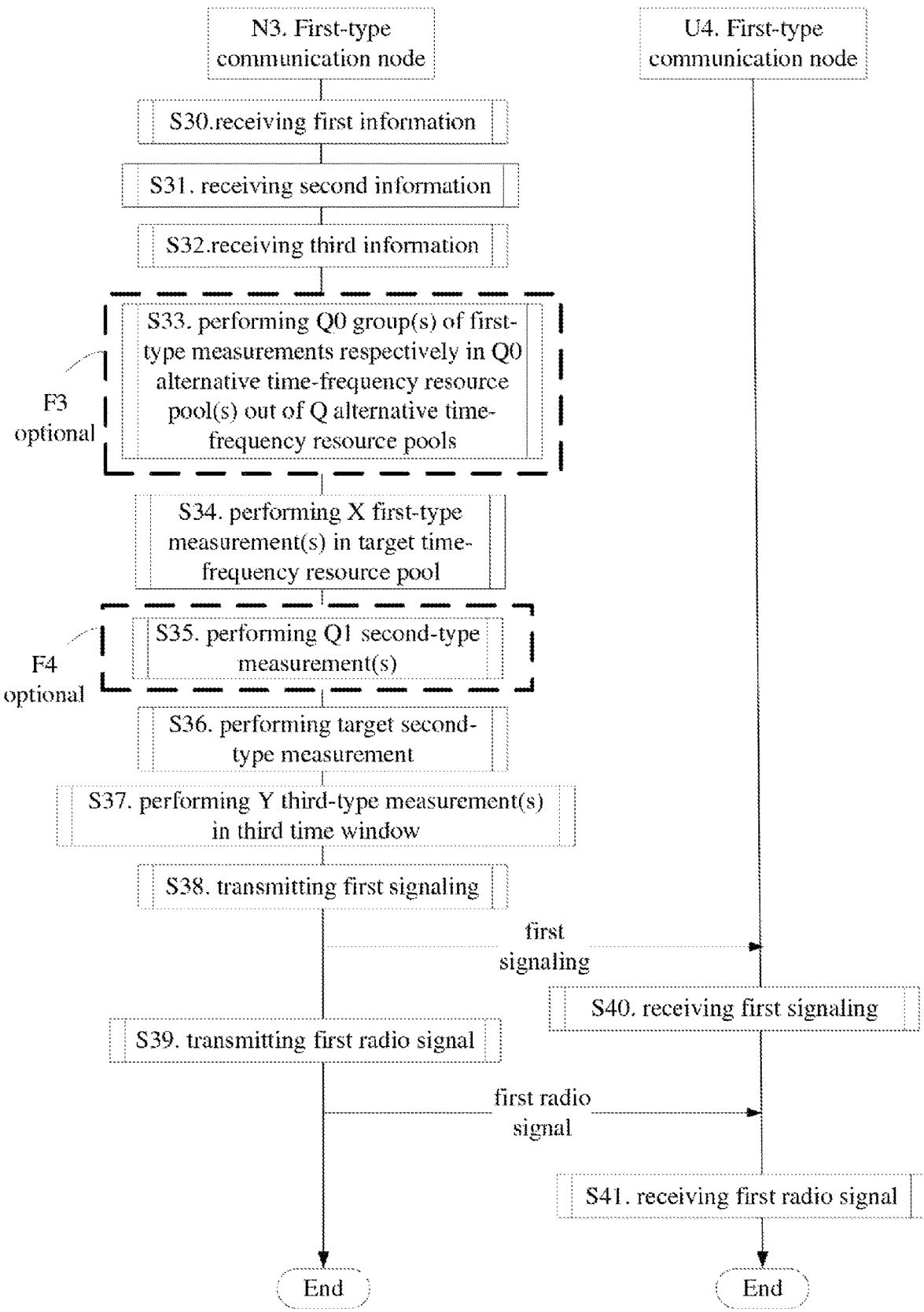
FIG. 7 illustrates a flowchart of radio signal transmission according to another embodiment of the present disclosure.
Figure 8:
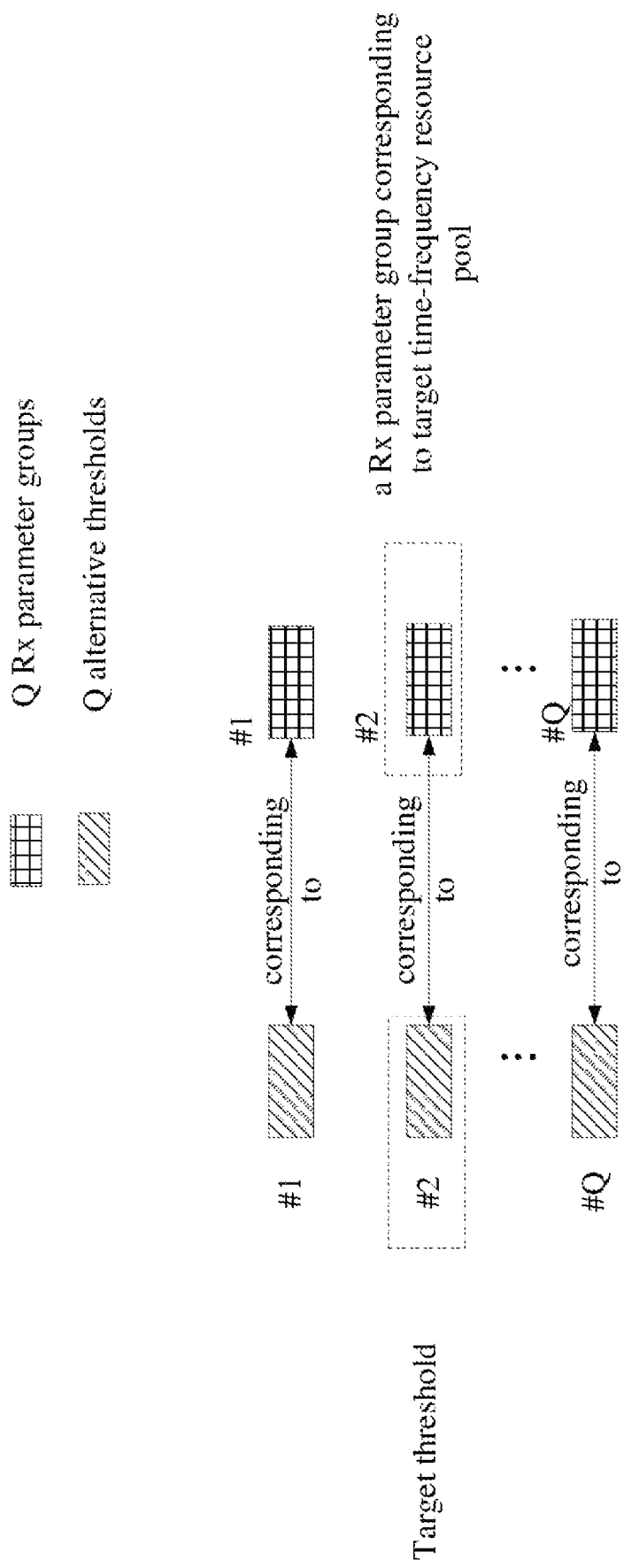
FIG. 8 illustrates a schematic diagram illustrating a relationship between Q alternative thresholds and Q Rx parameter groups according to one embodiment of the present disclosure.

Embodiment 7 illustrates a flowchart of radio signal transmission according to another embodiment of the present disclosure, as shown in FIG. 7. In FIG. 7, a first-type communication node N3 is in communication with another first-type communication node U4, the first-type communication node N3 is out of coverage of a cellular cell. In FIG. 7, box F3 and box F4 are optional.

The first-type communication node N3 receives first information in step S30; receives second information in step S31; receives third information in step S32; performs Q0 group(s) of first-type measurements respectively in Q0 alternative time-frequency resource pool(s) of Q alternative time-frequency resource pools in step S33; performs X first-type measurement(s) in a target time-frequency resource pool in step S34; performs Q1 second-type measurement(s) in step S35; performs a target second-type measurement in step S36; performs Y third-type measurement(s) in a third time window in step S37; transmits a first signaling in step S38; and transmits a first radio signal in step S39.

Another first-type communication node U4 receives a first signaling in step S40; and receives a first radio signal in step S41.

In Embodiment 7, the X first-type measurement(s) is(are) respectively performed in the X time-frequency unit(s), X is a positive integer; the target second-type measurement is used for acquiring a second-type measurement value; the target time-frequency resource pool is one of Q alternative time-frequency resource pools, the Q alternative time-frequency resource pools respectively correspond to Q Receive (Rx) parameter groups, any two Rx parameter groups of the Q Rx parameter groups are different, Q is a positive integer greater than 1; a Rx parameter group of the Q Rx parameter groups corresponding to the target time-frequency resource pool is associated with a Transmit(Tx) parameter group for the first radio signal; the X first-type measurement value(s) is(are) used for the target second-type measurement, the second-type measurement value acquired after performing the target second-type measurement is used for determining at least one of an MCS adopted by the first radio signal and radio resources occupied by the first radio signal. The first signaling is used for indicating at least one of the MCS adopted by the first radio signal, or the radio resources occupied by the first radio signal, the first signaling is transmitted via an air interface; the Q alternative time-frequency resource pools all belong to a first time window in the time domain, the target second-type measurement is performed in a second time window, a time domain position of the second time window is used by the N3 for determining the first time window, an end time of the first time window is no later than a start time of the second time window, and an end time of the second time window is no later than a start time of transmission of the first radio signal. Each of X1 first-type measurement value(s) out of the X first-type measurement value(s) is greater than a target threshold, the second-type measurement value acquired after performing the target second-type measurement is equal to a ratio of X1 to X, X1 is a non-negative integer not greater than X; the first information is used by the N3 for determining the target threshold. The Q0 group(s) of first-type measurements is(are) respectively used for acquiring Q0 group(s) of first-type measurement values; wherein, each of the Q0 alternative time-frequency resource pool(s) is different from the target time-frequency resource pool, Q0 is a positive integer less than Q. The Q1 second-type measurement(s) is(are) respectively used for acquiring Q1 second-type measurement value(s); wherein, Q1 group(s) of first-type measurement values out of the Q0 group(s) of first-type measurement value(s) is(are) respectively used for the Q1 second-type measurement(s), Q1 is a positive integer not greater than Q0. The second information is used by the N3 for determining the Tx parameter group for the first radio signal. A second-type measurement value acquired after performing the target second-type measurement belongs to a target interval, the target interval is one of P alternative intervals, any alternative interval of the P alternative intervals is an interval of non-negative real numbers, the P alternative intervals respectively correspond to P alternative MCS subsets, the P alternative intervals respectively correspond to P alternative resource numerical value subsets, P is a positive integer greater than 1; an alternative MCS subset of the P alternative MCS subsets corresponding to the target interval is a first MCS subset, an alternative resource numerical value subset of the P alternative resource numerical value subsets corresponding to the target interval is a first resource numerical value subset; the third information is used by the N3 for determining at least one of an MCS adopted by the first radio signal and radio resources occupied by the first radio signal, wherein the MCS adopted by the first radio signal is an MCS in the first MCS subset, a number of the radio resources occupied by the first radio signal is equal to a resource numerical value in the first resource numerical value subset. The Y third-type measurement(s) is(are) respectively used for acquiring Y third-type measurement value(s), Y is a positive integer; wherein, a second-type measurement value acquired after performing the target second-type measurement is used by the N3 for determining a first upper bound, a sum of the Y third-type measurement value(s) is no greater than the first upper bound, a time domain position of the third time window is related to time domain resources occupied by the first radio signal, the Y third-type measurement value(s) is(are) related to a number of time-frequency resources occupied by radio signal(s) transmitted by a transmitter of the first radio signal within the third time window, employing a Tx parameter group associated with a Rx parameter group of the Q Rx parameter groups corresponding to the target time-frequency resource pool.

In one embodiment, the air interface is wireless.

In one embodiment, the air interface comprises a wireless channel.

In one embodiment, the air interface comprises a sidelink.

In one embodiment, the air interface is a PC5 interface.

In one embodiment, the first signaling is a physical layer signaling transmission.

In one embodiment, the first signaling is broadcast.

In one embodiment, the first signaling is groupcast.

In one embodiment, the first signaling is unicast.

In one embodiment, the first signaling is cell specific.

In one embodiment, the first signaling is UE-specific.

In one embodiment, the first signaling is transmitted on a Physical Sidelink Control Channel (PSCCH).

In one embodiment, the first signaling comprises all or part of fields in a SCI signaling.

In one embodiment, the first signaling comprises SA of the first radio signal.

In one embodiment, the phrase that "the first signaling is used for indicating at least one of an MCS adopted by the first radio signal and radio resources occupied by the first radio signal" refers to: the first signaling is used for explicitly indicating at least one of an MCS adopted by the first radio signal and radio resources occupied by the first radio signal.

In one embodiment, the phrase that "the first signaling is used for indicating at least one of an MCS adopted by the first radio signal and radio resources occupied by the first radio signal" refers to: the first signaling is used for implicitly indicating at least one of an MCS adopted by the first radio signal and radio resources occupied by the first radio signal.

Embodiment 8

Embodiment 8 illustrates a schematic diagram illustrating a relationship between Q alternative thresholds and Q Rx parameter groups.

In Embodiment 8, the Q alternative thresholds respectively correspond to the Q Rx parameter groups, the target threshold in the present disclosure is one of the Q alternative thresholds.

In one embodiment, the Q alternative thresholds are pre-defined.

In one embodiment, the Q alternative thresholds are configurable.

In one embodiment, at least two alternative thresholds in the Q alternative thresholds are different.

In one embodiment, any two alternative thresholds in the Q alternative thresholds are the same.

In one embodiment, any two alternative thresholds in the Q alternative thresholds are different.

Embodiment 9

Figure 9:
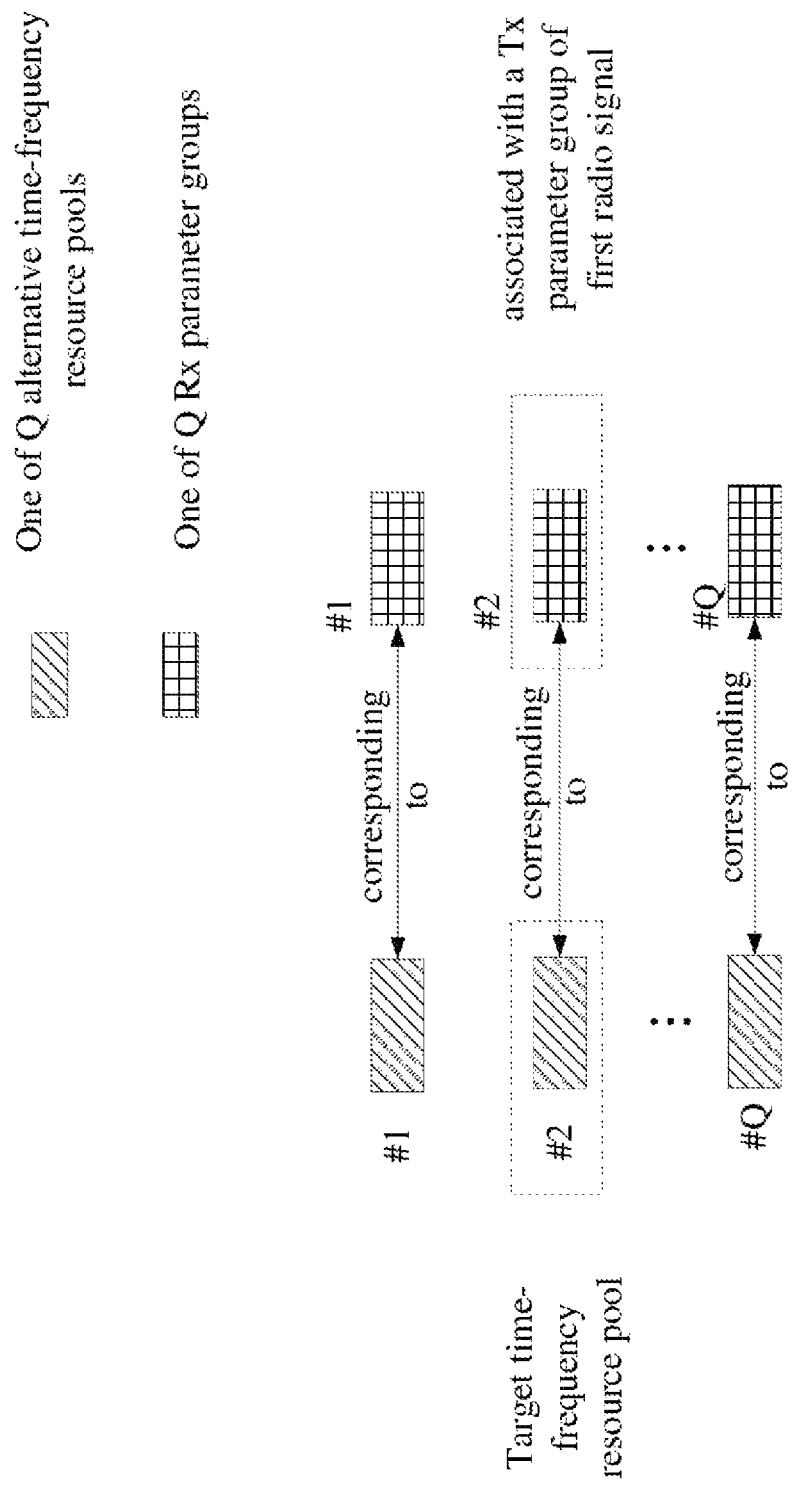
FIG. 9 illustrates a schematic diagram of determining a target time-frequency resource pool according to one embodiment of the present disclosure.

Embodiment 9 illustrates a schematic diagram of determining a target time-frequency resource pool according to one embodiment of the present disclosure, as shown in FIG. 9.

In Embodiment 9, the target time-frequency resource pool is one of Q alternative time-frequency resource pools, the Q alternative time-frequency resource pools respectively correspond to Q Rx parameter groups, any two Rx parameter groups of the Q Rx parameter groups are different, Q is a positive integer greater than 1; the Tx parameter group for the first radio signal in the present disclosure is used for determining the target time-frequency resource pool out of the Q alternative time-frequency resource pools, a Rx parameter group of the Q Rx parameter groups corresponding to the target time-frequency resource pool is associated with the Tx parameter group for the first radio signal in the present disclosure.

In one embodiment, a correspondence relationship between the Q alternative time-frequency resource pools and the Q Rx parameter groups is pre-defined.

In one embodiment, a correspondence relationship between the Q alternative time-frequency resource pools and the Q Rx parameter groups is configurable.

In one embodiment, the phrase that "the Tx parameter group for the first radio signal is used for determining the target time-frequency resource pool out of the Q alternative time-frequency resource pools" comprises: whether the Tx parameter group for the first radio signal is associated with the Q Rx parameter groups respectively corresponding to the Q alternative time-frequency resource pools is used for determining the target time-frequency resource pool out of the Q alternative time-frequency resource pools.

In one embodiment, the phrase that "the Tx parameter group for the first radio signal is used for determining the target time-frequency resource pool out of the Q alternative time-frequency resource pools" comprises: the target time-frequency resource pool is the only one alternative time-frequency resource pool of the Q time-frequency resource pools that meets a first condition, the first condition includes that one corresponding Rx parameter group of the Q Rx parameter groups is associated with a Tx parameter group for the first radio signal.

In one embodiment, the phrase that "the Tx parameter group for the first radio signal is used for determining the target time-frequency resource pool out of the Q alternative time-frequency resource pools" comprises: the target time-frequency resource pool is one of q alternative time-frequency resource pools out of the Q alternative time-frequency resource pools, q is a positive integer greater than 1 and not greater than Q, each of the q alternative time-frequency resource pools meets a second condition, the second condition includes that one corresponding Rx parameter group of the Q Rx parameter groups is associated with a Tx parameter group for the first radio signal.

In one sub-embodiment of the above embodiment, the q is less than the Q.

In one sub-embodiment of the above embodiment, the q is equal to the Q.

Embodiment 10

Figure 10:
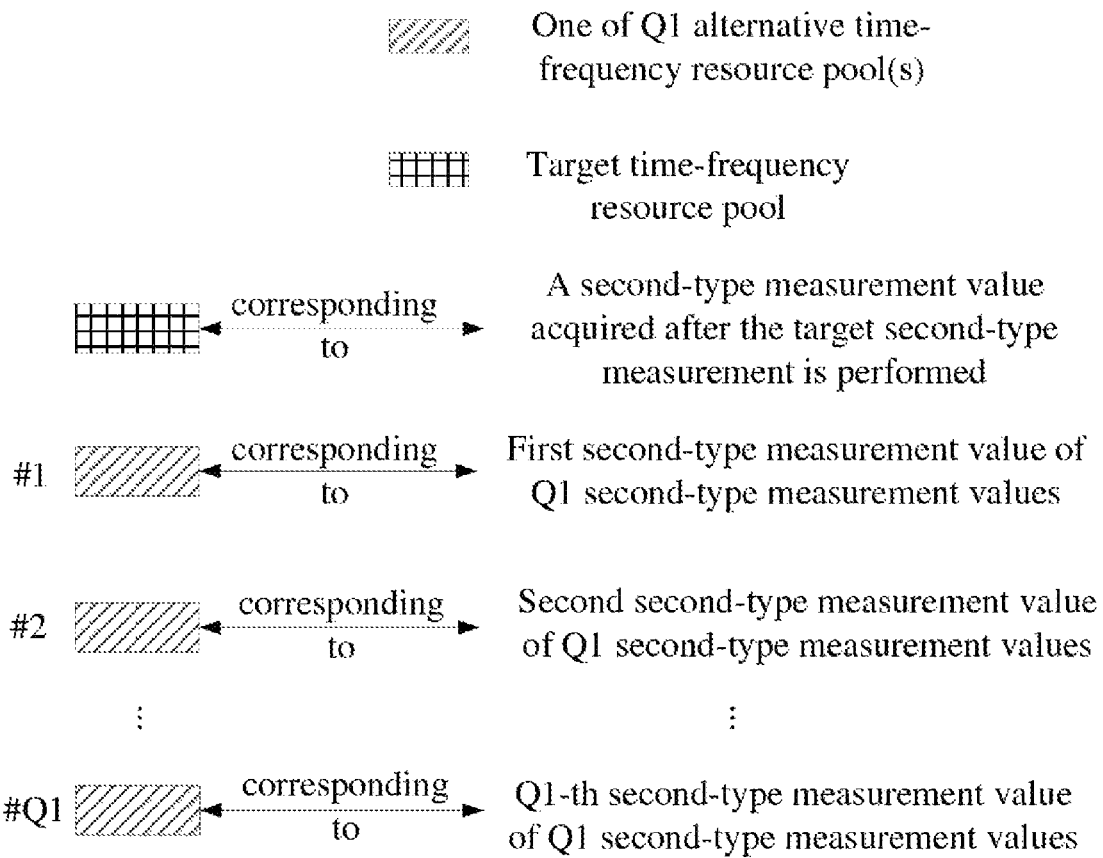
FIG. 10 illustrates a schematic diagram of determining a target time-frequency resource pool according to another embodiment of the present disclosure.

Embodiment 10 illustrates a schematic diagram of determining a target time-frequency resource pool according to another embodiment of the present disclosure, as shown in FIG. 10.

In Embodiment 10, the target time-frequency resource pool corresponds to a second-type measurement value acquired after performing the target second-type measurement in the present disclosure, Q1 alternative time-frequency resource pool(s) of the Q alternative time-frequency resource pools in the present disclosure respectively corresponds(correspond) to the Q1 second-type measurement value(s) in the present disclosure; the Q1 second-type measurement(s) in the present disclosure is(are) respectively used for acquiring Q1 second-type measurement value(s); Q1 group(s) of first-type measurement values out of the Q0 group(s) of first-type measurement value(s) in the present disclosure is(are) respectively used for the Q1 second-type measurement(s), Q1 is a positive integer not greater than Q0; each of the Q1 second-type measurement value(s) is no less than the second-type measurement value acquired after performing the target second-type measurement.

In one embodiment, Q1 is equal to Q0.

In one embodiment, Q1 is less than Q0.

In one embodiment, Q1+1 second-type measurements comprise the Q1 second-type measurement(s) and the target second-type measurement, the target second-type measurement is a second-type measurement other than any one of the Q1 second-type measurement(s) out of the Q1+1 second-type measurements, Q1 is a positive integer no greater than Q0; Q1+1 second-type measurement values comprise the Q1 second-type measurement value(s) and the target second-type measurement value, the target second-type measurement value is a second-type measurement value other than any one of the Q1 second-type measurement value(s) out of the Q1+1 second-type measurement values.

In one sub-embodiment of the above embodiment, the first-type communication node performs each second-type measurement of the Q1+1 second-type measurements.

In one sub-embodiment of the above embodiment, the first-type communication node performs each second-type measurement of the Q1+1 second-type measurements before transmitting the first radio signal.

In one sub-embodiment of the above embodiment, the target time-frequency resource pool corresponds to a second-type measurement value acquired after performing the target second-type measurement, the relative magnitude of the Q1+1 second-type measurement values is used for determining the target time-frequency resource pool out of the Q alternative time-frequency resource pools.

In one sub-embodiment of the above embodiment, the target time-frequency resource pool corresponds to a second-type measurement value acquired after performing the target second-type measurement, an index of the second-type measurement value acquired after performing the target second-type measurement in the Q1+1 second-type measurement values is used for determining the target time-frequency resource pool out of the Q alternative time-frequency resource pools.

In one sub-embodiment of the above embodiment, the target time-frequency resource pool corresponds to a second-type measurement value acquired after performing the target second-type measurement, Q1+1 alternative time-frequency resource pools of the Q alternative time-frequency resource pools respectively correspond to the Q1+1 second-type measurement values, the Q1+1 alternative time-frequency resource pools comprise the Q1 alternative time-frequency resource pool(s) and the target time-frequency resource pool; the relative magnitude of the Q1+1 second-type measurement values is used for determining the target time-frequency resource pool out of the Q alternative time-frequency resource pools.

In one sub-embodiment of the above embodiment, the target time-frequency resource pool corresponds to a second-type measurement value acquired after performing the target second-type measurement, Q1+1 alternative time-frequency resource pools of the Q alternative time-frequency resource pools respectively correspond to the Q1+1 second-type measurement values, the Q1+1 alternative time-frequency resource pools comprise the Q1 alternative time-frequency resource pool(s) and the target time-frequency resource pool; an index of the second-type measurement value acquired after performing the target second-type measurement in the Q1+1 second-type measurement values is used for determining the target time-frequency resource pool out of the Q alternative time-frequency resource pools.

In one sub-embodiment of the above embodiment, the target time-frequency resource pool is an alternative time-frequency resource pool of the Q alternative time-frequency resource pools corresponding to a minimum second-type measurement value of the Q1+1 second-type measurement values.

In one sub-embodiment of the above embodiment, the target time-frequency resource pool corresponds to a second-type measurement value acquired after performing the target second-type measurement, Q1+1 alternative time-frequency resource pools of the Q alternative time-frequency resource pools respectively correspond to the Q1+1 second-type measurement values, the Q1+1 alternative time-frequency resource pools comprise the Q1 alternative time-frequency resource pool(s) and the target time-frequency resource pool; the target time-frequency resource pool is an alternative time-frequency resource pool of the Q1+1 alternative time-frequency resource pools corresponding to a minimum second-type measurement value of the Q1+1 second-type measurement values.

In one embodiment, the phrase that "the target time-frequency resource pool corresponds to a second-type measurement value acquired after performing the target second-type measurement" refers to: performing the X first-type measurement(s) of the present disclosure in the target time-frequency resource pool, the X first-type measurement(s) is(are) respectively used for acquiring X first-type measurement value(s), X is a positive integer; the X first-type measurement value(s) is(are) used for the target second-type measurement, the target second-type measurement is used for acquiring a second-type measurement value.

In one embodiment, the phrase that "the target time-frequency resource pool corresponds to a second-type measurement value acquired after performing the target second-type measurement" refers to: performing Q1 group(s) of first-type measurements of the Q0 group(s) of first-type measurements in the present disclosure respectively in the Q1 alternative time-frequency resource pool(s). The Q1 group(s) of first-type measurements is(are) respectively used for acquiring the Q1 group(s) of first-type measurement values; the Q1 group(s) of first-type measurement values is(are) respectively used for the Q1 second-type measurement(s), the Q1 second-type measurement(s) is(are) respectively used for acquiring the Q1 second-type measurement value(s).

In one embodiment, the phrase that "the target time-frequency resource pool corresponds to a second-type measurement value acquired after performing the target second-type measurement" refers to: performing Q1+1 groups of first-type measurements of the Q0+1 groups of first-type measurements in the present disclosure respectively in the Q1+1 alternative time-frequency resource pools. The Q1+1 groups of first-type measurements are respectively used for acquiring the Q1+1 groups of first-type measurement values; the Q1+1 groups of first-type measurement values are respectively used for the Q1+1 second-type measurements, the Q1+1 second-type measurements are respectively used for acquiring the Q1+1 second-type measurement values.

In one embodiment, each of the Q1 second-type measurement value(s) is no less than the second-type measurement value acquired after performing the target second-type measurement, a Rx parameter group of the Q Rx parameter groups corresponding to the target time-frequency resource pool is used for determine the Tx parameter group for the first radio signal.

Embodiment 11

Figure 11:
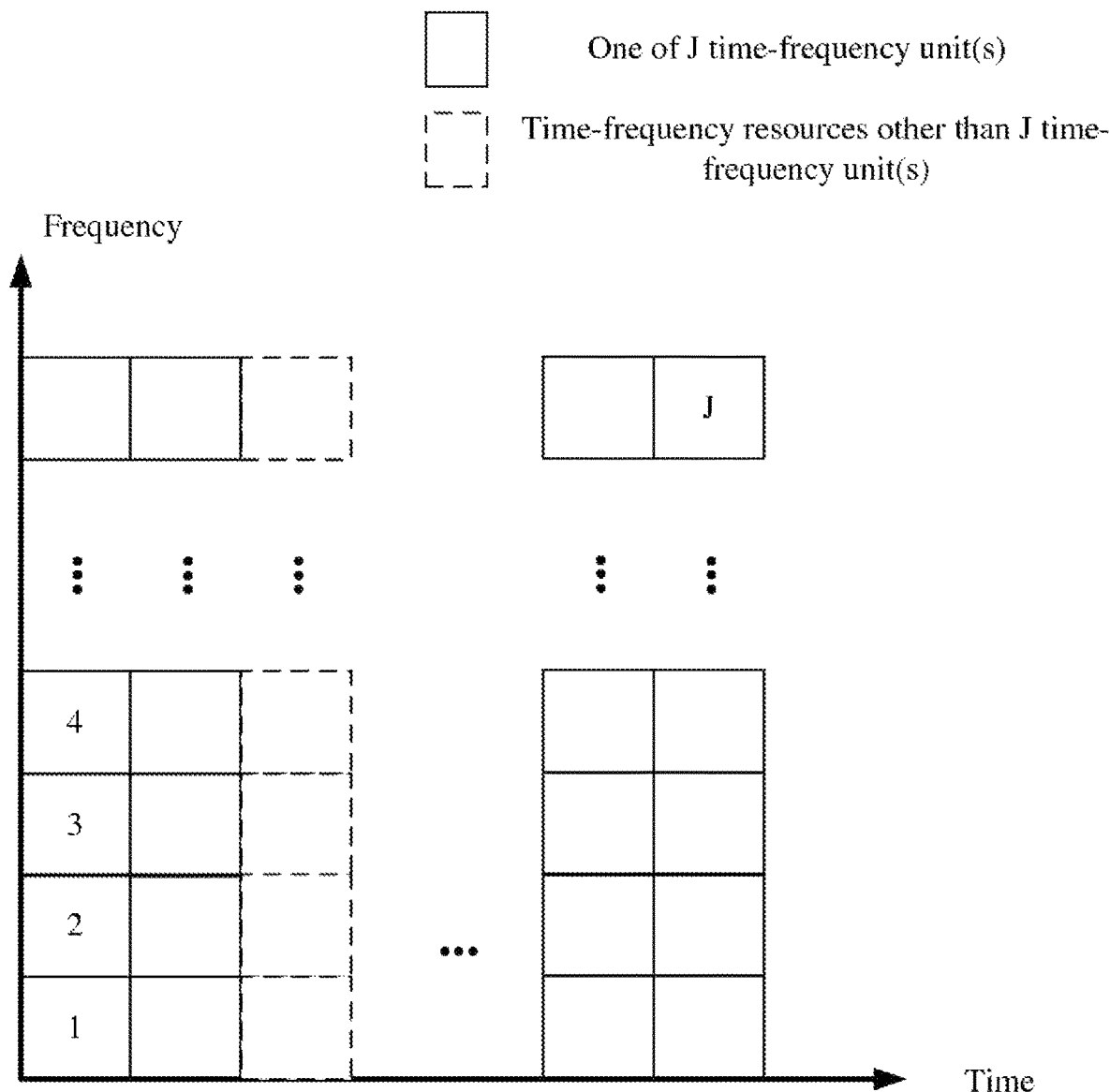
FIG. 11 illustrates a schematic diagram illustrating relations among a given time-frequency resource pool, time-frequency unit(s), a given Rx parameter group and first-type measurement(s) according to one embodiment of the present disclosure.

Embodiment 11 illustrates a schematic diagram illustrating relations among a given time-frequency resource pool, time-frequency unit(s), a given Rx parameter group and first-type measurement(s) according to one embodiment of the present disclosure, as shown in FIG. 11.

In Embodiment 11, the given time-frequency resource pool comprises J time-frequency unit(s), J first-type measurement(s) is(are) respectively performed in the J time-frequency unit(s), the given Rx parameter group is used for each first-type measurement of the J first-type measurement(s), the J first-type measurement(s) is(are) respectively used for acquiring J first-type measurement value(s), the J is a positive integer. The given time-frequency resource pool corresponds to the target time-frequency resource pool in the present disclosure, the J time-frequency unit(s) corresponds(correspond) to the X time-frequency unit(s) in the present disclosure, the given Rx parameter group is a Rx parameter group of the Q Rx parameter groups in the present disclosure corresponding to the target time-frequency resource pool, the J first-type measurement(s) corresponds(correspond) to the X first-type measurement(s) in the present disclosure; or, the given time-frequency resource pool corresponds to any alternative time-frequency resource pool of the Q0 alternative time-frequency resource pool(s) in the present disclosure, the given Rx parameter group is a Rx parameter group of the Q Rx parameter groups in the present disclosure corresponding to the given time-frequency resource pool, a group of first-type measurement(s) in the Q0 group(s) of first-type measurements performed in the given time-frequency resource pool comprises the J first-type measurement(s).

In one embodiment, the given time-frequency resource pool only comprises J time-frequency unit(s).

In one embodiment, the given time-frequency resource pool also comprises time-frequency resources apart from the J time-frequency unit(s).

In one embodiment, the J time-frequency unit(s) is(are) time-frequency unit(s) in the given time-frequency resource pool other than a time-frequency unit used for transmission of the first-type communication node.

In one embodiment, the J time-frequency unit(s) is(are) all time-frequency unit(s) in the given time-frequency resource pool that can be used for acquiring a first-type measurement value.

In one embodiment, any first-type measurement of the J first-type measurement(s) comprises frequency domain filtering within the frequency domain range of a time-frequency unit of the J time-frequency unit(s) where the first-type measurement is performed.

In one embodiment, any first-type measurement of the J first-type measurement(s) is an average value of a sum of receiving power values of all multicarrier symbols comprised within the frequency domain range of a time-frequency unit where the corresponding first-type measurement is performed.

In one embodiment, any first-type measurement of the J first-type measurement(s) is an average value of a sum of receiving energies of all multicarrier symbols comprised within the frequency domain range of a time-frequency unit where the corresponding first-type measurement is performed.

In one embodiment, any first-type measurement of the J first-type measurement(s) is an average value of a sum of receiving power values of part of multicarrier symbols comprised within the frequency domain range of a time-frequency unit where the corresponding first-type measurement is performed.

In one embodiment, any first-type measurement of the J first-type measurement(s) is an average value of a sum of receiving energies of part of multicarrier symbols comprised within the frequency domain range of a time-frequency unit where the corresponding first-type measurement is performed.

In one embodiment, all time-frequency resources in the J time-frequency unit(s) are used for at least one first-type measurement of the J first-type measurement(s).

In one embodiment, there is a time-frequency resource comprised in the time-frequency unit(s) that is not used for any first-type measurement of the J first-type measurement(s).

In one embodiment, there is a time-frequency resource comprised in the time-frequency unit(s) that is used for first-type measurement(s) other than the J first-type measurement(s).

In one embodiment, any two time-frequency units of the J time-frequency units comprise equal numbers of time-frequency resources, the J is greater than 1.

In one embodiment, any two time-frequency units of the J time-frequency units comprise the same frequency domain resources, the J is greater than 1.

In one embodiment, there are two time-frequency units in the J time-frequency units that comprise unequal numbers of time-frequency resources, the J is greater than 1.

In one embodiment, any time-frequency unit of the J time-frequency unit(s) occupies a sub-channel in frequency domain and occupies a slot in time domain.

In one embodiment, any time-frequency unit of the J time-frequency unit(s) occupies a positive integer number of consecutive Physical Resource Block (PRBs) in frequency domain, and occupies a slot in time domain.

In one embodiment, any time-frequency unit of the J time-frequency unit(s) occupies a sub-channel in frequency domain and occupies a subframe in time domain.

In one embodiment, any time-frequency unit of the J time-frequency unit(s) occupies a positive integer number of consecutive PRBs in frequency domain, and occupies a subframe in time domain.

In one embodiment, any time-frequency unit of the J time-frequency unit(s) occupies a sub-channel in frequency domain and occupies a positive integer number of consecutive multicarrier symbols in time domain.

In one embodiment, any time-frequency unit of the J time-frequency unit(s) occupies a positive integer number of consecutive PRBs in frequency domain and occupies a positive integer number of consecutive multicarrier symbols in time domain.

Embodiment 12

Figure 12:
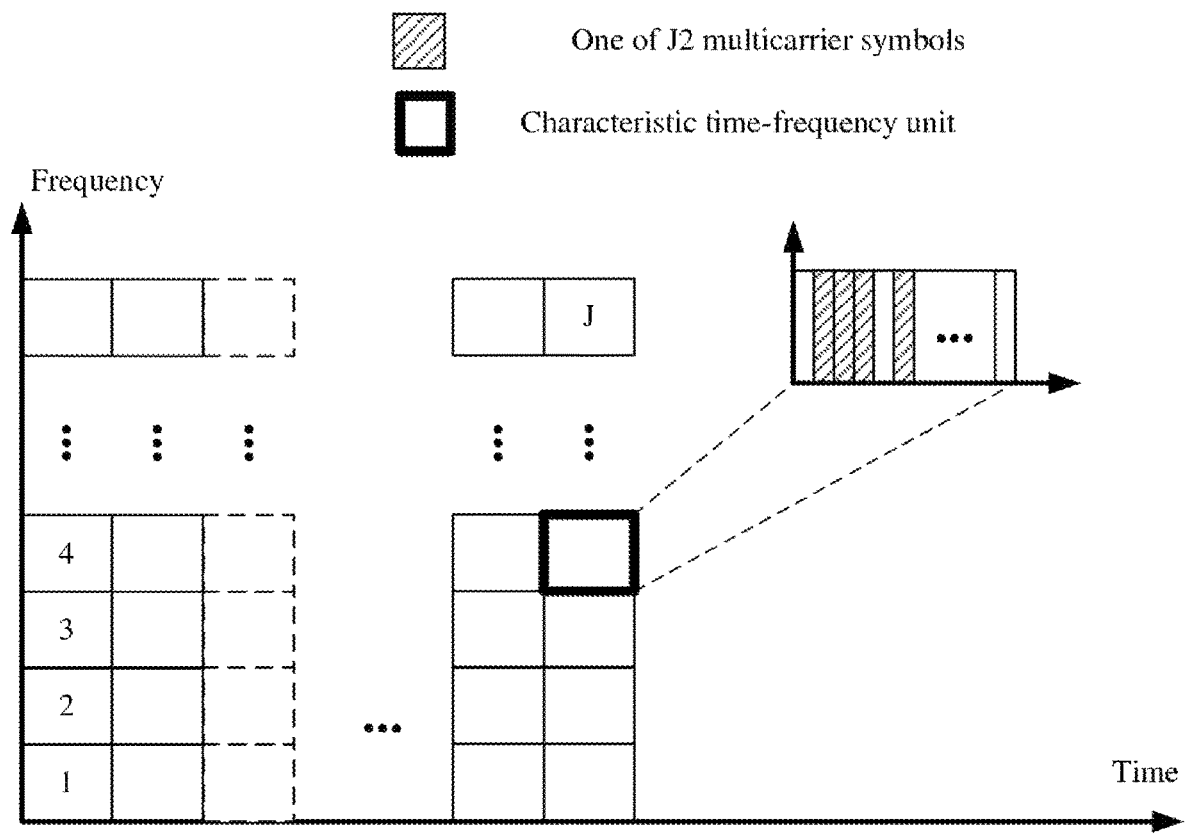
FIG. 12 illustrates a schematic diagram illustrating a relationship between a characteristic time-frequency unit and J2 multicarrier symbols according to one embodiment of the present disclosure.
Figure 13A:
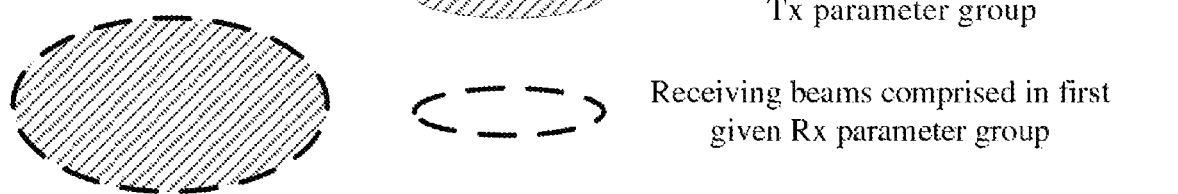
FIG. 13A-13B respectively illustrate a schematic diagram of a first given Rx parameter group associated with a given Tx parameter group according to one embodiment of the present disclosure.
Figure 13B:
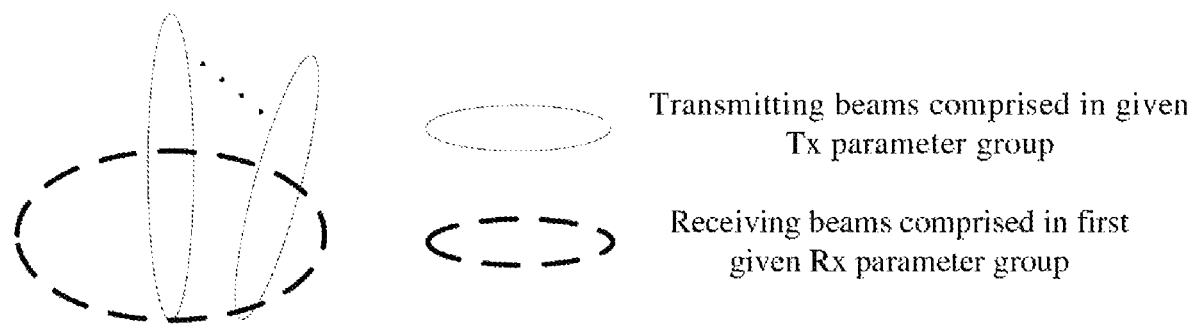

Embodiment 12 illustrates a schematic diagram illustrating a relationship between a characteristic time-frequency unit and J2 multicarrier symbols according to one embodiment of the present disclosure, as shown in FIG. 12.

In Embodiment 12, a given time-frequency resource pool comprises J time-frequency unit(s), J first-type measurement(s) is(are) respectively performed in the J time-frequency unit(s), the J first-type measurement(s) is(are) respectively used for acquiring J first-type measurement value(s), the J is a positive integer; a characteristic measurement value is a first-type measurement value of the J first-type measurement value(s), a first-type measurement value of the J first-type measurement value(s) used for acquiring the characteristic measurement value is performed in a characteristic time-frequency unit, the characteristic time-frequency unit is one of the J time-frequency unit(s), the characteristic time-frequency unit comprises J2 multicarrier symbol(s) in time domain, the characteristic measurement value is an average value of a sum of receiving power values in each multicarrier symbol of the J2 multicarrier symbol(s) within a frequency domain resource occupied by the characteristic time-frequency unit. The given time-frequency resource pool corresponds to the target time-frequency resource pool in the present disclosure, the J time-frequency unit(s) corresponds(correspond) to the X time-frequency unit(s) in the present disclosure, the J first-type measurement(s) corresponds(correspond) to the X first-type measurement(s) in the present disclosure, the J first-type measurement value(s) corresponds(correspond) to the X first-type measurement value(s) in the present disclosure; the J2 multicarrier symbol(s) corresponds(correspond) to the X2 multicarrier symbol(s) in the present disclosure; or, the given time-frequency resource pool corresponds to any alternative time-frequency resource pool of the Q0 alternative time-frequency resource pool(s) in the present disclosure, a group of first-type measurement(s) in the Q0 group(s) of first-type measurements performed in the present disclosure comprises the J first-type measurement(s), a group of first-type measurement value(s) in the Q0 group(s) of first-type measurement values corresponding to the given time-frequency resource pool in the present disclosure comprises the J first-type measurement value(s).

In one embodiment, the characteristic measurement value is any first-type measurement value of the J first-type measurement value(s).

In one embodiment, each time-frequency unit of the J time-frequency unit(s) comprises a positive integer number of multicarrier symbol(s) in time domain.

In one embodiment, each time-frequency unit of the J time-frequency unit(s) comprises J2 multicarrier symbol(s) that can be used for one of the J first-type measurement(s).

In one embodiment, the characteristic time-frequency unit only comprises the J2 multicarrier symbol(s).

In one embodiment, the characteristic time-frequency unit also comprises multicarrier symbol(s) other than the J2 multicarrier symbol(s).

In one embodiment, a time domain position(s) of the J2 multicarrier symbol(s) in the characteristic time-frequency unit is(are) pre-defined.

In one embodiment, a time domain position(s) of the J2 multicarrier symbol(s) in the characteristic time-frequency unit is(are) configurable.

In one embodiment, any first-type measurement of the J first-type measurement(s) is performed within a frequency domain resource occupied by a time-frequency unit of the J time-frequency unit(s) wherein the first-type measurement is performed.

In one embodiment, the phrase that "the characteristic measurement value is an average value of a sum of receiving power value(s) in each of the J2 multicarrier symbol(s) within a frequency domain resource occupied by the characteristic time-frequency unit" refers to: within a frequency domain resource occupied by the characteristic time-frequency unit, one of the J first-type measurement(s) is performed on the J2 multicarrier symbol(s) to acquire J2 power value(s), the characteristic measurement value is equal to a sum of the J2 power value(s) divided by J2.

Embodiment 13

Embodiment 13A to Embodiment 13B respectively illustrate a schematic diagram of a first given Rx parameter group associated with a given Tx parameter group.

In Embodiment 13, the first given Rx parameter group is associated with the given Tx parameter group, a second given Rx parameter group is not associated with the given Tx parameter group. The first given Rx parameter group is a Rx parameter group of the Q Rx parameter groups in the present disclosure corresponding to the target time-frequency resource pool, the second given Rx parameter group is any Rx parameter group of the Q Rx parameter groups in the present disclosure other than the first given Rx parameter group, the given Tx parameter group is a Tx parameter group for the first radio signal in the present disclosure; or, the first given Rx parameter group is a Rx parameter group of the Q Rx parameter groups in the present disclosure corresponding to any alternative time-frequency resource pool of the q alternative time-frequency resource pools, the second given Rx parameter group is a Rx parameter group of the Q Rx parameter groups in the present disclosure corresponding to any alternative time-frequency resource pool other than the q alternative time-frequency resource pools among the Q alternative time-frequency resource pools; q is a positive integer greater than 1 and less than Q, the given Tx parameter group is a Tx parameter group for the first radio signal in the present disclosure.

In one embodiment, the phrase that "the first given Rx parameter group is associated with the given Tx parameter group" refers to: the first given Rx parameter group comprises the given Tx parameter group.

In one embodiment, the phrase that "the second given Rx parameter group is not associated with the given Tx parameter group" refers to: the second given Rx parameter group does not comprise the given Tx parameter group.

In one embodiment, the phrase that "the first given Rx parameter group is associated with the given Tx parameter group" refers to: the given Tx parameter group can be used for inferring the first given Rx parameter group.

In one embodiment, the phrase that "the second given Rx parameter group is not associated with the given Tx parameter group" refers to: the given Tx parameter group cannot be used for inferring the second given Rx parameter group.

In one embodiment, the phrase that "the first given Rx parameter group is associated with the given Tx parameter group" refers to: the first given Rx parameter group can be used for inferring the given Tx parameter group.

In one embodiment, the phrase that "the second given Rx parameter group is not associated with the given Tx parameter group" refers to: the second given Rx parameter group cannot be used for inferring the given Tx parameter group.

In one embodiment, the phrase that "the first given Rx parameter group is associated with the given Tx parameter group" refers to: the first given Rx parameter group comprises a receiving beam, the given Tx parameter group comprises a transmitting beam, a beam width for the transmitting beam comprised in the given Tx parameter group is no greater than a beam width for the transmitting beam comprised in the first given Rx parameter group.

In one embodiment, the phrase that "the second given Rx parameter group is not associated with the given Tx parameter group" refers to: the second given Rx parameter group comprises a receiving beam, the given Tx parameter group comprises a transmitting beam, a beam width for the transmitting beam comprised in the given Tx parameter group is greater than a beam width for the transmitting beam comprised in the second given Rx parameter group.

In one embodiment, the phrase that "the first given Rx parameter group is associated with the given Tx parameter group" refers to: the first given Rx parameter group comprises a receiving beam, the given Tx parameter group comprises a transmitting beam, the transmitting beam comprised in the given Tx parameter group is included by the receiving beam comprised in the first given Rx parameter group.

In one embodiment, the phrase that "the second given Rx parameter group is not associated with the given Tx parameter group" refers to: the second given Rx parameter group comprises a receiving beam, the given Tx parameter group comprises a transmitting beam, the transmitting beam comprised in the given Tx parameter group is not included by the receiving beam comprised in the second given Rx parameter group.

In one embodiment, the Embodiment 13A corresponds to a schematic diagram illustrating the first given Rx parameter group associated with the given Tx parameter group, wherein the transmitting beam comprised in the given Tx parameter group and the receiving beam comprised in the first given Rx parameter group are the same.

In one embodiment, the Embodiment 13B corresponds to a schematic diagram illustrating the first given Rx parameter group associated with the given Tx parameter group, wherein the receiving beam comprised in the first given Rx parameter group not only comprises the transmitting beam comprised in the given Tx parameter group but also comprises transmitting beam(s) other than the transmitting beam comprised in the given Tx parameter group.

Embodiment 14

Figure 14:
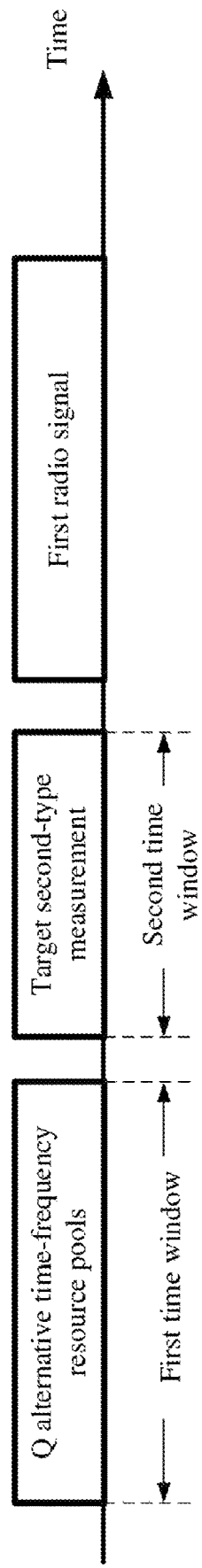
FIG. 14 illustrates a schematic diagram illustrating temporal sequence relations among Q alternative time-frequency resource pools, a target second-type measurement and a first radio signal according to one embodiment of the present disclosure.

Embodiment 14 illustrates a schematic diagram illustrating temporal sequence relations among Q alternative time-frequency resource pools, a target second-type measurement and a first radio signal according to one embodiment of the present disclosure, as shown in FIG. 14.

In Embodiment 14, the Q alternative time-frequency resource pools all belong to a first time window, the target second-type measurement is performed in a second time window, a time domain position of the second time window is used for determining the first time window, an end time of the first time window is no later than a start time of the second time window, and an end time of the second time window is no later than a start time of transmission of the first radio signal.

In one embodiment, the Q1 second-type measurement(s) in the present disclosure is(are) also performed in the second time window.

In one embodiment, the first time window only comprises time domain resources in the Q alternative time-frequency resource pools.

In one embodiment, the first time window also comprises time domain resources other than the time domain resources in the Q alternative time-frequency resource pools.

In one embodiment, the first time window is used for determining the Q alternative time-frequency resource pools.

In one embodiment, the Q alternative time-frequency resource pools comprise all time-frequency resources that can be used for S-RSSI measurement within the first time window in a carrier to which the frequency domain resource occupied by the first radio signal belongs.

In one embodiment, the Q alternative time-frequency resource pools comprise all time-frequency resources that can be used for S-RSSI measurement within the first time window in multiple carriers of which a carrier comprises the frequency domain resource occupied by the first radio signal.

In one embodiment, a time length of the first time window is 100 ms.

In one embodiment, a time length of the first time window is pre-defined.

In one embodiment, a time length of the first time window is configurable.

In one embodiment, an end time for the first time window is a start time for the second time window.

In one embodiment, an end time for the first time window is earlier than a start time for the second time window.

In one embodiment, a time length of the second time window is 1 ms.

In one embodiment, a time length of the second time window is pre-defined.

In one embodiment, a time length of the second time window is configurable.

In one embodiment, an end time for the second time window is a start time for transmission of the first radio signal.

In one embodiment, an end time for the second time window is earlier than a start time for transmission of the first radio signal.

In one embodiment, performing the target second-type measurement occupies all time within the second time window.

In one embodiment, performing the target second-type measurement occupies part of time within the second time window.

In one embodiment, a time difference between a start time for the second time window and a start time for the first time window is pre-defined.

In one embodiment, a time difference between a start time for the second time window and a start time for the first time window is configurable.

In one embodiment, a time difference between an end time for the second time window and a start time for the first time window is pre-defined.

In one embodiment, a time difference between an end time for the second time window and a start time for the first time window is configurable.

Embodiment 15

Embodiment 15 illustrates a schematic diagram illustrating relations among P alternative intervals, P alternative MCS subsets and P alternative resource numerical value subsets according to one embodiment of the present disclosure, as shown in FIG. 15. In FIG. 15, the second column from the left represents P alternative intervals, the third column from the left represents P alternative MCS subsets, wherein each number represents an MCS index, the fourth column from the left represents P alternative resource numerical value subsets, the numbers and letters in bold respectively represent a target interval, a first MCS subset and a first alternative resource numerical value subset.

In Embodiment 15, a second-type measurement value acquired after performing the target second-type measurement belongs to a target interval, the target interval is one of P alternative intervals, any alternative interval of the P alternative intervals is an interval of non-negative real numbers, the P alternative intervals respectively correspond to P alternative MCS subsets, the P alternative intervals respectively correspond to P alternative resource numerical value subsets, P is a positive integer greater than 1; an alternative MCS subset of the P alternative MCS subsets corresponding to the target interval is a first MCS subset, an alternative resource numerical value subset of the P alternative resource numerical value subsets corresponding to the target interval is a first resource numerical value subset; an MCS adopted by the first radio signal is an MCS in the first MCS subset, a number of radio resources occupied by the first radio signal is equal to a resource numerical value in the first resource numerical value subset.

In one embodiment, any two alternative intervals of the P alternative intervals have an equal interval length.

In one embodiment, there are two alternative intervals of the P alternative intervals that have unequal interval lengths.

In one embodiment, any two alternative intervals of the P alternative intervals are orthogonal.

In one embodiment, there are two alternative intervals of the P alternative intervals that are partially overlapping.

In one embodiment, any alternative MCS subset of the P alternative MCS subsets comprises a positive integer number of Modulation Coding Scheme(s).

In one embodiment, any two alternative MCS subsets of the P alternative MCS subsets comprise equal numbers of MCS(s).

In one embodiment, there are two alternative MCS subsets in the P alternative MCS subsets that comprise different numbers of MCSs.

In one embodiment, the P alternative MCS subsets are pre-defined.

In one embodiment, the P alternative MCS subsets are configurable.

In one embodiment, the one-to-one correspondence relation between the P alternative intervals and the P alternative MCS subsets is pre-defined.

In one embodiment, the one-to-one correspondence relation between the P alternative intervals and the P alternative MCS subsets is configurable.

In one embodiment, the P alternative resource numerical value subsets are pre-defined.

In one embodiment, the P alternative resource numerical value subsets are configurable.

In one embodiment, any two resource numerical values respectively comprised by any two alternative resource numerical value subsets of the P alternative resource numerical value subsets are unequal.

In one embodiment, there are two alternative resource numerical value subsets in the P alternative resource numerical value subsets that comprises equal resource numerical values respectively.

In one embodiment, numbers of resource numerical values respectively comprised by any two alternative resource numerical value subsets of the P alternative resource numerical value subsets are equal.

In one embodiment, there are two alternative resource numerical value subsets in the P alternative resource numerical value subsets that comprises unequal numbers of resource numerical values respectively.

In one embodiment, the one-to-one correspondence relation between the P alternative intervals and the P alternative resource numerical value subsets is pre-defined.

In one embodiment, the one-to-one correspondence relation between the P alternative intervals and the P alternative resource numerical value subsets is configurable.

In one embodiment, the P alternative intervals respectively correspond to P alternative space domain resource subsets as well, an alternative space domain resource subset of the P alternative space domain resource subsets corresponding to the target interval is a first space domain resource subset, a space domain resource in the first space domain resource subset is used for determining a space domain resource occupied by the first radio signal.

In one sub-embodiment of the above embodiment, the P alternative space domain resource subsets are indicated by the third information.

In one sub-embodiment of the above embodiment, a space domain resource occupied by the first radio signal is equal to a space domain resource in the first space domain resource subset.

In one sub-embodiment of the above embodiment, any space domain resource in the P alternative space domain resource subsets comprises transmitting PMI.

In one sub-embodiment of the above embodiment, any space domain resource in the P alternative space domain resource subsets comprises transmitting a beam.

In one sub-embodiment of the above embodiment, any space domain resource in the P alternative space domain resource subsets comprises spatial Tx parameters.

In one sub-embodiment of the above embodiment, any space domain resource in the P alternative space domain resource subsets comprises transmitting spatial filtering.

Embodiment 16

Figure 16:
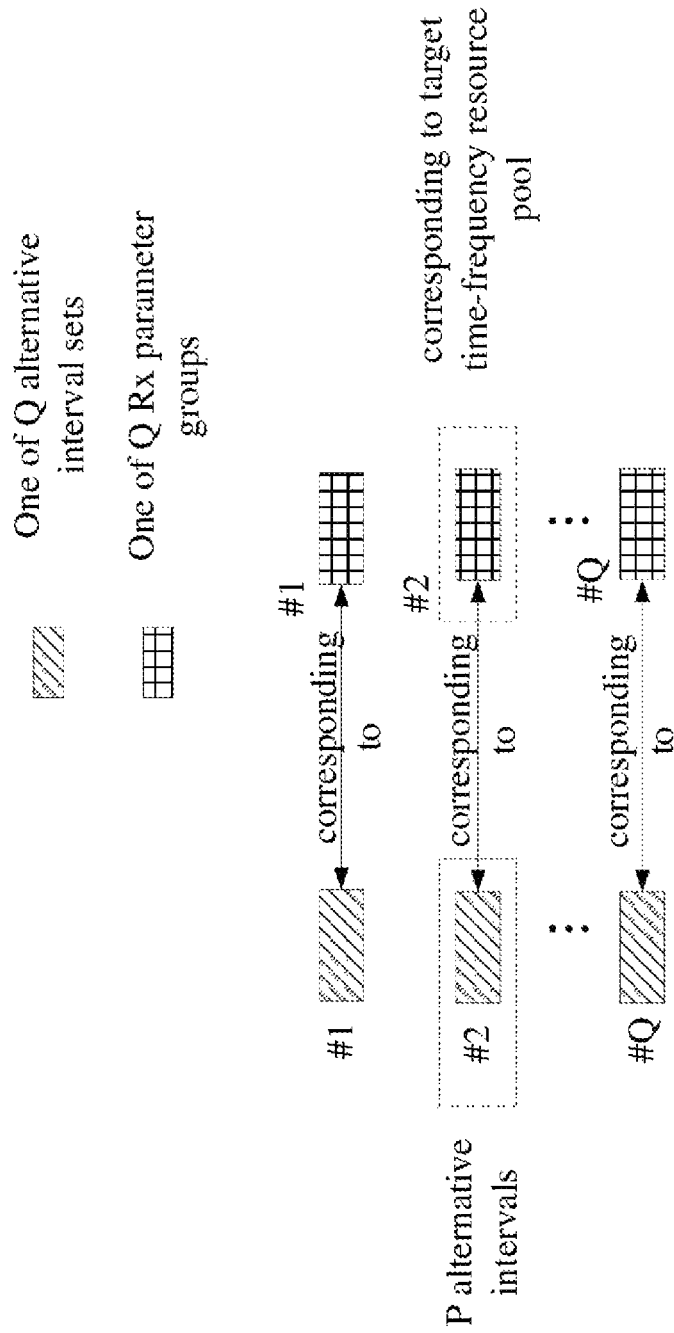
FIG. 16 illustrates a schematic diagram illustrating a relationship between Q alternative interval sets and P alternative intervals according to one embodiment of the present disclosure.

Embodiment 16 illustrates a schematic diagram illustrating a relationship between Q alternative interval sets and P alternative intervals according to one embodiment of the present disclosure, as shown in FIG. 16.

In Embodiment 16, the Q alternative interval sets respectively correspond to the Q Rx parameter groups in the present disclosure, any alternative interval in the Q alternative interval sets is an interval of non-negative real numbers, the Q alternative interval sets respectively correspond to the Q alternative MCS sets, the Q alternative interval sets respectively correspond to the Q alternative resource numerical value sets; the P alternative intervals belong to one of the Q alternative interval sets, the P alternative MCS subsets in the present disclosure belong to one of the Q alternative MCS sets, the P alternative resource numerical value subsets in the present disclosure belong to one of the Q alternative resource numerical value sets.

In one embodiment, an alternative interval set of the Q alternative interval sets to which the P alternative intervals belong corresponds to a Rx parameter group of the Q Rx parameter groups corresponding to the target time-frequency resource pool.

In one embodiment, any two alternative interval sets of the Q alternative interval sets are the same.

In one embodiment, at least two alternative sets of the Q alternative interval sets are the same.

In one embodiment, at least two alternative sets of the Q alternative interval sets are different.

In one embodiment, any two alternative interval sets of the Q alternative interval sets are different.

In one embodiment, the Q alternative MCS sets are pre-defined.

In one embodiment, the Q alternative MCS sets are configurable.

In one embodiment, the one-to-one correspondence relation between the Q alternative interval sets and the Q alternative MCS sets is pre-defined.

In one embodiment, the one-to-one correspondence relation between the Q alternative interval sets and the Q alternative MCS sets is configurable.

In one embodiment, the Q alternative resource numerical value sets are pre-defined.

In one embodiment, the Q alternative resource numerical value sets are configurable.

In one embodiment, the one-to-one correspondence relation between the Q alternative interval sets and the Q resource numerical value sets is pre-defined.

In one embodiment, the one-to-one correspondence relation between the Q alternative interval sets and the Q resource numerical value sets is configurable.

In one embodiment, a given alternative interval set is any alternative interval set of the Q alternative interval sets, a given alternative MCS set is an alternative MCS set of the Q alternative MCS sets corresponding to the given alternative interval set; the given alternative interval set comprises a positive integer number of alternative interval(s), the given alternative MCS set comprises a positive integer number of alternative MCS subset(s), the alternative MCS subset(s) comprises(comprise) a positive integer number of MCS(s), a number of alternative intervals comprised in the given alternative intervals sets and a number of alternative MCS subsets comprised in the given alternative MCS set are the same.

In one embodiment, a given alternative interval set is any alternative interval set of the Q alternative interval sets, a given resource numerical value set is an alternative resource numerical value set of the Q alternative resource numerical value sets corresponding to the given alternative interval set; the given alternative interval set comprises a positive integer number of alternative interval(s), the given alternative the given alternative resource numerical value set comprises a positive integer number of alternative resource numerical value subset(s), the alternative resource numerical value subset(s) comprises(comprise) a positive integer number of alternative resource numerical value(s), a number of alternative intervals comprised in the given alternative interval set and a number of alternative resource numerical value subsets comprised in the given alternative numerical value set are the same.

In one embodiment, the Q alternative interval sets respectively correspond to Q alternative space domain resource sets as well, the P alternative space domain resource subsets belong to one of the Q alternative space domain resource sets.

In one sub-embodiment of the above embodiment, the Q alternative space domain resource sets are indicated by the third information.

In one sub-embodiment of the above embodiment, the Q alternative space domain resource sets are pre-defined.

In one sub-embodiment of the above embodiment, the Q alternative space domain resource sets are configurable.

In one sub-embodiment of the above embodiment, the one-to-one correspondence relation between the Q alternative interval sets and the Q alternative space domain resource sets is pre-defined.

In one sub-embodiment of the above embodiment, the one-to-one correspondence relation between the Q alternative interval sets and the Q alternative space domain resource sets is configurable.

In one sub-embodiment of the above embodiment, a given alternative interval set is any alternative interval set of the Q alternative interval sets, a given alternative space domain resource set is an alternative space domain resource set of the Q alternative space domain resource sets corresponding to the given alternative interval set; the given alternative interval set comprises a positive integer number of alternative interval(s), the given alternative space domain resource set comprises a positive integer number of alternative space domain resource subset(s), the alternative space domain resource subset(s) comprises(comprise) a positive integer number of space domain resource(s), a number of alternative intervals comprised in the given alternative interval set and a number of alternative space domain resource subsets comprised in the given alternative space domain resource set are the same.

In one sub-embodiment of the above embodiment, any space domain resource in the Q alternative space domain resource sets comprises transmitting PMI.

In one sub-embodiment of the above embodiment, any space domain resource in the Q alternative space domain resource sets comprises transmitting a beam.

In one sub-embodiment of the above embodiment, any space domain resource in the Q alternative space domain resource sets comprises spatial Tx parameters.

In one sub-embodiment of the above embodiment, any space domain resource in the Q alternative space domain resource sets comprises transmitting spatial filtering.

Embodiment 17

Figure 17:
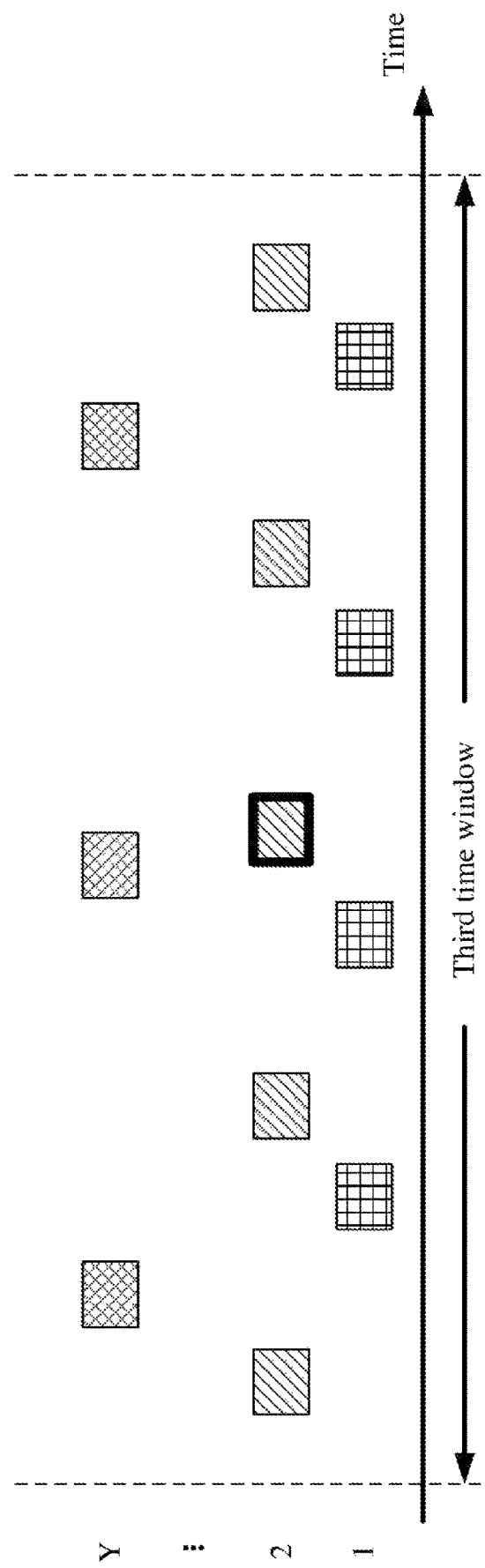
FIG. 17 illustrates a schematic diagram of Y third-type measurements according to one embodiment of the present disclosure.

Embodiment 17 illustrates a schematic diagram of Y third-type measurements according to one embodiment of the present disclosure, as shown in FIG. 17. In FIG. 17, the horizontal axis represents time, each rectangle represents a time-frequency resource occupied by a radio signal transmitted by the transmitter of the first radio signal within the third time window, the rectangle framed with thick lines represents a time-frequency resource occupied by the first radio signal, rectangles with different fillings respectively represent the time-frequency resource being used for each measurement of Y third-type measurements.

In Embodiment 17, the first-type communication node in the present disclosure performs Y third-type measurement(s) in a third time window, the Y third-type measurement(s) is(are) used for acquiring Y third-type measurement(s) respectively, Y is a positive integer; a second-type measurement value acquired after performing the target second-type measurement is used for determining a first upper bound, a sum of the Y third-type measurement value(s) is no greater than the first upper bound, a time domain position of the third time window is related to time domain resources occupied by the first radio signal, the Y third-type measurement value(s) is(are) related to a number of time-frequency resources occupied by radio signal(s) transmitted by a transmitter of the first radio signal within the third time window, employing a Tx parameter group associated with a Rx parameter group of the Q Rx parameter groups corresponding to the target time-frequency resource pool.

In one embodiment, any third-type measurement of the Y third-type measurements is one measurement on Channel occupancy Ratio (CR).

In one embodiment, any third-type measurement of the Y third-type measurements is one measurement on Channel occupancy Quantity (CQ).

In one embodiment, any third-type measurement of the Y third-type measurements and the target second-type measurement in the present disclosure are two types of measurements.

In one embodiment, any third-type measurement of the Y third-type measurements and any first-type measurement of the X first-type measurement(s) in the present disclosure are two types of measurements.

In one embodiment, any third-type measurement of the Y third-type measurements is used for determining a channel occupancy status of the channel measured.

In one embodiment, any third-type measurement of the Y third-type measurements is used for determining a channel occupancy status within a frequency range measured.

In one embodiment, the Y third-type measurements respectively correspond to Y ProSe Per-Packet Priorities (PPPP).

In one embodiment, any third-type measurement of the Y third-type measurements is a measurement on CR under a PPPP.

In one embodiment, any measurement value of the Y third-type measurement values is a value of a CR.

In one embodiment, any measurement value of the Y third-type measurement values is a value of a CQ.

In one embodiment, the Y third-type measurements respectively correspond to values of CRs under Y PPPPs.

In one embodiment, the Y third-type measurement values respectively correspond to Y PPPPs, a PPPP to which a packet carried by the first radio signal belongs is a minimum PPPP among the Y PPPPs.

In one embodiment, the Y third-type measurement values respectively correspond to Y priorities, a priority to which a packet carries by the first radio signal belongs is a lowest priority of the Y priorities.

In one embodiment, the Y third-type measurement values respectively correspond to Y priorities, a priority to which a packet carries by the first radio signal belongs is a highest priority of the Y priorities.

In one embodiment, the Y third-type measurement values respectively correspond to Y priority indexes, a priority index of a priority to which a packet carries by the first radio signal belongs is a smallest index of the Y priority indexes.

In one embodiment, the Y third-type measurement values respectively correspond to Y priority indexes, a priority index of a priority to which a packet carries by the first radio signal belongs is a greatest index of the Y priority indexes.

In one embodiment, the first signaling in the present disclosure is also used for determining the first upper bound.

In one embodiment, the phrase that "a second-type measurement value acquired after performing the target second-type measurement is used for determining a first upper bound" refers to: a second-type measurement value acquired after performing the target second-type measurement is used by the first-type communication node for determining a first upper bound.

In one embodiment, the phrase that "a second-type measurement value acquired after performing the target second-type measurement is used for determining a first upper bound" refers to: a second-type measurement value acquired after performing the target second-type measurement is used for determining a first upper bound based on a given correspondence relation, the correspondence relation is pre-defined or configurable.

In one embodiment, the phrase that "a second-type measurement value acquired after performing the target second-type measurement is used for determining a first upper bound" refers to: the P alternative intervals in the present disclosure respectively correspond to P alternative upper bounds, the first upper bound is an alternative upper bound of the P alternative upper bounds corresponding to the target interval in the present disclosure, a one-to-one correspondence relation between the P alternative intervals and P alternative upper bounds is configurable.

In one sub-embodiment of the above embodiment, the Q alternative interval sets in the present disclosure respectively correspond to Q alternative upper bound sets, the P alternative upper bounds belong to one of the Q alternative upper bound sets, a one-to-one correspondence relation between the P alternative intervals and the Q alternative upper bound sets is configurable.

In one embodiment, a time length of the third time window is equal to 1 s.

In one embodiment, a time length of the third time window is pre-defined.

In one embodiment, a time length of the third time window is configurable.

In one embodiment, a time length of the third time window is self-determined by the first-type communication node.

In one embodiment, the phrase that "a time domain position of the third time window is related to time domain resources occupied by the first radio signal" refers to: an end time for the third time window is no later than a start time for transmission of the first radio signal.

In one embodiment, the phrase that "a time domain position of the third time window is related to time domain resources occupied by the first radio signal" refers to: under the condition that an end time for the third time window is no later than a start time for transmission of the first radio signal, a time domain position of the third time window is self-determined by the first-type communication node.

In one embodiment, the phrase that "a time domain position of the third time window is related to time domain resources occupied by the first radio signal" refers to: a time domain resource occupied by the first radio signal is used for determining a time domain position of the third time window.

In one embodiment, the phrase that "a time domain position of the third time window is related to time domain resources occupied by the first radio signal" refers to: the third time window comprises a time domain resource occupied by the first radio signal and a reserved time domain resource configured in the grant of the first radio signal.

In one embodiment, the phrase that "a time domain position of the third time window is related to time domain resources occupied by the first radio signal" refers to: the third time window comprises a time domain resource occupied by the first radio signal and part of a reserved time domain resource configured in the grant of the first radio signal.

In one embodiment, the phrase that "a time domain position of the third time window is related to time domain resources occupied by the first radio signal" refers to: the third time window does not comprise any reserved time domain resource configured in the grant of the first radio signal.

In one embodiment, the phrase that "a time domain position of the third time window is related to time domain resources occupied by the first radio signal" refers to: the third time window is divided into a first sub-time window and a second sub-time window according to temporal sequence, a time length of the first sub-time window is self-determined by the first-type communication node, and the second sub-time window comprises a time domain resource occupied by the first radio signal and a reserved time. domain resource configured in the grant of the first radio signal.

In one embodiment, the phrase that "a time domain position of the third time window is related to time domain resources occupied by the first radio signal" refers to: under the condition that an end time for the third time window is no later than a latest end time for a reserved time domain resource configured in the grant of the first radio signal, a time domain position of the third time window is self-determined by the first-type communication node.

In one embodiment, the phrase that "a time domain position of the third time window is related to time domain resources occupied by the first radio signal" refers to: the third time window is divided into a first sub-time window and a second sub-time window according to temporal sequence, a time length of the first sub-time window is self-determined by the first-type communication node when no less than a length threshold, and an end time for the second sub-time window is no later than a latest end time for a reserved time domain resource configured in the grant of the first radio signal.

In one embodiment, the Y third-type measurement values respectively correspond to Y priorities, any one of the Y third-type measurement values is a number of time-frequency resources occupied by first radio signal(s) with a corresponding priority transmitted by a transmitter of the first radio signal within the third time window, employing a Tx parameter group associated with a Rx parameter group of the Q Rx parameter groups corresponding to the target time-frequency resource pool.

In one embodiment, the Y third-type measurement values respectively correspond to Y priorities, any one of the Y third-type measurement values is a ratio of a number of time-frequency resources occupied by first radio signal(s) with a corresponding priority transmitted by a transmitter of the first radio signal within the third time window to a total number of time-frequency resources with the corresponding priority within the third time window, the former employing a Tx parameter group associated with a Rx parameter group of the Q Rx parameter groups corresponding to the target time-frequency resource pool.

Embodiment 18

Figure 18:
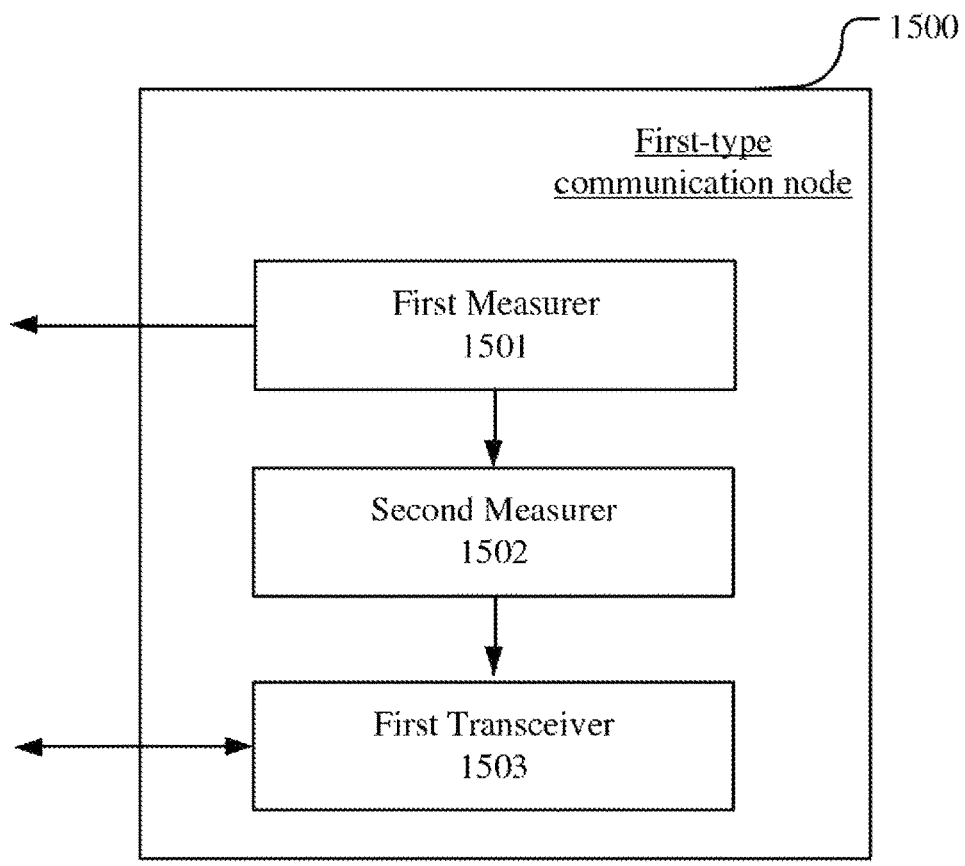
FIG. 18 illustrates a structure block diagram of a processing device in a first-type communication node according to one embodiment of the present disclosure.

Embodiment 18 illustrates a structure block diagram of a processing device in a first-type communication node according to one embodiment, as shown in FIG. 18. In FIG. 18, a first-type communication node 1500 comprises a first measurer 1501, a second measurer 1502 and a first transceiver 1503.

In one embodiment, the first measurer 1501 comprises a receiver of the transmitter/receiver 456 (including an antenna 460), a receiving processor 452 and a controller/processor 490 in FIG. 4 of the present disclosure.

In one embodiment, the first measurer 1501 comprises at least the former two of a receiver of the transmitter/receiver 456 (including an antenna 460), a receiving processor 452 and a controller/processor 490 in FIG. 4 of the present disclosure.

In one embodiment, the first measurer 1501 comprises a receiver of the receiver/transmitter 516 (including an antenna 520), a receiving processor 512 and a controller/processor 540 in FIG. 5 of the present disclosure.

In one embodiment, the first measurer 1501 comprises at least the former two of a receiver of the receiver/transmitter 516 (including an antenna 520), a receiving processor 512 and a controller/processor 540 in FIG. 5 of the present disclosure In one embodiment, the first measurer 1501 comprises at least the former two of a receiver 516 (including an antenna 520), a receiving processor 512 and a controller/processor 540 in FIG. 5 of the present disclosure.

In one embodiment, the second measurer 1502 comprises a controller/processor 490 in FIG. 4 of the present disclosure.

In one embodiment, the second measurer 1502 comprises a controller/processor 540 in FIG. 5 of the present disclosure.

In one embodiment, the first transceiver 1503 comprises a transmitter/receiver 456 (including an antenna 460), a receiving processor 452, a transmitting processor 455 and a controller/processor 490 in FIG. 4 of the present disclosure.

In one embodiment, the second measurer 1502 comprises a controller/processor 540 in FIG. 5 of the present disclosure.

In one embodiment, the first transceiver 1503 comprises at least the former two of a transmitter/receiver 456 (including an antenna 460), a receiving processor 452, a transmitting processor 455 and a controller/processor 490 in FIG. 4 of the present disclosure.

In one embodiment, the first transceiver 1503 comprises a receiver/transmitter 516 (including an antenna 460), a receiving processor 512, a transmitting processor 515 and a controller/processor 540 in FIG. 5 of the present disclosure.

In one embodiment, the first transceiver 1503 comprises at least the former two of a receiver/transmitter 516 (including an antenna 460), a receiving processor 512, a transmitting processor 515 and a controller/processor 540 in FIG. 5 of the present disclosure.

The first measurer 1501 performs X first-type measurement(s) in a target time-frequency resource pool.

The second measurer 1502 performs a target second-type measurement.

And the first transceiver 1503 transmits a first radio signal.

In Embodiment 18, the X first-type measurement(s) is(are) respectively used for acquiring X first-type measurement value(s), X is a positive integer; the target second-type measurement is used for acquiring a second-type measurement value; the target time-frequency resource pool is one of Q alternative time-frequency resource pools, the Q alternative time-frequency resource pools respectively correspond to Q Receive (Rx) parameter groups, any two Rx parameter groups of the Q Rx parameter groups are different, Q is a positive integer greater than 1; a Rx parameter group of the Q Rx parameter groups corresponding to the target time-frequency resource pool is associated with a Transmit(Tx) parameter group for the first radio signal; the X first-type measurement value(s) is(are) used for the target second-type measurement, the second-type measurement value acquired after performing the target second-type measurement is used for determining at least one of an MCS adopted by the first radio signal and radio resources occupied by the first radio signal.

In one embodiment, the first transceiver 1503 also transmits a first signaling; wherein, the first signaling is used for indicating at least one of an MCS adopted by the first radio signal and radio resources occupied by the first radio signal, the first signaling is transmitted via an air interface; the Q alternative time-frequency resource pools all belong to a first time window in the time domain, the target second-type measurement is performed in a second time window, a time domain position of the second time window is used for determining the first time window, an end time of the first time window is no later than a start time of the second time window, and an end time of the second time window is no later than a start time of transmission of the first radio signal.

In one embodiment, the target time-frequency resource pool comprises X time-frequency unit(s), the X first-type measurement(s) is(are) respectively performed in the X time-frequency unit(s); a Rx parameter group of the Q Rx parameter groups corresponding to the target time-frequency resource pool is used for each first-type measurement of the X first-type measurement(s); a characteristic measurement value is a first-type measurement value of the X first-type measurement value(s), a first-type measurement value of the X first-type measurement value(s) used for acquiring the characteristic measurement value is performed in a characteristic time-frequency unit, the characteristic time-frequency unit is one of the X time-frequency unit(s), the characteristic time-frequency unit comprises X2 multicarrier symbol(s) in time domain, the characteristic measurement value is an average value of a sum of receiving power value(s) of each of the X2 multicarrier symbol(s) within a frequency domain resource occupied by the characteristic time-frequency unit.

In one embodiment, the first transceiver 1503 also receives first information; wherein, each of X1 first-type measurement value(s) out of the X first-type measurement value(s) is greater than a target threshold, the second-type measurement value acquired after performing the target second-type measurement is equal to a ratio of X1 to X, X1 is a non-negative integer not greater than X; the first information is used for determining the target threshold.

In one embodiment, Q alternative thresholds respectively correspond to the Q Rx parameter groups, the target threshold is one of the Q alternative thresholds.

In one embodiment, the first measurer 1501 also performs Q0 group(s) of first-type measurements respectively in Q0 alternative time-frequency resource pool(s) of the Q alternative time-frequency resource pools, the Q0 group(s) of first-type measurements is(are) respectively used for acquiring Q0 group(s) of first-type measurement values; wherein, each of the Q0 alternative time-frequency resource pool(s) is different from the target time-frequency resource pool, Q0 is a positive integer less than Q.

In one embodiment, the second measurer 1502 also performs Q1 second-type measurement(s), the Q1 second-type measurement(s) is(are) respectively used for acquiring Q1 second-type measurement value(s); wherein, Q1 group(s) of first-type measurement values out of the Q0 group(s) of first-type measurement value(s) is(are) respectively used for the Q1 second-type measurement(s), Q1 is a positive integer not greater than Q0.

In one embodiment, each of the Q1 second-type measurement value(s) is no less than a second-type measurement value acquired after performing the target second-type measurement.

In one embodiment, the first transceiver 1503 also receives second information; wherein, the second information is used for determining the Tx parameter group for the first radio signal.

In one embodiment, the first transceiver 1503 also receives third information; wherein, a second-type measurement value acquired after performing the target second-type measurement belongs to a target interval, the target interval is one of P alternative intervals, any alternative interval of the P alternative intervals is an interval of non-negative real numbers, the P alternative intervals respectively correspond to P alternative MCS subsets, the P alternative intervals respectively correspond to P alternative resource numerical value subsets, P is a positive integer greater than 1; an alternative MCS subset of the P alternative MCS subsets corresponding to the target interval is a first MCS subset, an alternative resource numerical value subset of the P alternative resource numerical value subsets corresponding to the target interval is a first resource numerical value subset; the third information is used for determining at least one of the MCS adopted by the first radio signal and the radio resources occupied by the first radio signal, wherein the MCS adopted by the first radio signal is an MCS in the first MCS subset, a number of the radio resources occupied by the first radio signal is equal to a resource numerical value in the first resource numerical value subset.

In one embodiment, Q alternative interval sets respectively correspond to the Q Rx parameter groups, any alternative interval in the Q alternative interval sets is an interval of non-negative real numbers, the Q alternative interval sets respectively correspond to Q alternative MCS sets, the Q alternative interval sets respectively correspond to Q alternative resource numerical value sets; the P alternative intervals belong to one of the Q alternative interval sets, the P alternative MCS subsets belong to one of the Q alternative MCS sets, the P alternative resource numerical value subsets belong to one of the Q alternative resource numerical value sets.

In one embodiment, the second measurer 1502 also performs Y third-type measurement(s), the Y third-type measurement(s) is(are) used for acquiring Y third-type measurement(s) respectively, Y is a positive integer; wherein, a second-type measurement value acquired after performing the target second-type measurement is used for determining a first upper bound, a sum of the Y third-type measurement value(s) is no greater than the first upper bound, a time domain position of the third time window is related to time domain resources occupied by the first radio signal, the Y third-type measurement value(s) is(are) related to a number of time-frequency resources occupied by radio signal(s) transmitted by a transmitter of the first radio signal within the third time window, employing a Tx parameter group associated with a Rx parameter group of the Q Rx parameter groups corresponding to the target time-frequency resource pool Embodiment 19

Figure 19:
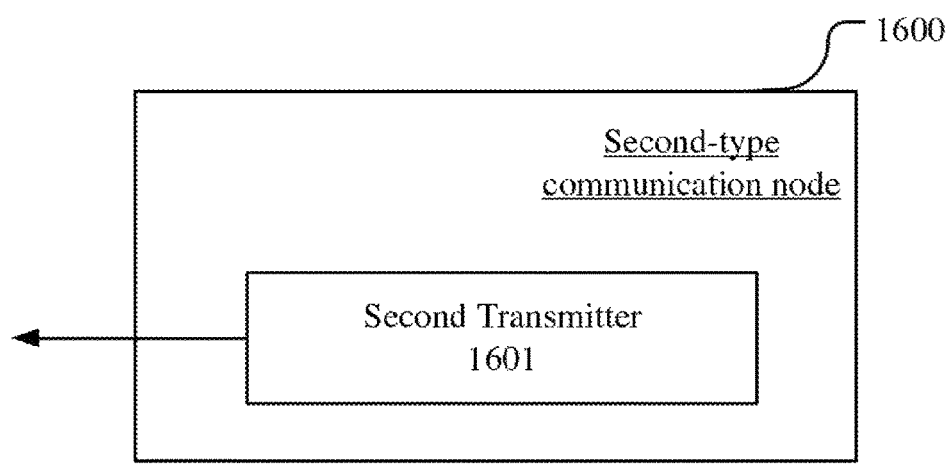
FIG. 19 illustrates a structure block diagram of a processing device in a second-type communication node according to one embodiment of the present disclosure.

Embodiment 19 illustrates a structure block diagram of a processing device in a second-type communication node according to one embodiment, as shown in FIG. 19. In FIG. 19, a second-type communication node processing device 1600 comprises a second transmitter 1601.

In one embodiment, the second transmitter 1601 comprises a transmitter/receiver 416 (including an antenna 420), a transmitting processor 415 and a controller/processor 440 in FIG. 4 of the present disclosure.

In one embodiment, the second transmitter 1601 comprises at least the former two of a transmitter/receiver 416 (including an antenna 420), a transmitting processor 415 and a controller/processor 440 in FIG. 4 of the present disclosure.

The second transmitter 1601 transmits first information.

In Embodiment 19, X first-type measurement(s) performed in a target time-frequency resource pool is(are) respectively used for acquiring X first-type measurement value(s), X is a positive integer; the target time-frequency resource pool is one of Q alternative time-frequency resource pools, the Q alternative time-frequency resource pools respectively correspond to Q Rx parameter groups, any two Rx parameter groups of the Q Rx parameter groups are different, Q is a positive integer greater than 1; a Rx parameter group of the Q Rx parameter groups corresponding to the target time-frequency resource pool is associated with a Tx parameter group for the first radio signal; the X first-type measurement value(s) is(are) used for a target second-type measurement, the target second-type measurement is used for acquiring a second-type measurement value, the second-type measurement value acquired after performing the target second-type measurement is used for determining at least one of an MCS adopted by the first radio signal and radio resources occupied by the first radio signal; each of X1 first-type measurement value(s) out of the X first-type measurement value(s) is greater than a target threshold, the second-type measurement value acquired after performing the target second-type measurement is equal to a ratio of X1 to X, X1 is a non-negative integer not greater than X, the first information is used for determining the target threshold.

In one embodiment, the Q alternative time-frequency resource pools all belong to a first time window in time domain, the target second-type measurement is performed in a second time window, a time domain position of the second time window is used for determining the first time window, an end time of the first time window is no later than a start time of the second time window, and an end time of the second time window is no later than a start time of transmission of the first radio signal.

In one embodiment, the target time-frequency resource pool comprises X time-frequency unit(s), the X first-type measurement(s) is(are) respectively performed in the X time-frequency unit(s); a Rx parameter group of the Q Rx parameter groups corresponding to the target time-frequency resource pool is used for each first-type measurement of the X first-type measurement(s); a characteristic measurement value is a first-type measurement value of the X first-type measurement value(s), a first-type measurement value of the X first-type measurement value(s) used for acquiring the characteristic measurement value is performed in a characteristic time-frequency unit, the characteristic time-frequency unit is one of the X time-frequency unit(s), the characteristic time-frequency unit comprises X2 multicarrier symbol(s) in time domain, the characteristic measurement value is an average value of a sum of receiving power value(s) of each of the X2 multicarrier symbol(s) within a frequency domain resource occupied by the characteristic time-frequency unit.

In one embodiment, Q alternative thresholds respectively correspond to the Q Rx parameter groups, the target threshold is one of the Q alternative thresholds.

In one embodiment, the second transmitter 1601 also transmits second information; wherein, the second information is used for determining a Tx parameter group for the first radio signal.

In one embodiment, the second transmitter 1601 also transmits third information; wherein, a second-type measurement value acquired after performing the target second-type measurement belongs to a target interval, the target interval is one of P alternative intervals, any alternative interval of the P alternative intervals is an interval of non-negative real numbers, the P alternative intervals respectively correspond to P alternative MCS subsets, the P alternative intervals respectively correspond to P alternative resource numerical value subsets, P is a positive integer greater than 1; an alternative MCS subset of the P alternative MCS subsets corresponding to the target interval is a first MCS subset, an alternative resource numerical value subset of the P alternative resource numerical value subsets corresponding to the target interval is a first resource numerical value subset; the third information is used for determining at least one of the MCS adopted by the first radio signal and the radio resources occupied by the first radio signal, wherein the MCS adopted by the first radio signal is an MCS in the first MCS subset, a number of the radio resources occupied by the first radio signal is equal to a resource numerical value in the first resource numerical value subset.

In one embodiment, Q alternative interval sets respectively correspond to the Q Rx parameter groups, any alternative interval in the Q alternative interval sets is an interval of non-negative real numbers, the Q alternative interval sets respectively correspond to Q alternative MCS sets, the Q alternative interval sets respectively correspond to Q alternative resource numerical value sets; the P alternative intervals belong to one of the Q alternative interval sets, the P alternative MCS subsets belong to one of the Q alternative MCS sets, the P alternative resource numerical value subsets belong to one of the Q alternative resource numerical value sets.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The first-type communication node or UE or terminal in the present disclosure includes but is not limited to mobile phones, tablet computers, notebooks, network cards, low-consumption equipment, enhanced MTC (eMTC) equipment, NB-IOT terminals, vehicle-mounted equipment, aircrafts, airplanes, unmanned aerial vehicles, telecontrolled aircrafts, etc. The second-type communication node or base station or network side equipment in the present application includes but is not limited to macro-cellular base stations, micro-cellular base stations, home base stations, relay base station, eNB, gNB, Transmitter Receiver Point (TRP), relay satellites, satellite base station, aerial base station and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a first-type communication node for wireless communication, comprising:
performing X first-type measurement(s) in a target time-frequency resource pool, the X first-type measurement(s) being respectively used for acquiring X first-type measurement value(s), X is a positive integer, wherein one first-type measurement is one measurement on an average of power values on a given time-frequency resource, and any first-type measurement value of the X first-type measurement value(s) acquired by the corresponding first-type measurement is a power value; performing a target second-type measurement, the target second-type measurement being used for acquiring a second-type measurement value; and transmitting a first radio signal;

wherein the target time-frequency resource pool is one of Q alternative time-frequency resource pools, the Q alternative time-frequency resource pools respectively correspond to Q Rx parameter groups, any two Rx parameter groups of the Q Rx parameter groups are different, Q is a positive integer greater than 1; a Rx parameter group of the Q Rx parameter groups corresponding to the target time-frequency resource pool is associated with a Tx parameter group for the first radio signal; the X first-type measurement value(s) is(are) used in the process of performing the target second-type measurement, each of X1 first-type measurement value(s) out of the X first-type measurement value(s) is greater than a target threshold, the second-type measurement value acquired from the target second-type measurement is equal to a ratio of X1 to X, X1 is a non-negative integer not greater than X; the second-type measurement value acquired from the target second-type measurement is used for determining at least one of an MCS (Modulation and Coding Scheme) adopted by the first radio signal and radio resources occupied by the first radio signal; the second-type measurement value acquired by the target second-type measurement belongs to a target interval, the target interval is one of P alternative intervals, any alternative interval of the P alternative intervals is an interval of non-negative real numbers, the P alternative intervals respectively correspond to P alternative MCS subsets, the P alternative intervals respectively correspond to P alternative resource numerical value subsets, P is a positive integer greater than 1; an alternative MCS subset of the P alternative MCS subsets corresponding to the target interval is a first MCS subset, an alternative resource numerical value subset of the P alternative resource numerical value subsets corresponding to the target interval is a first resource numerical value subset; the MCS adopted by the first radio signal is an MCS in the first MCS subset, a number of the radio resources occupied by the first radio signal is equal to a resource numerical value in the first resource numerical value subset.

2. The method in the first-type communication node according to claim 1, further comprising:
transmitting a first signaling;
wherein the first signaling is used for indicating at least one of the MCS adopted by the first radio signal and the radio resources occupied by the first radio signal, the first signaling is transmitted via an air interface; the Q alternative time-frequency resource pools all belong to a first time window in the time domain, the target second-type measurement is performed in a second time window, a time domain position of the second time window is used for determining the first time window, an end time of the first time window is no later than a start time of the second time window, and an end time of the second time window is no later than a start time of transmission of the first radio signal.

3. The method in the first-type communication node according to claim 1, wherein the target time-frequency resource pool comprises X time-frequency unit(s), the X first-type measurement(s) is(are) respectively performed in the X time-frequency unit(s); a Rx parameter group of the Q Rx parameter groups corresponding to the target time-frequency resource pool is used for each first-type measurement of the X first-type measurement(s); a characteristic measurement value is a first-type measurement value of the X first-type measurement value(s), a first-type measurement included in the X first-type measurement(s) used for acquiring the characteristic measurement value is performed in a characteristic time-frequency unit, the characteristic time-frequency unit is one of the X time-frequency unit(s), the characteristic time-frequency unit comprises X2 multicarrier symbol(s) in the time domain, in which X2 is an integer, the characteristic measurement value is an average value of a sum of receiving power value(s) of each of the X2 multicarrier symbol(s) within a frequency domain resource occupied by the characteristic time-frequency unit.

4. The method in the first-type communication node according to claim 1, further comprising:
receiving a first information;
wherein the first information explicitly indicates the target threshold.

5. The method in the first-type communication node according to claim 4, wherein Q alternative thresholds respectively correspond to the Q Rx parameter groups, the target threshold is one of the Q alternative thresholds.

6. The method in the first-type communication node according to claim 1, further comprising:
receiving a third information;
wherein, the third information is used for indicating the P alternative intervals.

7. The method in the first-type communication node according to claim 6, wherein Q alternative interval sets respectively correspond to the Q Rx parameter groups, any alternative interval in the Q alternative interval sets is an interval of non-negative real numbers, the Q alternative interval sets respectively correspond to Q alternative MCS sets, the Q alternative interval sets respectively correspond to Q alternative resource numerical value sets; the P alternative intervals belong to one of the Q alternative interval sets, the P alternative MCS subsets belong to one of the Q alternative MCS sets, the P alternative resource numerical value subsets belong to one of the Q alternative resource numerical value sets.

8. The method in the first-type communication node according to claim 1, further comprising:
performing Y third-type measurement(s) in a third time window, the Y third-type measurement(s) is(are) respectively used for acquiring Y third-type measurement value(s), Y is a positive integer;
wherein, the second-type measurement value acquired by the target second-type measurement is used for determining a first upper bound, a sum of the Y third-type measurement value(s) is no greater than the first upper bound, a time domain position of the third time window is related to time domain resources occupied by the first radio signal, the Y third-type measurement value(s) is(are) related to a number of time-frequency resources occupied by radio signal(s) transmitted by a transmitter of the first radio signal within the third time window, employing a Tx parameter group associated with a Rx parameter group of the Q Rx parameter groups corresponding to the target time-frequency resource pool; the second-type measurement value acquired by the target second-type measurement belongs to a target interval, the target interval is one of P alternative intervals, any alternative interval of the P alternative intervals is an interval of non-negative real numbers, P is a positive integer greater than 1; the P alternative intervals respectively correspond to P alternative upper bounds, the first upper bound is an alternative upper bound of the P alternative upper bounds corresponding to the target interval, a one-to-one correspondence relation between the P alternative intervals and the P alternative upper bounds is configurable; any of the P alternative upper bounds is non-negative real number.

9. A first-type communication node used for wireless communication, comprising:
a first measurer performing X first-type measurement(s) in a target time-frequency resource pool, the X first-type measurement(s) respectively being used for acquiring X first-type measurement value(s), X is a positive integer, wherein one first-type measurement is one measurement on an average of power values on a given time-frequency resource, and any first-type measurement value of the X first-type measurement value(s) acquired by the corresponding first-type measurement is a power value;
a second measurer performing a target second-type measurement, the target second-type measurement being used for acquiring a second-type measurement value; and
a first transceiver transmitting a first radio signal;
wherein the target time-frequency resource pool is one of Q alternative time-frequency resource pools, the Q alternative time-frequency resource pools respectively correspond to Q Rx parameter groups, any two Rx parameter groups of the Q Rx parameter groups are different, Q is a positive integer greater than 1; a Rx parameter group of the Q Rx parameter groups corresponding to the target time-frequency resource pool is associated with a Tx parameter group for the first radio signal; the X first-type measurement value(s) is(are) used in the process of performing the target second-type measurement, each of X1 first-type measurement value(s) out of the X first-type measurement value(s) is greater than a target threshold, the second-type measurement value acquired from the target second-type measurement is equal to a ratio of X1 to X, X1 is a non-negative integer not greater than X; the second-type measurement value acquired from the target second-type measurement is used for determining, at least one of an MCS (Modulation and Coding Scheme) adopted by the first radio signal and radio resources occupied by the first radio signal; the second-type measurement value acquired by the target second-type measurement belongs to a target interval, the target interval is one of P alternative intervals, any alternative interval of the P alternative intervals is an interval of non-negative real numbers, the P alternative intervals respectively correspond to P alternative MCS subsets, the P alternative intervals respectively correspond to P alternative resource numerical value subsets, P is a positive integer greater than 1; an alternative MCS subset of the P alternative MCS subsets corresponding to the target interval is a first MCS subset, an alternative resource numerical value subset of the P alternative resource numerical value subsets corresponding to the target interval is a first resource numerical value subset; the MCS adopted by the first radio signal is an MCS in the first MCS subset, a number of the radio resources occupied by the first radio signal is equal to a resource numerical value in the first resource numerical value subset.

10. The first-type communication node according to claim 9, wherein the first transceiver also transmits a first signaling; wherein the first signaling is used for indicating at least one of the MCS adopted by the first radio signal and the radio resources occupied by the first radio signal, the first signaling is transmitted via an air interface; the Q alternative time-frequency resource pools all belong to a first time window in the time domain, the target second-type measurement is performed in a second time window, a time domain position of the second time window is used for determining the first time window, an end time of the first time window is no later than a start time of the second time window, and an end time of the second time window is no later than a start time of transmission of the first radio signal.

11. The first-type communication node according to claim 9, wherein the target time-frequency resource pool comprises X time-frequency unit(s), the X first-type measurement(s) is(are) respectively performed in the X time-frequency unit(s); a Rx parameter group of the Q Rx parameter groups corresponding to the target time-frequency resource pool is used for each first-type measurement of the X first-type measurement(s); a characteristic measurement value is a first-type measurement value of the X first-type measurement value(s), a first-type measurement included in the X first-type measurement(s) used for acquiring the characteristic measurement value is performed in a characteristic time-frequency unit, the characteristic time-frequency unit is one of the X time-frequency unit(s), the characteristic time-frequency unit comprises X2 multicarrier symbol(s) in the time domain, in which X2 is an integer, the characteristic measurement value is an average value of a sum of receiving power value(s) of each of the X2 multicarrier symbol(s) within a frequency domain resource occupied by the characteristic time-frequency unit.

12. The first-type communication node according to claim 9, wherein the first transceiver also receives a first information; wherein the first information explicitly indicates the target threshold.

13. The first-type communication node according to claim 12, wherein Q alternative thresholds respectively correspond to the Q Rx parameter groups, the target threshold is one of the Q alternative thresholds.

14. The first-type communication node according to claim 9, wherein the first measurer also performs Q0 group(s) of first-type measurements respectively in Q0 alternative time-frequency resource pool(s) of the Q alternative time-frequency resource pools, the Q0 group(s) of first-type measurements is(are) different from the X first-type measurements and is(are) respectively used for acquiring Q0 group(s) of first-type measurement values; wherein, each of the Q0 alternative time-frequency resource pool(s) is different from the target time-frequency resource pool, Q0 is a positive integer less than the Q.

15. The first-type communication node according to claim 14, wherein the second measurer also performs Q1 second-type measurement(s), the Q1 second-type measurement(s) is(are) different from the target second-type measurement and is(are) respectively used for acquiring Q1 second-type measurement value(s); wherein, Q1 group(s) of first-type measurement values out of the Q0 group(s) of first-type measurement value(s) is(are) respectively used for the Q1 second-type measurement(s), Q1 is a positive integer not greater than Q0.

16. The first-type communication node according to claim 15, wherein each of the Q1 second-type measurement value(s) is no less than the second-type measurement value acquired by the target second-type measurement.

17. The first-type communication node according to claim 9, wherein the first transceiver also receives a second information; wherein, the second information explicitly indicates the Tx parameter group for the first radio signal, or the second information implicitly indicates the Tx parameter group for the first radio signal.

18. The first-type communication node according to claim 9, wherein the first transceiver also receives a third information; wherein the third information is used for indicating the P alternative intervals.

19. The first-type communication node according to claim 18, wherein Q alternative interval sets respectively correspond to the Q Rx parameter groups, any alternative interval in the Q alternative interval sets is an interval of non-negative real numbers, the Q alternative interval sets respectively correspond to Q alternative MCS sets, the Q alternative interval sets respectively correspond to Q alternative resource numerical value sets; the P alternative intervals belong to one of the Q alternative interval sets, the P alternative MCS subsets belong to one of the Q alternative MCS sets, the P alternative resource numerical value subsets belong to one of the Q alternative resource numerical value sets.

20. The first-type communication node according to claim 9, wherein the second measurer also performs Y third-type measurement(s) in a third time window, the Y third-type measurement(s) is(are) respectively used for acquiring Y third-type measurement value(s), Y is a positive integer; wherein, the second-type measurement value acquired by the target second-type measurement is used for determining a first upper bound, a sum of the Y third-type measurement value(s) is no greater than the first upper bound, a time domain position of the third time window is related to time domain resources occupied by the first radio signal, the Y third-type measurement value(s) is(are) related to a number of time-frequency resources occupied by radio signal(s) transmitted by a transmitter of the first radio signal within the third time window, employing a Tx parameter group associated with a Rx parameter group of the Q Rx parameter groups corresponding to the target time-frequency resource pool; the second-type measurement value acquired by the target second-type measurement belongs to a target interval, the target interval is one of P alternative intervals, any alternative interval of the P alternative intervals is an interval of non-negative real numbers, P is a positive integer greater than 1; the P alternative intervals respectively correspond to P alternative upper bounds, the first upper bound is an alternative upper bound of the P alternative upper bounds corresponding to the target interval, a one-to-one correspondence relation between the P alternative intervals and the P alternative upper bounds is configurable; any of the P alternative upper bounds is non-negative real number.

* * * * *